(12) United States Patent
Ippadi Veerabhadre Gowda et al.

(10) Patent No.: US 12,277,848 B2
(45) Date of Patent: Apr. 15, 2025

(54) DEVICES, METHODS, AND GRAPHICAL USER INTERFACES FOR DEVICE POSITION ADJUSTMENT

(71) Applicant: Apple Inc., Cupertino, CA (US)

(72) Inventors: Praveen Gowda Ippadi Veerabhadre Gowda, San Jose, CA (US); Thomas Berton, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/405,893

(22) Filed: Jan. 5, 2024

(65) Prior Publication Data

US 2024/0265796 A1  Aug. 8, 2024

Related U.S. Application Data

(60) Provisional application No. 63/470,925, filed on Jun. 4, 2023, provisional application No. 63/443,274, filed on Feb. 3, 2023.

(51) Int. Cl.
*G08B 21/18* (2006.01)
*G06F 3/01* (2006.01)
*G06T 19/00* (2011.01)

(52) U.S. Cl.
CPC ............ *G08B 21/18* (2013.01); *G06F 3/012* (2013.01); *G06F 3/013* (2013.01); *G06T 19/006* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 2019/0311566 A1* | 10/2019 | Benkreira | G07D 11/50 |
| 2022/0155909 A1 | 5/2022 | Kawashima et al. | |
| 2022/0269333 A1 | 8/2022 | Dedonato et al. | |
| 2024/0020371 A1* | 1/2024 | Dedonato | G06F 3/04842 |
| 2024/0289007 A1* | 8/2024 | McKenzie | G06F 3/04847 |

FOREIGN PATENT DOCUMENTS

WO  2022/147146 A1  7/2022

OTHER PUBLICATIONS

International Search Report and Written Opinion received for PCT Patent Application No. PCT/US2024/014085, mailed on Jun. 12, 2024, 17 pages.

* cited by examiner

*Primary Examiner* — Stephen T. Reed
(74) *Attorney, Agent, or Firm* — DLA Piper LLP (US)

(57) ABSTRACT

The present disclosure generally relates to methods and graphical user interfaces for providing feedback pertaining to device position adjustment.

45 Claims, 28 Drawing Sheets

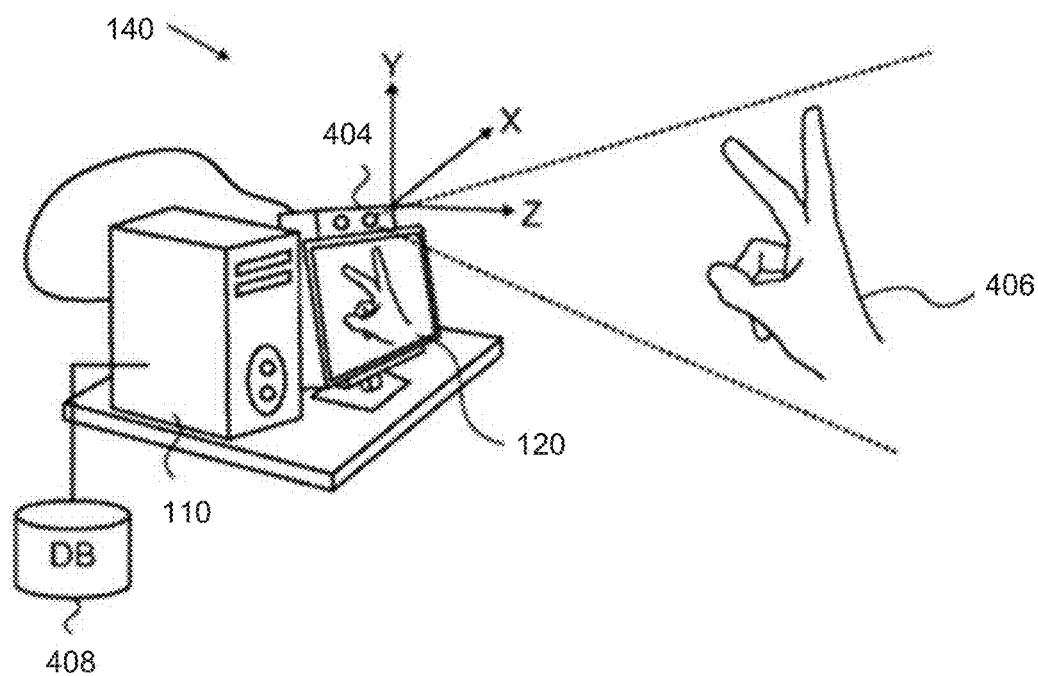
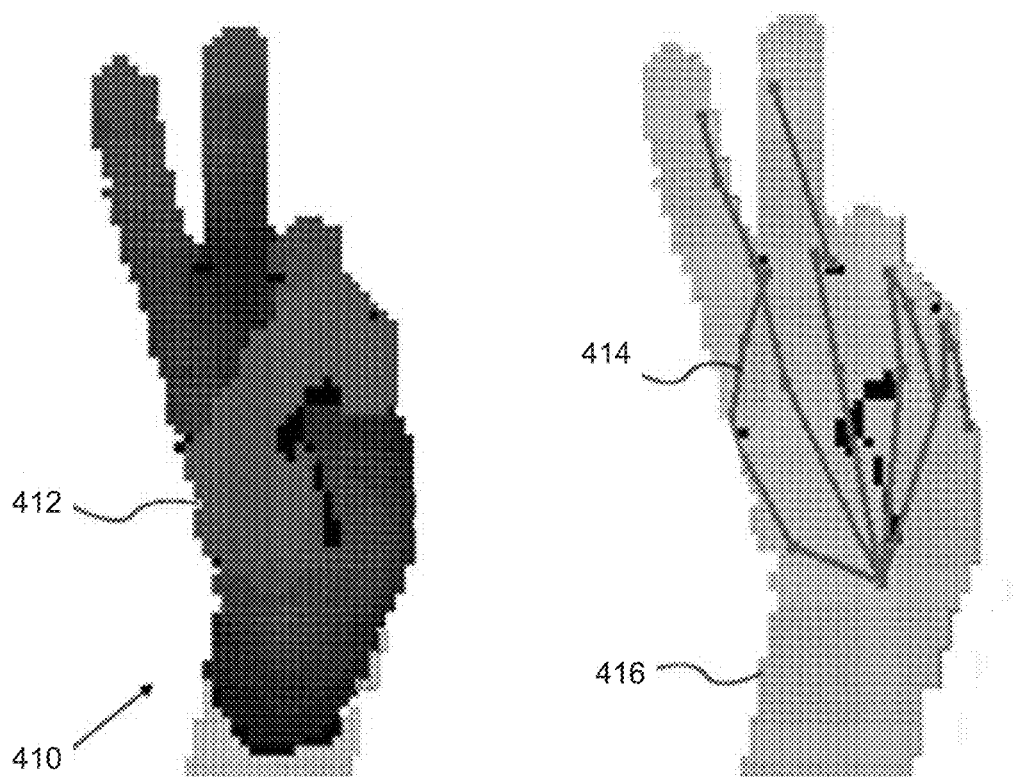
FIG. 4

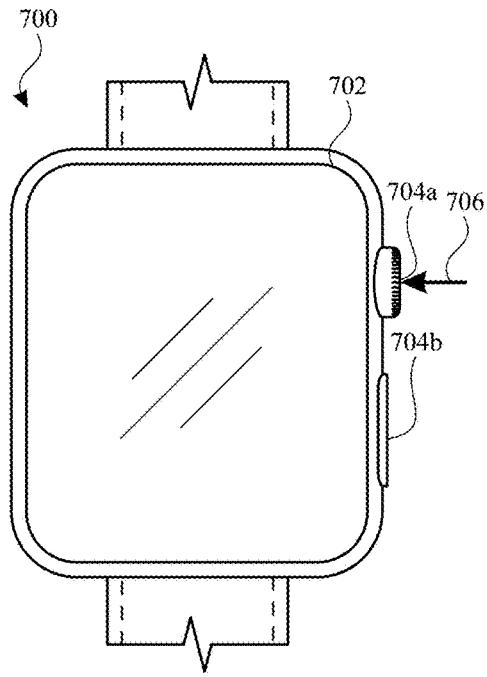
FIG. 7A
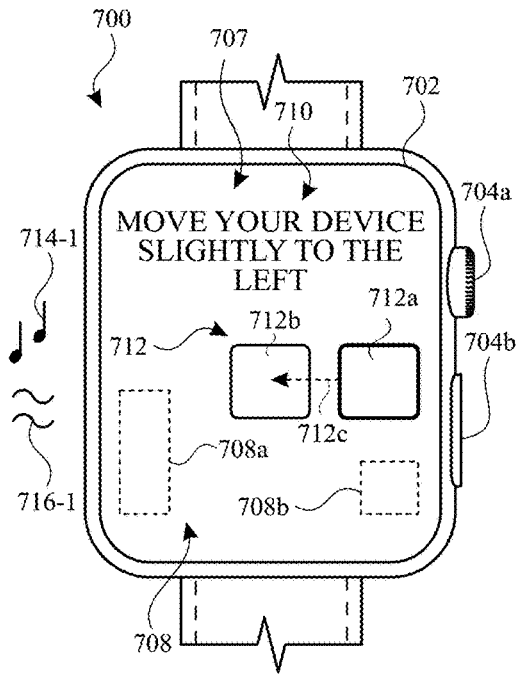
FIG. 7B
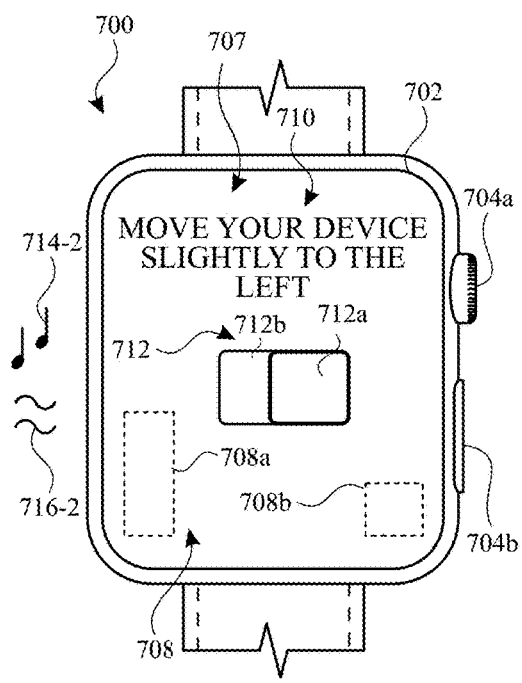
FIG. 7C
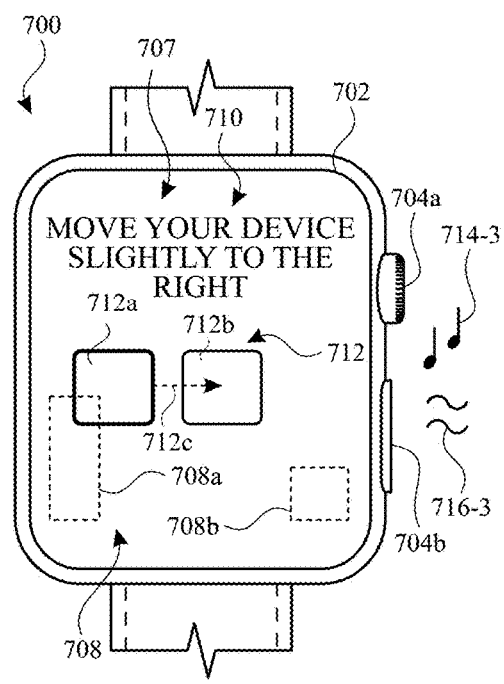
FIG. 7D1

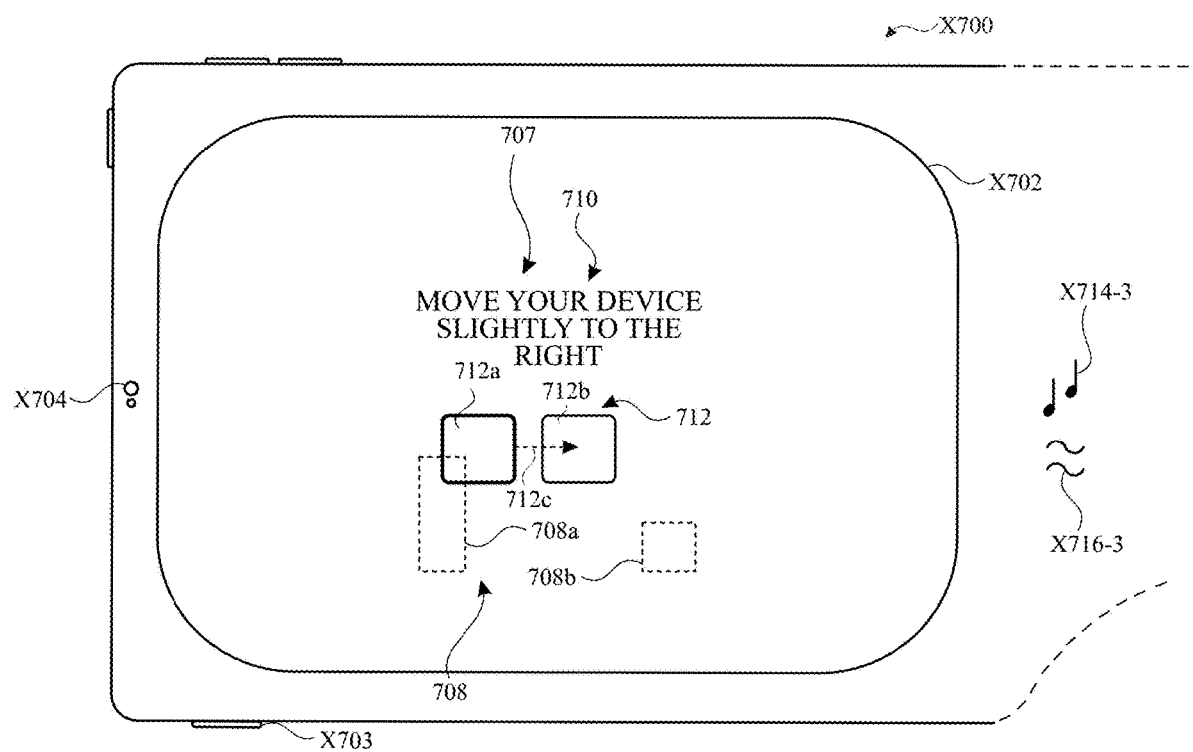
FIG. 7D2

800 ⟶

802
Detect a position of a portion of the computer system relative to a face of a user.

↓

804
In response to detecting the position of the portion of the computer system relative to the face of the user:

806
In accordance with a determination that the computer system meets respective criteria while the position of the portion of the computer system relative to the face of the user meets one or more error conditions, wherein the respective criteria include a requirement that the computer system is operating in a respective context in order for the respective criteria to be met:

808
Output a first alert indicating that the position of the portion of the computer system relative to the face of the user meets the one or more error conditions.

810
In accordance with a determination that the computer system does not meet the respective criteria while the position of the portion of the computer system relative to the face of the user meets one or more error conditions:

812
Forgo outputting the first alert.

*FIG. 8*

DEVICES, METHODS, AND GRAPHICAL USER INTERFACES FOR DEVICE POSITION ADJUSTMENT

CROSS-REFERENCE TO RELATED APPLICATIONS

This application claims priority to U.S. Provisional Patent Application Ser. No. 63/443,274, filed Feb. 3, 2023, entitled "DEVICE, METHODS, AND GRAPHICAL USER INTERFACES FOR DEVICE POSITION ADJUSTMENT," and U.S. Provisional Patent Application Ser. No. 63/470,925, filed Jun. 4, 2023, entitled "DEVICE, METHODS, AND GRAPHICAL USER INTERFACES FOR DEVICE POSITION ADJUSTMENT," the contents of which are hereby incorporated by reference in their entirety.

TECHNICAL FIELD

The present disclosure relates generally to computer systems that are in communication with one or more display generation components and one or more input devices that provide computer-generated experiences, including, but not limited to, electronic devices that provide virtual reality and mixed reality experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects, such as digital images, video, text, icons, and control elements such as buttons and other graphics.

SUMMARY

Some methods and interfaces for adjusting device positioning are cumbersome, inefficient, and limited. For example, systems that provide insufficient, unclear, or confusing feedback for accurate device positioning are complex, tedious, and error-prone, create a significant cognitive burden on a user, and detract from the experience with the virtual/augmented reality environment. In addition, these methods take longer than necessary, thereby wasting energy of the computer system. This latter consideration is particularly important in battery-operated devices.

Accordingly, there is a need for computer systems with improved methods and interfaces for providing feedback pertaining to device position adjustment that make interaction with the computer systems more efficient and intuitive for a user. Such methods and interfaces optionally complement or replace conventional methods for providing feedback pertaining to device position adjustment. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for providing feedback pertaining to device position adjustment. Such methods and interfaces may complement or replace conventional methods for providing feedback pertaining to device position adjustment. Such methods and interfaces reduce the number, extent, and/or the nature of the inputs from a user and produce a more efficient human-machine interface. For battery-operated computing devices, such methods and interfaces conserve power and increase the time between battery charges.

In accordance with some embodiments, a method is described. The method comprises: at a computer system that is in communication with one or more display generation components and one or more input devices: detecting a position of a portion of the computer system relative to a face of a user; and in response to detecting the position of the portion of the computer system relative to the face of the user: in accordance with a determination that the computer system meets respective criteria while the position of the portion of the computer system relative to the face of the user meets one or more error conditions, wherein the respective criteria include a requirement that the computer system is operating in a respective context in order for the respective criteria to be met, outputting a first alert indicating that the position of the portion of the computer system relative to the face of the user meets the one or more error conditions; and in accordance with a determination that the computer system does not meet the respective criteria while the position of the portion of the computer system relative to the face of the user meets the one or more error conditions, forgoing outputting the first alert.

In accordance with some embodiments, a non-transitory computer-readable storage medium is described. In some embodiments, the non-transitory computer-readable storage medium stores one or more programs configured to be executed by one or more processors of a computer system that is in communication with one or more display generation components and one or more input devices, the one or more programs including instructions for: detecting a position of a portion of the computer system relative to a face of a user; and in response to detecting the position of the portion of the computer system relative to the face of the user: in accordance with a determination that the computer system meets respective criteria while the position of the portion of the computer system relative to the face of the user meets one or more error conditions, wherein the respective criteria include a requirement that the computer system is operating in a respective context in order for the respective criteria to be met, outputting a first alert indicating that the position of the portion of the computer system relative to the face of the user meets the one or more error conditions; and in accordance with a determination that the computer system does not meet the respective criteria while the position of the portion of the computer system relative to the face of the user meets the one or more error conditions, forgoing outputting the first alert.

In accordance with some embodiments, a transitory computer-readable storage medium is described. In some embodiments, the transitory computer-readable storage medium stores one or more programs configured to be executed by one or more processors of a computer system that is in communication with one or more display generation components and one or more input devices, the one or more programs including instructions for: detecting a position of a portion of the computer system relative to a face of a user; and in response to detecting the position of the portion of the computer system relative to the face of the user: in accordance with a determination that the computer system meets respective criteria while the position of the portion of the computer system relative to the face of the user meets one or more error conditions, wherein the respective criteria include a requirement that the computer system is operating in a respective context in order for the respective criteria to be met, outputting a first alert indicating that the position of the portion of the computer system relative to the face of the user meets the one or more error conditions; and in accordance with a determination that the computer system does not meet the respective criteria while the position of the portion of the computer system relative to the face of the user meets the one or more error conditions, forgoing outputting the first alert.

In accordance with some embodiments, a computer system is described. In some embodiments, the computer system is configured to communicate with one or more display generation components and one or more input devices, and the computer system comprises: one or more processors; and memory storing one or more programs configured to be executed by the one or more processors, the one or more programs including instructions for: detecting a position of a portion of the computer system relative to a face of a user; and in response to detecting the position of the portion of the computer system relative to the face of the user: in accordance with a determination that the computer system meets respective criteria while the position of the portion of the computer system relative to the face of the user meets one or more error conditions, wherein the respective criteria include a requirement that the computer system is operating in a respective context in order for the respective criteria to be met, outputting a first alert indicating that the position of the portion of the computer system relative to the face of the user meets the one or more error conditions; and in accordance with a determination that the computer system does not meet the respective criteria while the position of the portion of the computer system relative to the face of the user meets the one or more error conditions, forgoing outputting the first alert.

In accordance with some embodiments, a computer system is described. In some embodiments, the computer system is configured to communicate with one or more display generation components and one or more input devices, and the computer system comprises: means for detecting a position of a portion of the computer system relative to a face of a user; and means for, in response to detecting the position of the portion of the computer system relative to the face of the user: in accordance with a determination that the computer system meets respective criteria while the position of the portion of the computer system relative to the face of the user meets one or more error conditions, wherein the respective criteria include a requirement that the computer system is operating in a respective context in order for the respective criteria to be met, outputting a first alert indicating that the position of the portion of the computer system relative to the face of the user meets the one or more error conditions; and in accordance with a determination that the computer system does not meet the respective criteria while the position of the portion of the computer system relative to the face of the user meets the one or more error conditions, forgoing outputting the first alert.

In accordance with some embodiments, a computer program product is described. In some embodiments, the computer program product comprises one or more programs configured to be executed by one or more processors of a computer system that is in communication with one or more display generation components and one or more input devices, the one or more programs including instructions for: detecting a position of a portion of the computer system relative to a face of a user; and in response to detecting the position of the portion of the computer system relative to the face of the user: in accordance with a determination that the computer system meets respective criteria while the position of the portion of the computer system relative to the face of the user meets one or more error conditions, wherein the respective criteria include a requirement that the computer system is operating in a respective context in order for the respective criteria to be met, outputting a first alert indicating that the position of the portion of the computer system relative to the face of the user meets the one or more error conditions; and in accordance with a determination that the computer system does not meet the respective criteria while the position of the portion of the computer system relative to the face of the user meets the one or more error conditions, forgoing outputting the first alert.

In accordance with some embodiments, a method is described. The method comprises: at a computer system that is in communication with one or more display generation components and one or more input devices: detecting a position of a portion of the computer system relative to a portion of a body of a user; and in response to detecting the position of the computer system relative to the portion of the body of the user: in accordance with a determination that the position of the portion of the computer system relative to the portion of the body of the user meets a first set of error conditions, displaying, via the one or more display generation components, a first alert indicating that the position of the computer system relative to the portion of the body of the user satisfies the first set of error conditions, wherein the first alert prevents access to one or more features of the computer system until the first alert is dismissed; and in accordance with a determination that the position of the portion of the computer system relative to the portion of the body of the user meets a second set of error conditions different from the first set of error conditions, displaying, via the one or more display generation components, a second alert indicating that the position of the computer system relative to the portion of the body of the user satisfies the second set of error conditions, wherein the second alert is different from the first alert, and the one or more features of the device can be accessed while the second alert is displayed.

In accordance with some embodiments, a non-transitory computer-readable storage medium is described. The non-transitory computer-readable storage medium stores one or more programs configured to be executed by one or more processors of a computer system that is in communication with one or more display generation components and one or more input devices, the one or more programs including instructions for: detecting a position of a portion of the computer system relative to a portion of a body of a user; and in response to detecting the position of the computer system relative to the portion of the body of the user: in accordance with a determination that the position of the portion of the computer system relative to the portion of the body of the user meets a first set of error conditions, displaying, via the one or more display generation components, a first alert indicating that the position of the computer system relative to the portion of the body of the user satisfies the first set of error conditions, wherein the first alert prevents access to one or more features of the computer system until the first alert is dismissed; and in accordance with a determination that the position of the portion of the computer system relative to the portion of the body of the user meets a second set of error conditions different from the first set of error conditions, displaying, via the one or more display generation components, a second alert indicating that the position of the computer system relative to the portion of the body of the user satisfies the second set of error conditions, wherein the second alert is different from the first alert, and the one or more features of the device can be accessed while the second alert is displayed.

In accordance with some embodiments, a transitory computer-readable storage medium is described. The transitory computer-readable storage medium stores one or more programs configured to be executed by one or more processors of a computer system that is in communication with one or more display generation components and one or more input devices, the one or more programs including instructions for: detecting a position of a portion of the computer system relative to a portion of a body of a user; and in response to detecting the position of the computer system relative to the portion of the body of the user: in accordance with a determination that the position of the portion of the computer system relative to the portion of the body of the user meets a first set of error conditions, displaying, via the one or more display generation components, a first alert indicating that the position of the computer system relative to the portion of the body of the user satisfies the first set of error conditions, wherein the first alert prevents access to one or more features of the computer system until the first alert is dismissed; and in accordance with a determination that the position of the portion of the computer system relative to the portion of the body of the user meets a second set of error conditions different from the first set of error conditions, displaying, via the one or more display generation components, a second alert indicating that the position of the computer system relative to the portion of the body of the user satisfies the second set of error conditions, wherein the second alert is different from the first alert, and the one or more features of the device can be accessed while the second alert is displayed.

In accordance with some embodiments, a computer system is described. The computer system is configured to communicate with one or more display generation components and one or more input devices and comprises: one or more processors; and memory storing one or more programs configured to be executed by the one or more processors, the one or more programs including instructions for: detecting a position of a portion of the computer system relative to a portion of a body of a user; and in response to detecting the position of the computer system relative to the portion of the body of the user: in accordance with a determination that the position of the portion of the computer system relative to the portion of the body of the user meets a first set of error conditions, displaying, via the one or more display generation components, a first alert indicating that the position of the computer system relative to the portion of the body of the user satisfies the first set of error conditions, wherein the first alert prevents access to one or more features of the computer system until the first alert is dismissed; and in accordance with a determination that the position of the portion of the computer system relative to the portion of the body of the user meets a second set of error conditions different from the first set of error conditions, displaying, via the one or more display generation components, a second alert indicating that the position of the computer system relative to the portion of the body of the user satisfies the second set of error conditions, wherein the second alert is different from the first alert, and the one or more features of the device can be accessed while the second alert is displayed.

In accordance with some embodiments, a computer system is described. The computer system is configured to communicate with one or more display generation components and one or more input devices and comprises: means for detecting a position of a portion of the computer system relative to a portion of a body of a user; and means, responsive to detecting the position of the computer system relative to the portion of the body of the user, for: in accordance with a determination that the position of the portion of the computer system relative to the portion of the body of the user meets a first set of error conditions, displaying, via the one or more display generation components, a first alert indicating that the position of the computer system relative to the portion of the body of the user satisfies the first set of error conditions, wherein the first alert prevents access to one or more features of the computer system until the first alert is dismissed; and in accordance with a determination that the position of the portion of the computer system relative to the portion of the body of the user meets a second set of error conditions different from the first set of error conditions, displaying, via the one or more display generation components, a second alert indicating that the position of the computer system relative to the portion of the body of the user satisfies the second set of error conditions, wherein the second alert is different from the first alert, and the one or more features of the device can be accessed while the second alert is displayed.

In accordance with some embodiments, a computer program product is described. The computer program product comprises one or more programs configured to be executed by one or more processors of a computer system that is in communication with one or more display generation components and one or more input devices, the one or more programs including instructions for: detecting a position of a portion of the computer system relative to a portion of a body of a user; and in response to detecting the position of the computer system relative to the portion of the body of the user: in accordance with a determination that the position of the portion of the computer system relative to the portion of the body of the user meets a first set of error conditions, displaying, via the one or more display generation components, a first alert indicating that the position of the computer system relative to the portion of the body of the user satisfies the first set of error conditions, wherein the first alert prevents access to one or more features of the computer system until the first alert is dismissed; and in accordance with a determination that the position of the portion of the computer system relative to the portion of the body of the user meets a second set of error conditions different from the first set of error conditions, displaying, via the one or more display generation components, a second alert indicating that the position of the computer system relative to the portion of the body of the user satisfies the second set of error conditions, wherein the second alert is different from the first alert, and the one or more features of the device can be accessed while the second alert is displayed.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 4 is a block diagram illustrating a hand tracking unit of a computer system that is configured to capture gesture inputs of the user in some embodiments.

FIGS. 7A-7H illustrate example techniques for providing feedback pertaining to device position adjustment, in some embodiments.

FIG. 8 is a flow diagram of methods of providing feedback pertaining to device position adjustment, in some embodiments.

DESCRIPTION OF EMBODIMENTS

Figure 1A:
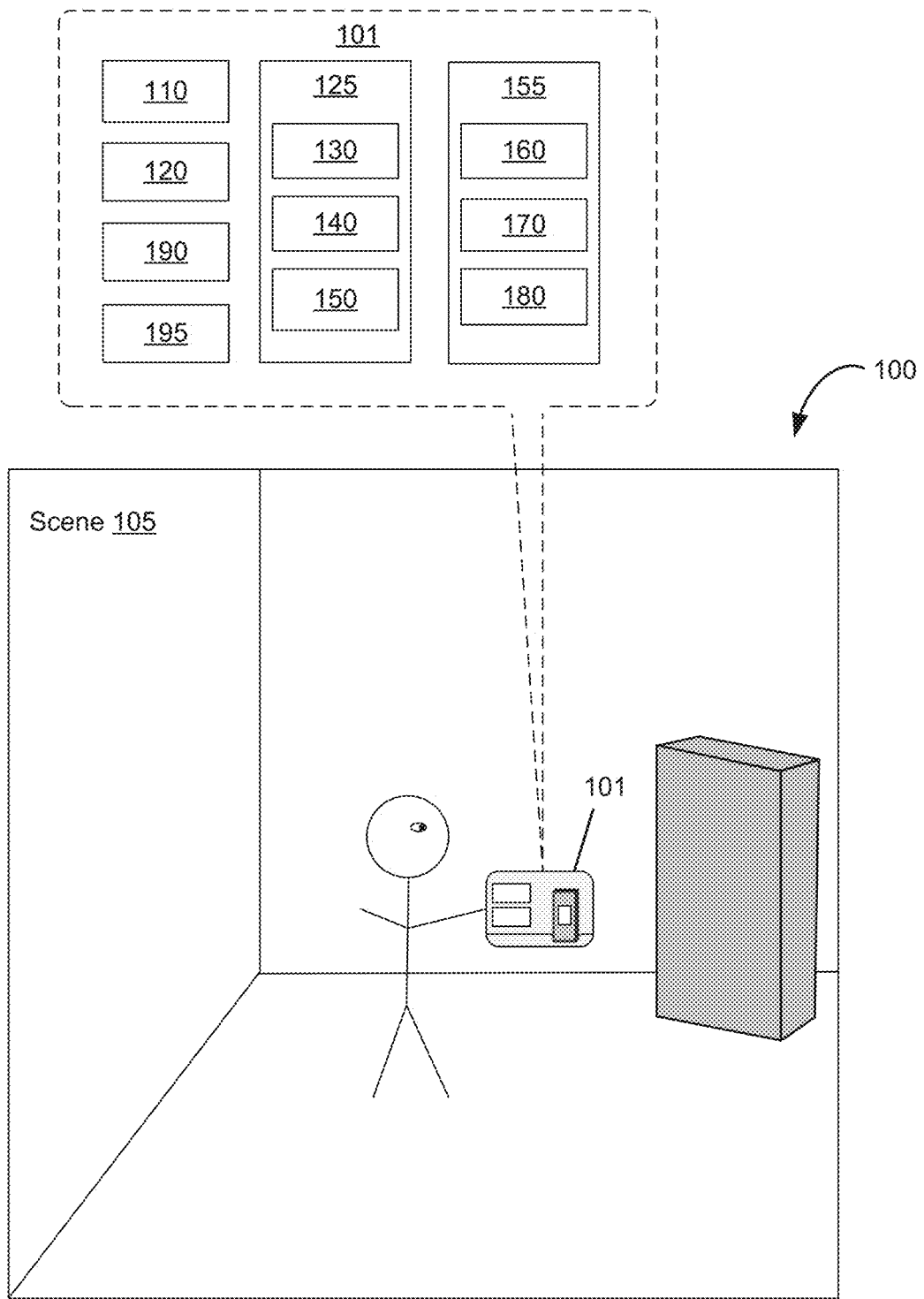
FIG. 1A is a block diagram illustrating an operating environment of a computer system for providing XR experiences in some embodiments.

The present disclosure relates to user interfaces for providing an extended reality (XR) experience to a user, in some embodiments.

The systems, methods, and GUIs described herein improve user interface interactions with virtual/augmented reality environments in multiple ways.

In some embodiments, a computer system detects a position of at least a portion of the computer system relative to the face of a user (e.g., relative to a portion of a face of a user (e.g., relative to the user's eyes, nose, and/or forehead)). In some embodiments, proper positioning of the computer system relative to the face of the user assists in providing the user with an improved experience, for example, by allowing the user to view displayed content properly and/or allowing the user to provide more accurate user inputs (e.g., eye-based and/or gaze-based inputs). Accordingly, in some embodiments, when the computer system detects that the position of the portion of the computer system relative to the face of the user meets one or more error conditions (e.g., the portion of the computer system is too far to the left, too far to the right, too high, and/or too low relative to the face of the user), the computer system optionally outputs a first alert indicating that the position of the portion of the computer system relative to the face of the user meets the one or more error conditions. In some embodiments, when the computer system detects that the position of the portion of the computer system relative to the face of the user meets one or more errors conditions and the computer system meets respective criteria (e.g., the computer system is not displaying immersive content or is not in a first state), the computer system outputs the first alert, whereas when the computer system detects that the position of the portion of the computer system relative to the face of the user meets one or more errors conditions and the computer system does not meet the respective criteria (e.g., the computer system is displaying immersive content and/or is in the first state), the computer system waits to output the first alert until the computer system does meet the respective criteria.

In some embodiments, a computer system detects a position of a portion of the computer system relative to a portion of a body of a user. In some embodiments, proper positioning of the computer system relative to the face of the user assists in providing the user with an improved experience, for example, by allowing the user to view displayed content properly and/or allowing the user to provide more accurate user inputs (e.g., eye-based and/or gaze-based inputs). Accordingly, in some embodiments, when the computer system detects that the position of the portion of the computer system relative to the face of the user meets one or more error conditions (e.g., the portion of the computer system is too far to the left, too far to the right, too high, and/or too low relative to the face of the user; and/or the computer system is too close to or too far from the face of the user), the computer system displays a notification. In some embodiments, certain types of errors are considered more important or more serious than others. Accordingly, when the error condition is a first type of error condition that is considered a more serious error, the computer system displays a first alert; and when the error condition is a second type of error condition that is considered less serious, the computer system displays a second alert different from the first alert.

FIGS. 1A-6 provide a description of example computer systems for providing XR experiences to users. FIGS. 7A-7H illustrate example techniques for providing feedback pertaining to device position adjustment, in some embodiments. FIG. 8 is a flow diagram of methods of providing feedback pertaining to device position adjustment, in some embodiments. The user interfaces in FIGS. 7A-7H are used to illustrate the processes in FIG. 8. FIGS. 9A-9G illustrate example techniques for providing feedback pertaining to device position adjustment, in some embodiments. FIG. 10 is a flow diagram of methods or providing feedback pertaining to device position adjustment, in some embodiments. The user interfaces in FIGS. 9A-9G are used to illustrate the processes in FIG. 10.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, providing a more varied, detailed, and/or realistic user experience while saving storage space, and/or additional techniques. These techniques also reduce power usage and improve battery life of the device by enabling the user to use the device more quickly and efficiently. Saving on battery power, and thus weight, improves the ergonomics of the device. These techniques also enable real-time communication, allow for the use of fewer and/or less precise sensors resulting in a more compact, lighter, and cheaper device, and enable the device to be used in a variety of lighting conditions. These techniques reduce energy usage, thereby reducing heat emitted by the device, which is particularly important for a wearable device where a device well within operational parameters for device components can become uncomfortable for a user to wear if it is producing too much heat.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, as shown in FIG. 1A, the XR experience is provided to the user via an operating environment 100 that includes a computer system 101. The computer system 101 includes a controller 110 (e.g., processors of a portable electronic device or a remote server), a display generation component 120 (e.g., a head-mounted device (IMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing a XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands). A person may sense and/or interact with a XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

In an augmented reality, mixed reality, or virtual reality environment, a view of a three-dimensional environment is visible to a user. The view of the three-dimensional environment is typically visible to the user via one or more display generation components (e.g., a display or a pair of display modules that provide stereoscopic content to different eyes of the same user) through a virtual viewport that has a viewport boundary that defines an extent of the three-dimensional environment that is visible to the user via the one or more display generation components. In some embodiments, the region defined by the viewport boundary is smaller than a range of vision of the user in one or more dimensions (e.g., based on the range of vision of the user, size, optical properties or other physical characteristics of the one or more display generation components, and/or the location and/or orientation of the one or more display generation components relative to the eyes of the user). In some embodiments, the region defined by the viewport boundary is larger than a range of vision of the user in one or more dimensions (e.g., based on the range of vision of the user, size, optical properties or other physical characteristics of the one or more display generation components, and/or the location and/or orientation of the one or more display generation components relative to the eyes of the user). The viewport and viewport boundary typically move as the one or more display generation components move (e.g., moving with a head of the user for a head mounted device or moving with a hand of a user for a handheld device such as a tablet or smartphone). A viewpoint of a user determines what content is visible in the viewport, a viewpoint generally specifies a location and a direction relative to the three-dimensional environment, and as the viewpoint shifts, the view of the three-dimensional environment will also shift in the viewport. For a head mounted device, a viewpoint is typically based on a location an direction of the head, face, and/or eyes of a user to provide a view of the three-dimensional environment that is perceptually accurate and provides an immersive experience when the user is using the head-mounted device. For a handheld or stationed device, the viewpoint shifts as the handheld or stationed device is moved and/or as a position of a user relative to the handheld or stationed device changes (e.g., a user moving toward, away from, up, down, to the right, and/or to the left of the device). For devices that include display generation components with virtual passthrough, portions of the physical environment that are visible (e.g., displayed, and/or projected) via the one or more display generation components are based on a field of view of one or more cameras in communication with the display generation components which typically move with the display generation components (e.g., moving with a head of the user for a head mounted device or moving with a hand of a user for a handheld device such as a tablet or smartphone) because the viewpoint of the user moves as the field of view of the one or more cameras moves (and the appearance of one or more virtual objects displayed via the one or more display generation components is updated based on the viewpoint of the user (e.g., displayed positions and poses of the virtual objects are updated based on the movement of the viewpoint of the user)). For display generation components with optical passthrough, portions of the physical environment that are visible (e.g., optically visible through one or more partially or fully transparent portions of the display generation component) via the one or more display generation components are based on a field of view of a user through the partially or fully transparent portion(s) of the display generation component (e.g., moving with a head of the user for a head mounted device or moving with a hand of a user for a handheld device such as a tablet or smartphone) because the viewpoint of the user moves as the field of view of the user through the partially or fully transparent portions of the display generation components moves (and the appearance of one or more virtual objects is updated based on the viewpoint of the user).

In some embodiments a representation of a physical environment (e.g., displayed via virtual passthrough or optical passthrough) can be partially or fully obscured by a virtual environment. In some embodiments, the amount of virtual environment that is displayed (e.g., the amount of physical environment that is not displayed) is based on an immersion level for the virtual environment (e.g., with respect to the representation of the physical environment). For example, increasing the immersion level optionally causes more of the virtual environment to be displayed, replacing and/or obscuring more of the physical environment, and reducing the immersion level optionally causes less of the virtual environment to be displayed, revealing portions of the physical environment that were previously not displayed and/or obscured. In some embodiments, at a particular immersion level, one or more first background objects (e.g., in the representation of the physical environment) are visually de-emphasized (e.g., dimmed, blurred, and/or displayed with increased transparency) more than one or more second background objects, and one or more third background objects cease to be displayed. In some embodiments, a level of immersion includes an associated degree to which the virtual content displayed by the computer system (e.g., the virtual environment and/or the virtual content) obscures background content (e.g., content other than the virtual environment and/or the virtual content) around/behind the virtual content, optionally including the number of items of background content displayed and/or the visual characteristics (e.g., colors, contrast, and/or opacity) with which the background content is displayed, the angular range of the virtual content displayed via the display generation component (e.g., 60 degrees of content displayed at low immersion, 120 degrees of content displayed at medium immersion, or 180 degrees of content displayed at high immersion), and/or the proportion of the field of view displayed via the display generation component that is consumed by the virtual content (e.g., 33% of the field of view consumed by the virtual content at low immersion, 66% of the field of view consumed by the virtual content at medium immersion, or 100% of the field of view consumed by the virtual content at high immersion). In some embodiments, the background content is included in a background over which the virtual content is displayed (e.g., background content in the representation of the physical environment). In some embodiments, the background content includes user interfaces (e.g., user interfaces generated by the computer system corresponding to applications), virtual objects (e.g., files or representations of other users generated by the computer system) not associated with or included in the virtual environment and/or virtual content, and/or real objects (e.g., pass-through objects representing real objects in the physical environment around the user that are visible such that they are displayed via the display generation component and/or a visible via a transparent or translucent component of the display generation component because the computer system does not obscure/prevent visibility of them through the display generation component). In some embodiments, at a low level of immersion (e.g., a first level of immersion), the background, virtual and/or real objects are displayed in an unobscured manner. For example, a virtual environment with a low level of immersion is optionally displayed concurrently with the background content, which is optionally displayed with full brightness, color, and/or translucency. In some embodiments, at a higher level of immersion (e.g., a second level of immersion higher than the first level of immersion), the background, virtual and/or real objects are displayed in an obscured manner (e.g., dimmed, blurred, or removed from display). For example, a respective virtual environment with a high level of immersion is displayed without concurrently displaying the background content (e.g., in a full screen or fully immersive mode). As another example, a virtual environment displayed with a medium level of immersion is displayed concurrently with darkened, blurred, or otherwise de-emphasized background content. In some embodiments, the visual characteristics of the background objects vary among the background objects. For example, at a particular immersion level, one or more first background objects are visually de-emphasized (e.g., dimmed, blurred, and/or displayed with increased transparency) more than one or more second background objects, and one or more third background objects cease to be displayed. In some embodiments, a null or zero level of immersion corresponds to the virtual environment ceasing to be displayed and instead a representation of a physical environment is displayed (optionally with one or more virtual objects such as application, windows, or virtual three-dimensional objects) without the representation of the physical environment being obscured by the virtual environment. Adjusting the level of immersion using a physical input element provides for quick and efficient method of adjusting immersion, which enhances the operability of the computer system and makes the user-device interface more efficient.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

In some embodiments, spatial media includes spatial visual media and/or spatial audio. In some embodiments, a spatial capture is a capture of spatial media. In some embodiments, spatial visual media (also referred to as stereoscopic media) (e.g., a spatial image and/or a spatial video) is media that includes two different images or sets of images, representing two perspectives of the same or overlapping fields-of-view, for concurrent display. A first image representing a first perspective is presented to a first eye of the viewer and a second image representing a second perspective, different from the first perspective, is concurrently presented to a second eye of the viewer. The first image and the second image have the same or overlapping fields-of-view. In some embodiments, a computer system displays the first image via a first display that is positioned for viewing by the first eye of the viewer and concurrently displays the second image via a second display, different from the first display, that is position for viewing by the second eye of the viewer. In some embodiments, the first image and the second image, when viewed together, create a depth effect and provide the viewer with depth perception for the contents of the images. In some embodiments, a first video representing a first perspective is presented to a first eye of the viewer and a second video representing a second perspective, different from the first perspective, is concurrently presented to a second eye of the viewer. The first video and the second video have the same or overlapping fields-of-view. In some embodiments, the first video and the second video, when viewed together, create a depth effect and provide the viewer with depth perception for the contents of the videos. In some embodiments, spatial audio experiences in headphones are produced by manipulating sounds in the headphone's two audio channels (e.g., left and right) so that they resemble directional sounds arriving in the ear-canal. For example, the headphones can reproduce a spatial audio signal that simulates a soundscape around the listener (also referred to as the user). An effective spatial sound reproduction can render sounds such that the listener perceives the sound as coming from a location within the soundscape external to the listener's head, just as the listener would experience the sound if encountered in the real world.

The geometry of the listener's ear, and in particular the outer ear (pinna), has a significant effect on the sound that arrives from a sound source to a listener's eardrum. The spatial audio sound experience is possible by taking into account the effect of the listener's pinna, the listener's head, and/or the listener's torso to the sound that enters to the listener's ear-canal. The geometry of the user's ear is optionally determined by using a three-dimensional scanning device that produces a three-dimensional model of at least a portion of the visible parts of the user's ear. This geometry is optionally used to produce a filter for producing the spatial audio experience. In some embodiments, spatial audio is audio that has been filtered such that a listener of the audio perceives the audio as coming from one or more directions and/or locations in three-dimensional space (e.g., from above, below, and/or in front of the listener).

An example of such a filter is a Head-Related Transfer Function (HRTF) filter. These filters are used to provide an effect that is similar to how a human ear, head, and torso filter sounds. When the geometry of the ears of a listener is known, a personalized filter (e.g., a personalized HRTF filter) can be produced so that the sound experienced by that listener through headphones (e.g., in-ear headphones, on-ear headphones, and/or over-ear headphones) is more realistic. In some embodiments, two filters are produced-one filter per ear-so that each ear of the listener has a corresponding personalized filter (e.g., personalized HRTF filter), as the ears of the listener may be of different geometry.

In some embodiments, a HRTF filter includes some (or all) acoustic information required to describe how sound reflects or diffracts around a listener's head before entering the listener's auditory system. In some embodiments, a personalized HRTF filter can be selected from a database of previously determined HRTFs for users having similar anatomical characteristics. In some embodiments, a personalized HRTF filter can be generated by numerical modeling based on the geometry of the listener's ear. One or more processors of the computer system optionally apply the personalized HRTF filter for the listener to an audio input signal to generate a spatial input signal for playback by headphones that are connected (e.g., wirelessly or by wire) to the computer system.

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may include speakers and/or other audio output devices integrated into the head-mounted system for providing audio output. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touchscreen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides a XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1A, those of ordinary skill in the art will appreciate from the present disclosure that various other features have not been illustrated for the sake of brevity and so as not to obscure more pertinent aspects of the example embodiments disclosed herein.

Figure 1B:
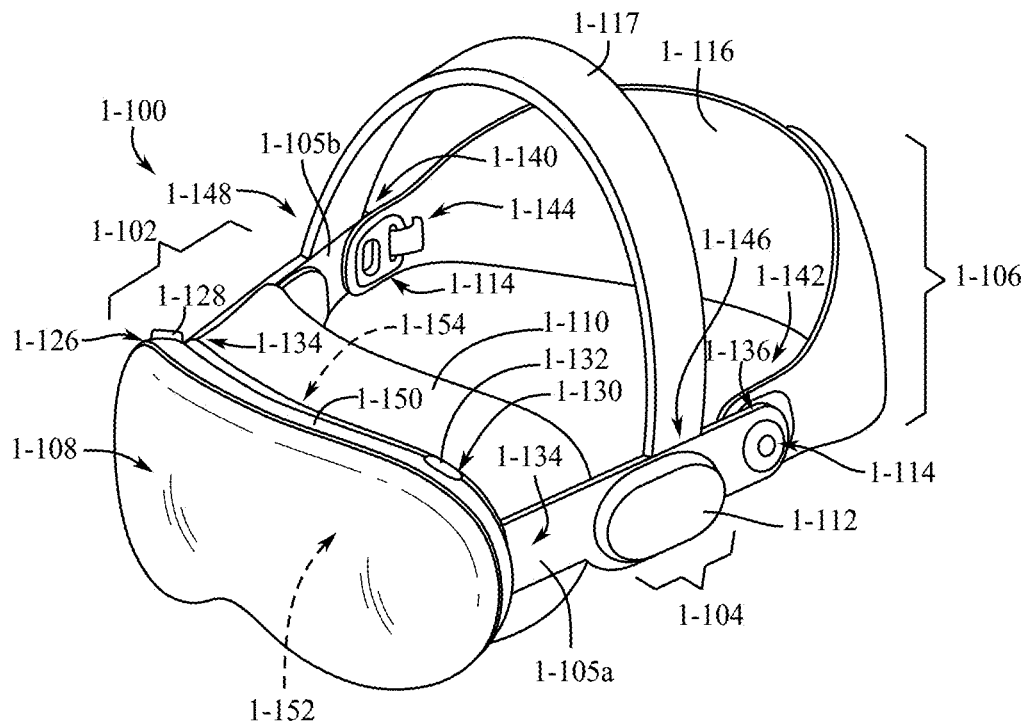
FIGS. 1B-1P are examples of a computer system for providing XR experiences in the operating environment of FIG. 1A.
Figure 1C:
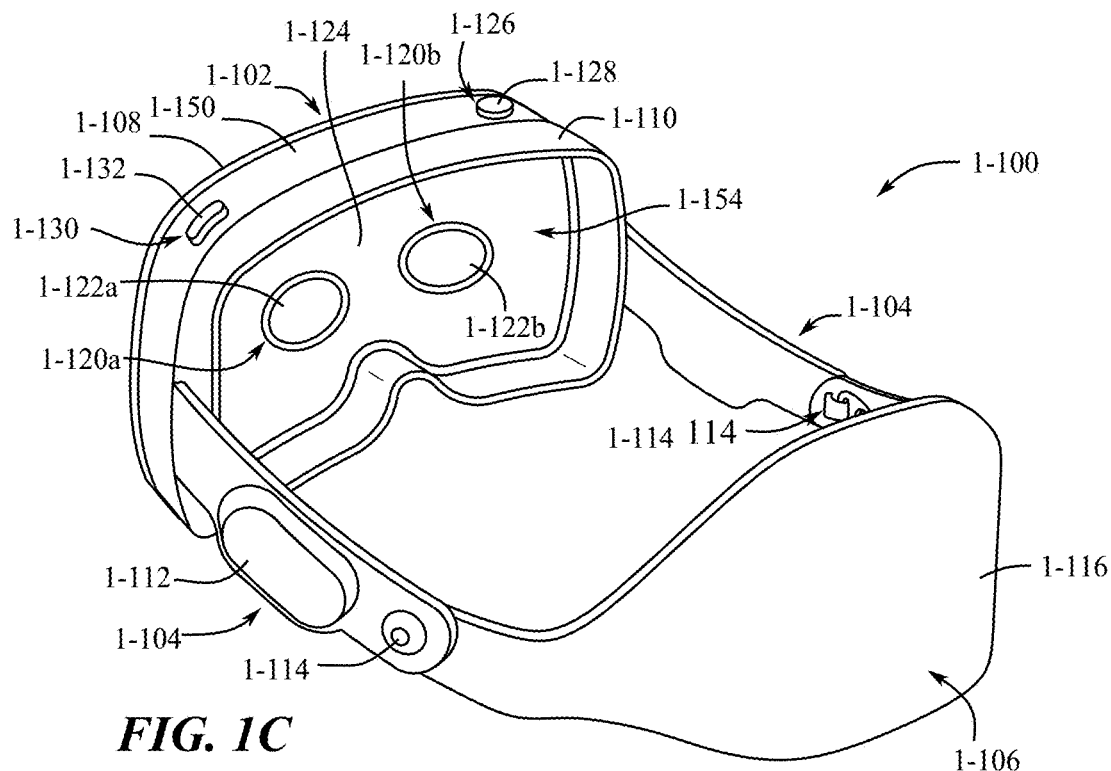
Figure 1D:
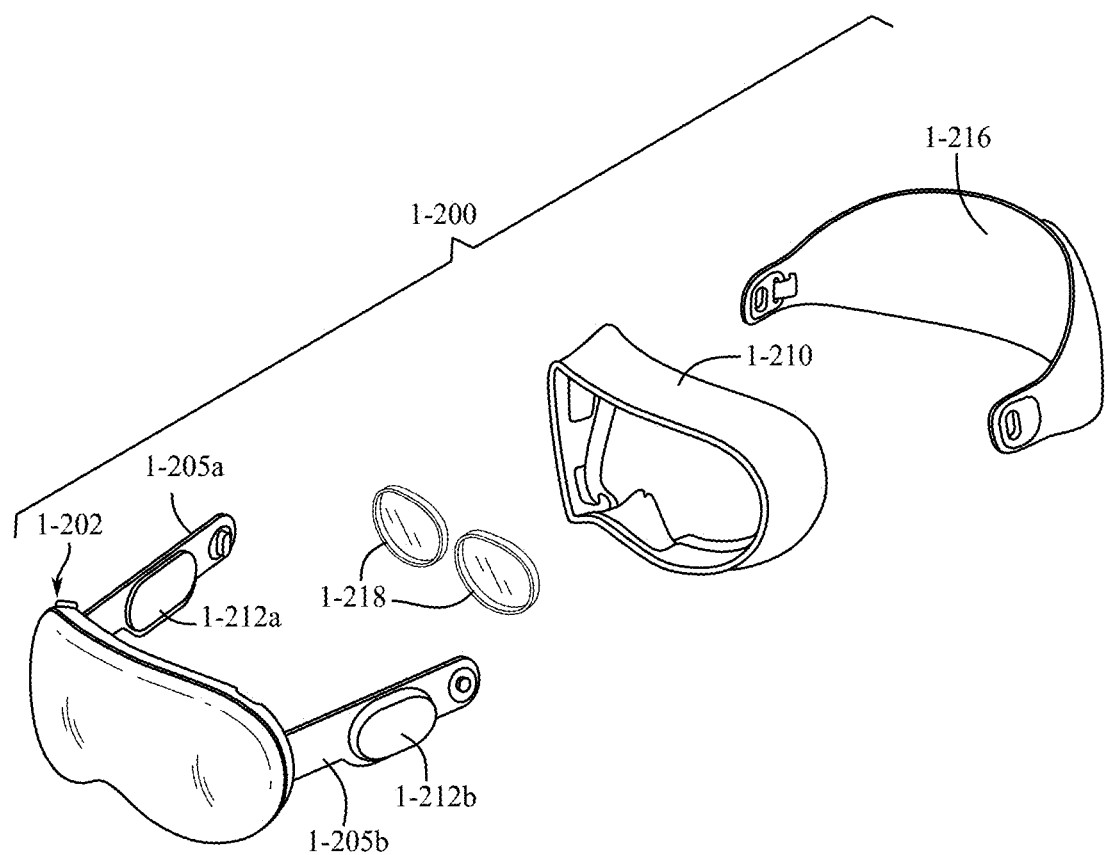
Figure 1E:
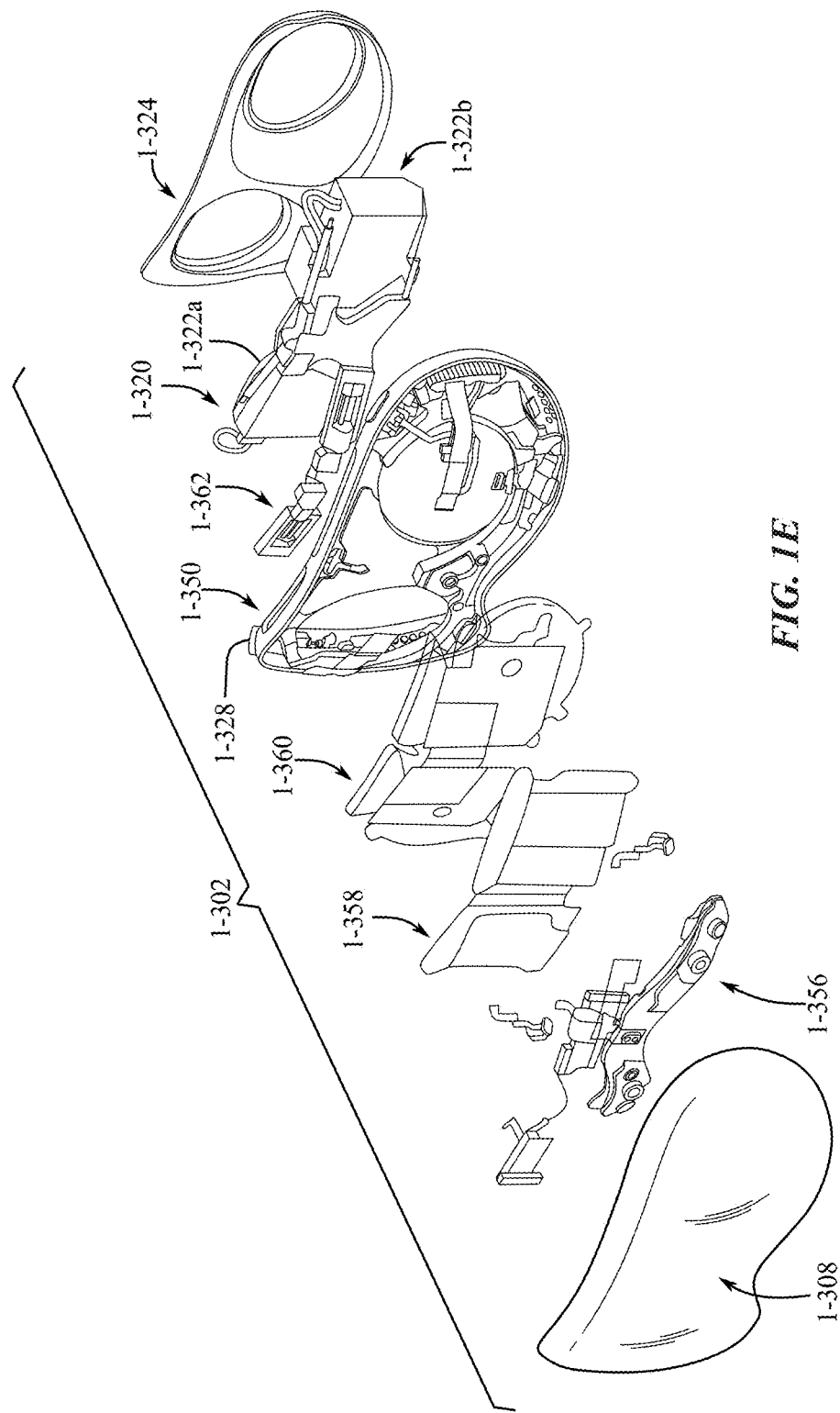
Figure 1F:
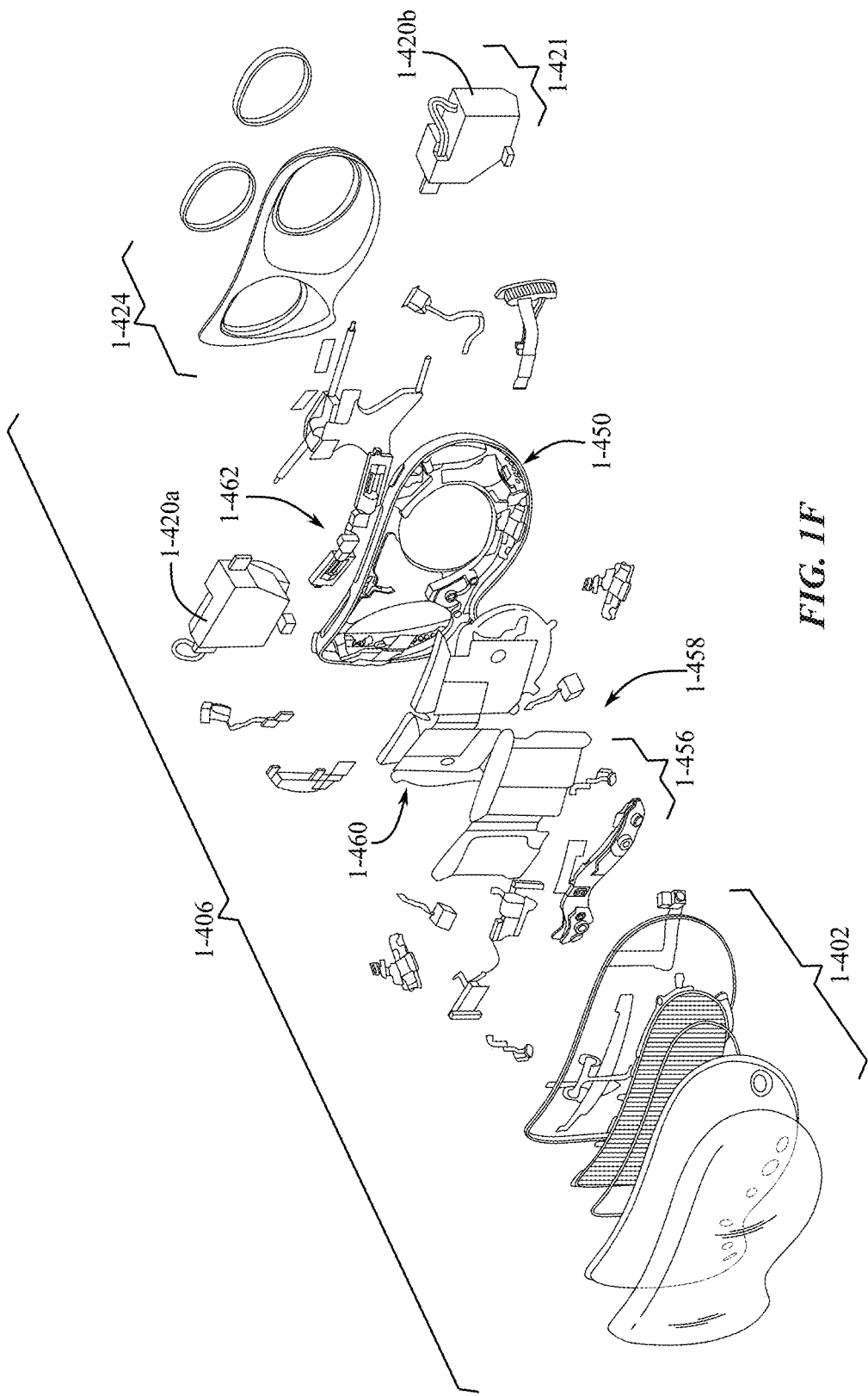
Figure 1G:
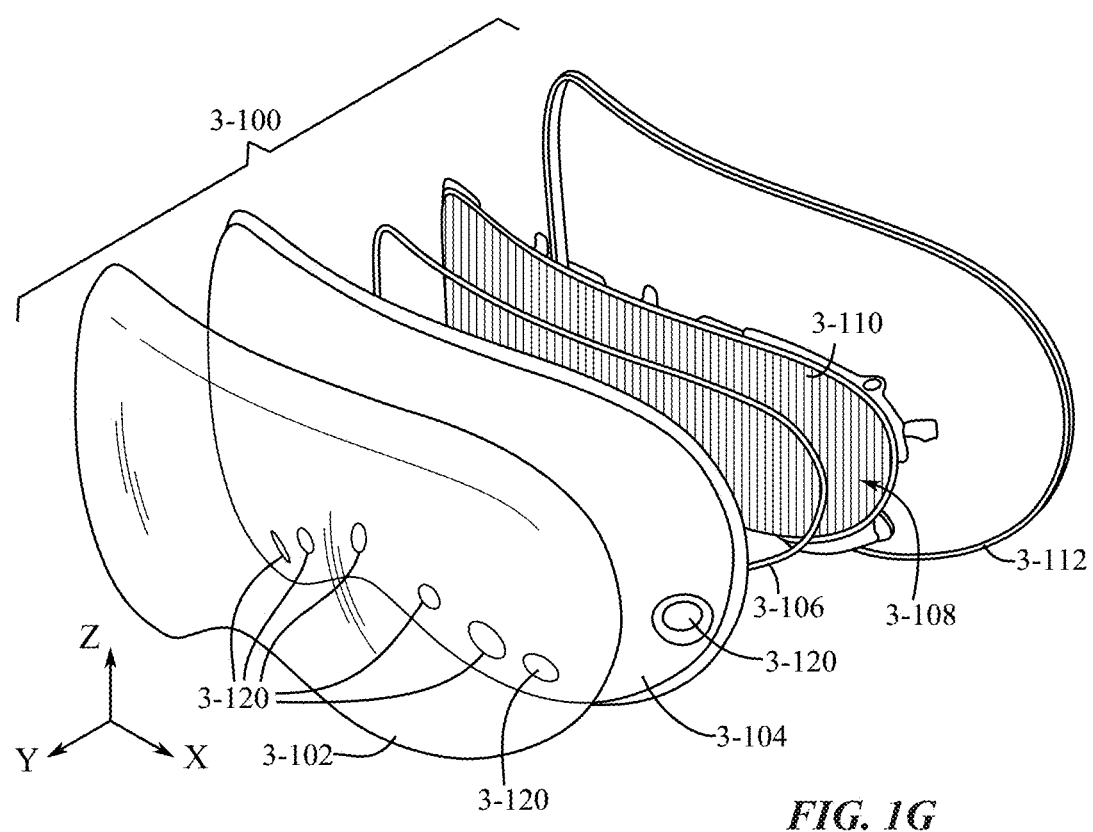
Figure 1H:
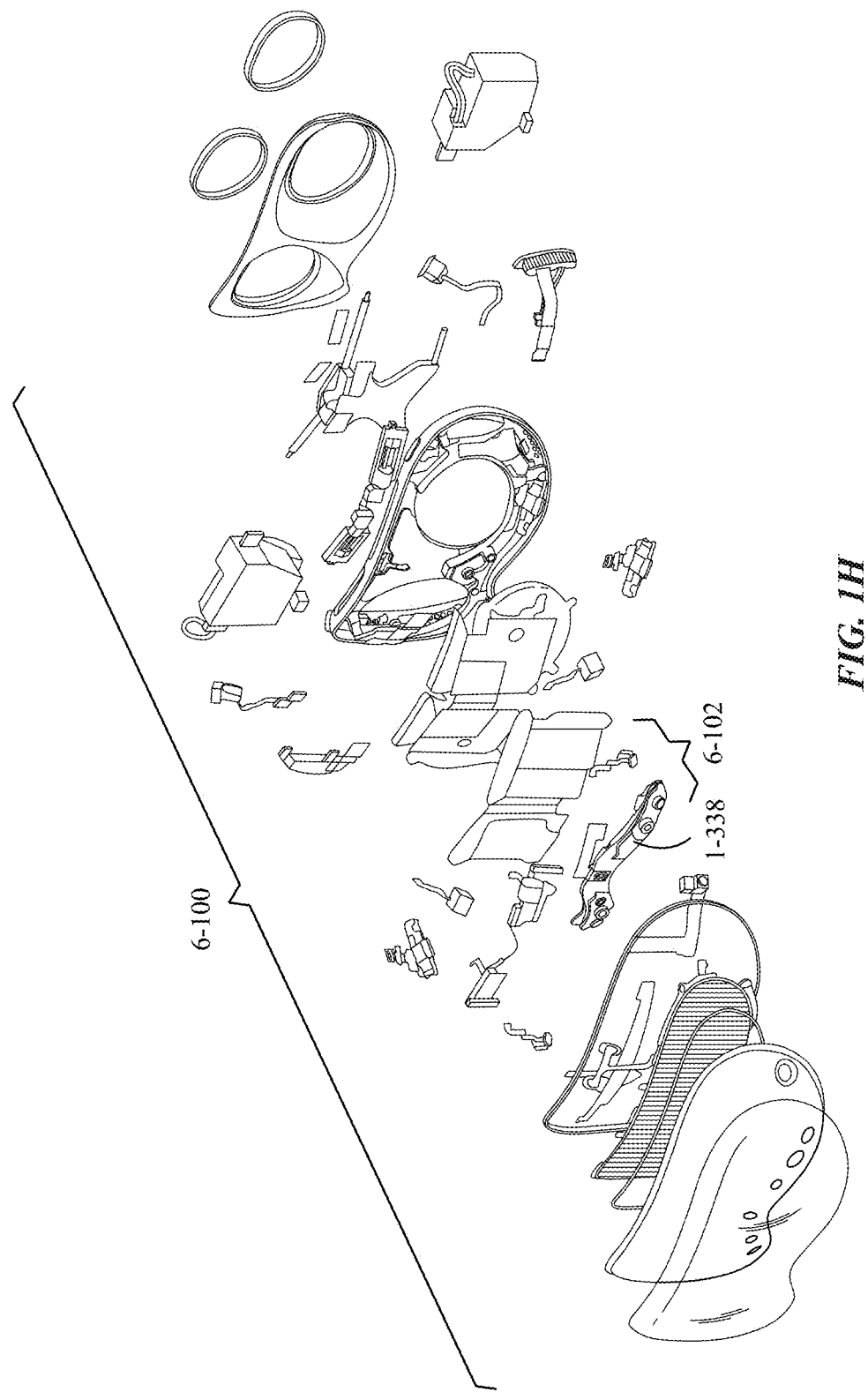
Figure 1I:
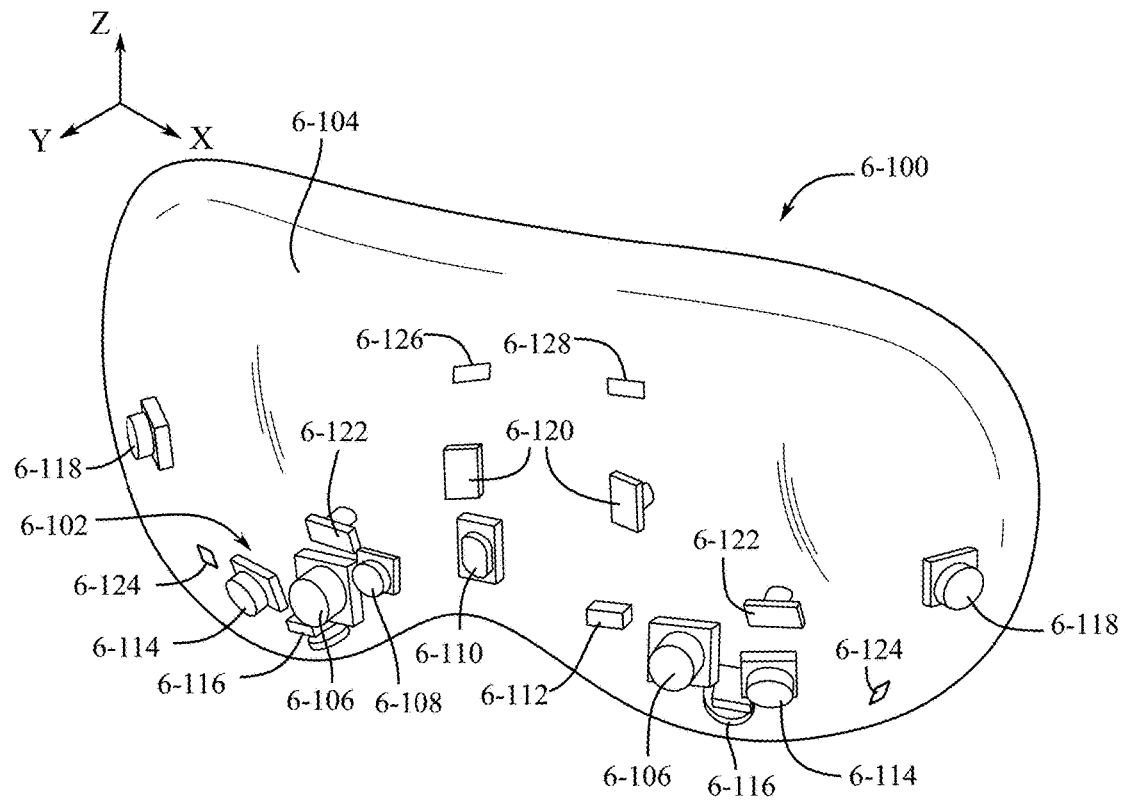
Figure 1J:
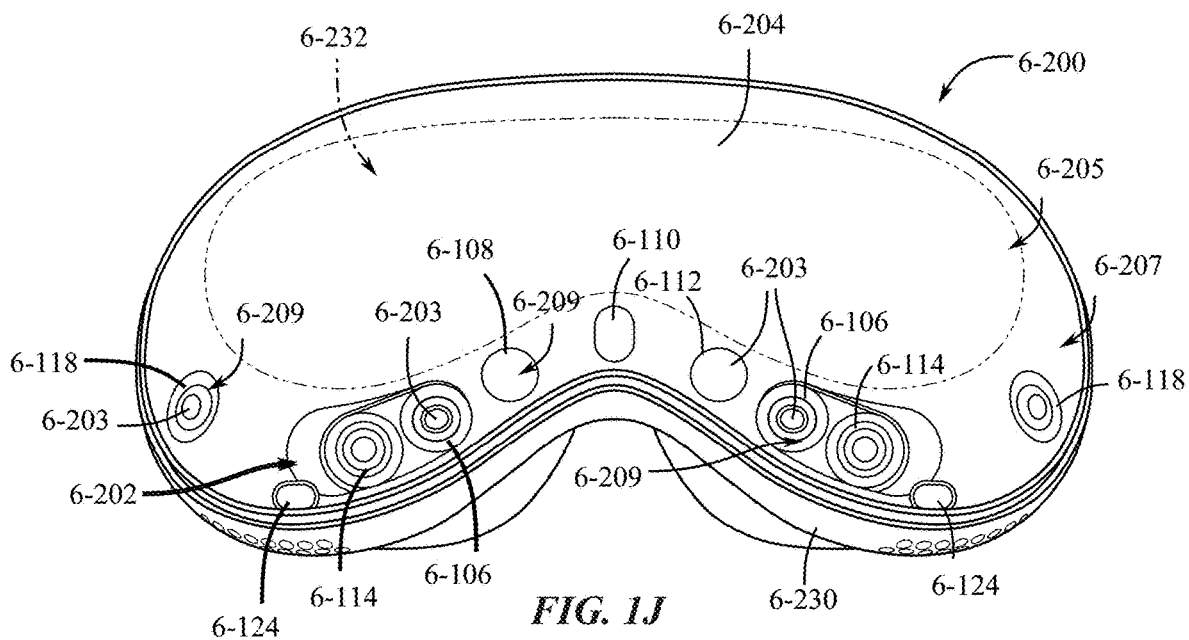
Figure 1K:
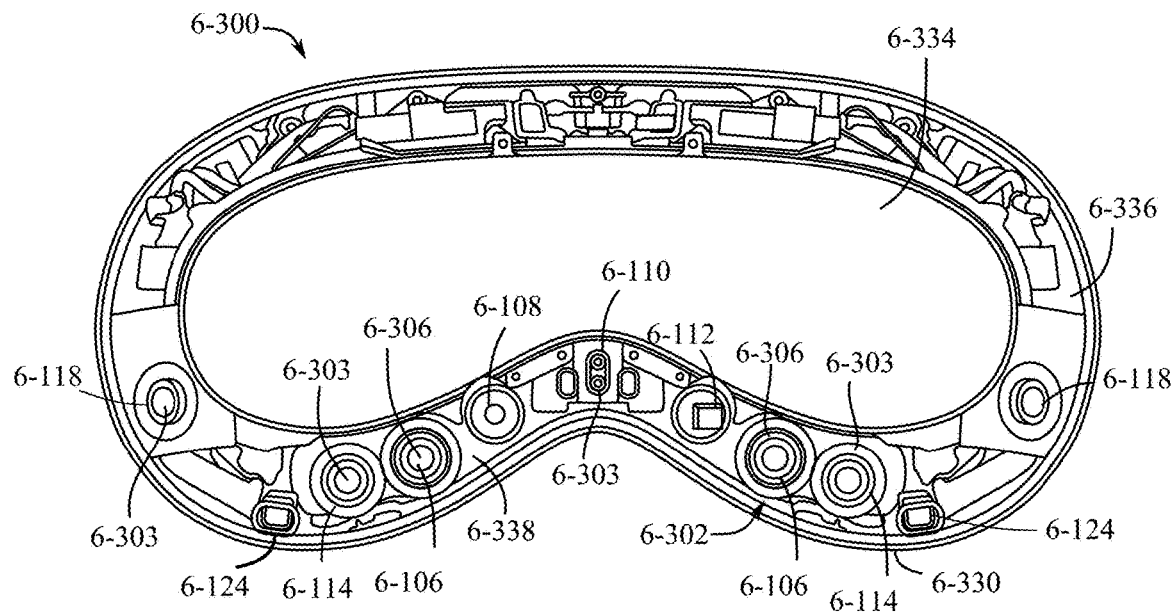
Figure 1L:
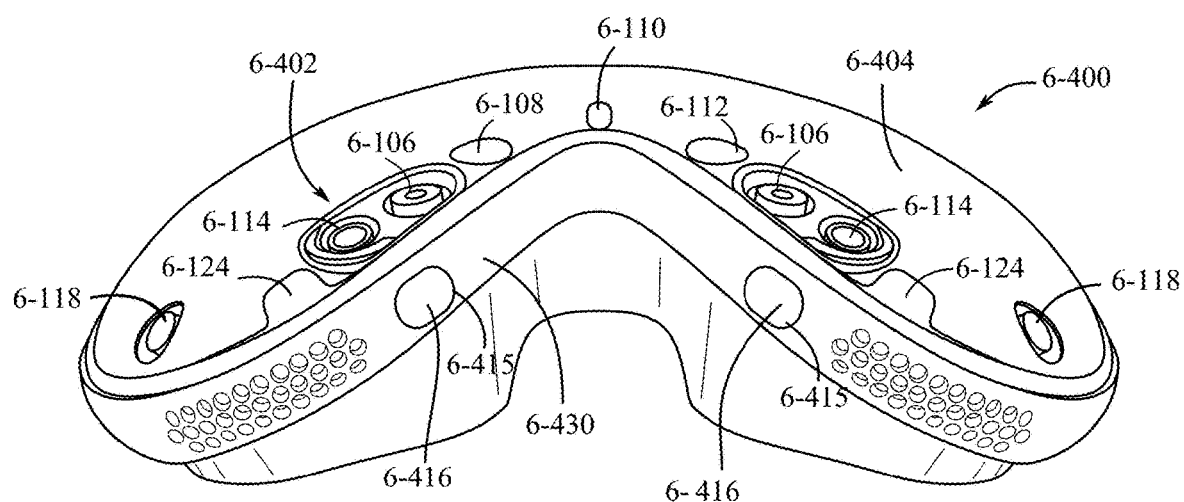
Figure 1M:
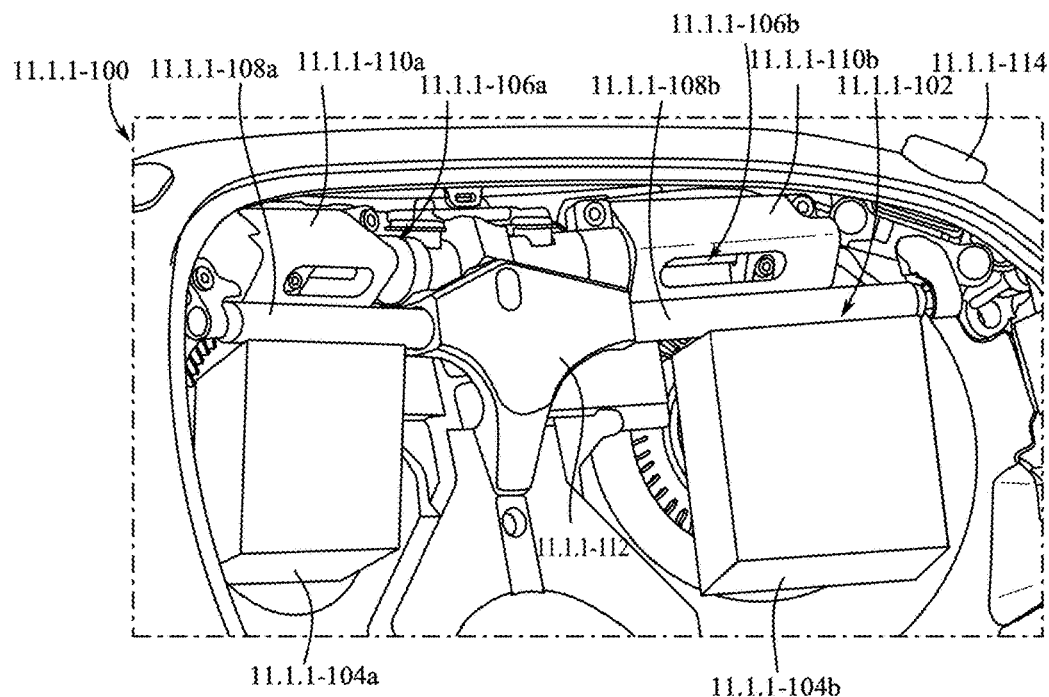
Figure 1N:
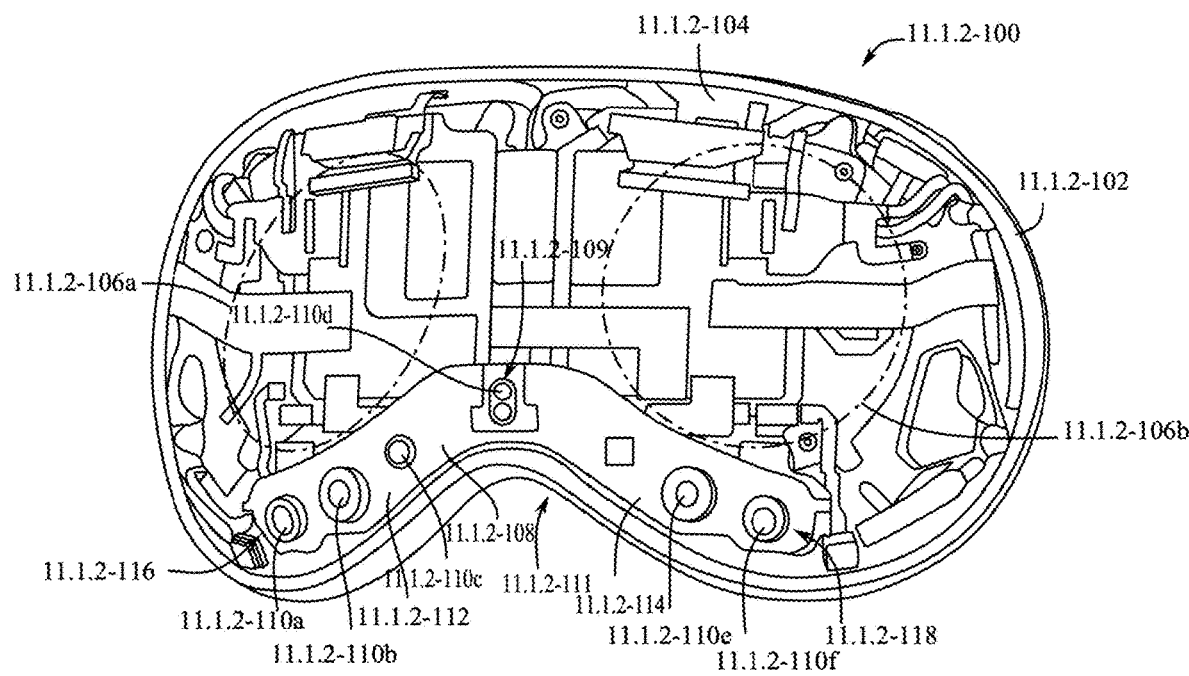
Figure 1O:
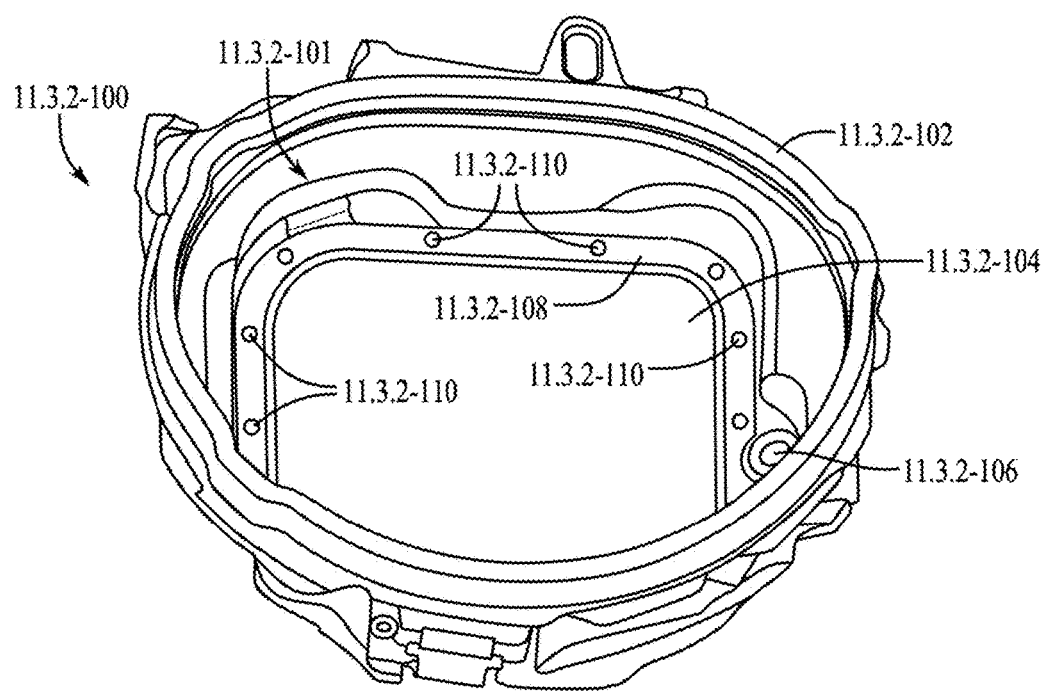
Figure 1P:
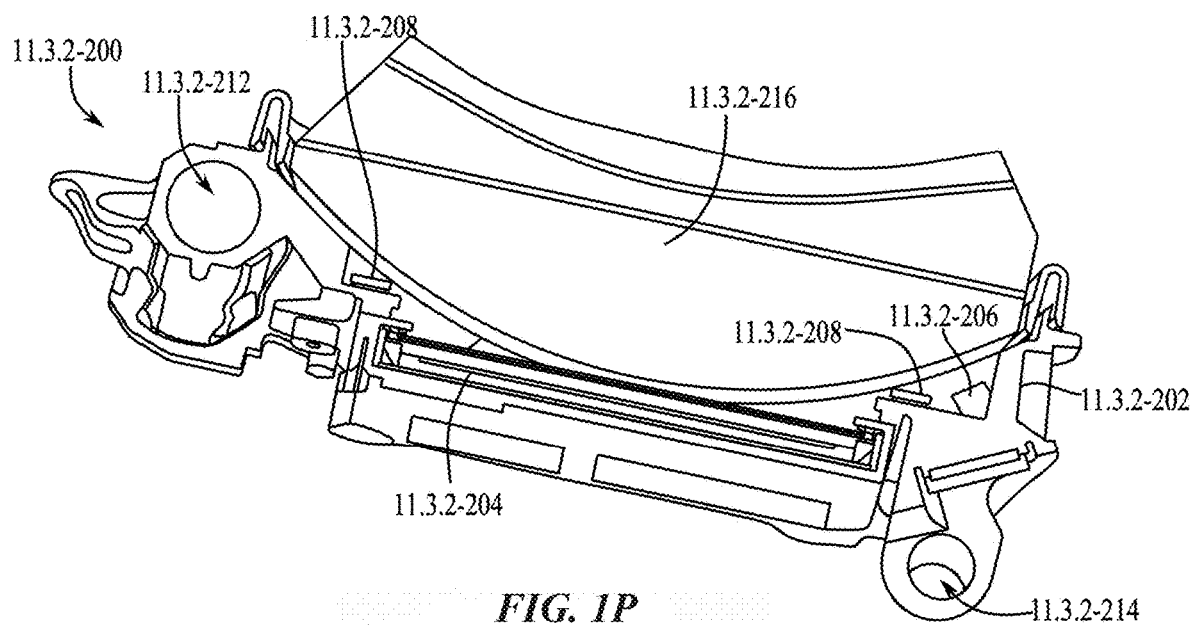

FIGS. 1A-1P illustrate various examples of a computer system that is used to perform the methods and provide audio, visual and/or haptic feedback as part of user interfaces described herein. In some embodiments, the computer system includes one or more display generation components (e.g., first and second display assemblies 1-120*a*, 1-120*b* and/or first and second optical modules 11.1.1-104*a* and 11.1.1-104*b*) for displaying virtual elements and/or a representation of a physical environment to a user of the computer system, optionally generated based on detected events and/or user inputs detected by the computer system. User interfaces generated by the computer system are optionally corrected by one or more corrective lenses 11.3.2-216 that are optionally removably attached to one or more of the optical modules to enable the user interfaces to be more easily viewed by users who would otherwise use glasses or contacts to correct their vision. While many user interfaces illustrated herein show a single view of a user interface, user interfaces in a HMD are optionally displayed using two optical modules (e.g., first and second display assemblies 1-120*a*, 1-120*b* and/or first and second optical modules 11.1.1-104*a* and 11.1.1-104*b*), one for a user's right eye and a different one for a user's left eye, and slightly different images are presented to the two different eyes to generate the illusion of stereoscopic depth, the single view of the user interface would typically be either a right-eye or left-eye view and the depth effect is explained in the text or using other schematic charts or views. In some embodiments, the computer system includes one or more external displays (e.g., display assembly 1-108) for displaying status information for the computer system to the user of the computer system (when the computer system is not being worn) and/or to other people who are near the computer system, optionally generated based on detected events and/or user inputs detected by the computer system. In some embodiments, the computer system includes one or more audio output components (e.g., electronic component 1-112) for generating audio feedback, optionally generated based on detected events and/or user inputs detected by the computer system. In some embodiments, the computer system includes one or more input devices for detecting input such as one or more sensors (e.g., one or more sensors in sensor assembly 1-356, and/or FIG. 1I) for detecting information about a physical environment of the device which can be used (optionally in conjunction with one or more illuminators such as the illuminators described in FIG. 1I) to generate a digital passthrough image, capture visual media corresponding to the physical environment (e.g., photos and/or video), or determine a pose (e.g., position and/or orientation) of physical objects and/or surfaces in the physical environment so that virtual objects ban be placed based on a detected pose of physical objects and/or surfaces. In some embodiments, the computer system includes one or more input devices for detecting input such as one or more sensors for detecting hand position and/or movement (e.g., one or more sensors in sensor assembly 1-356, and/or FIG. 1I) that can be used (optionally in conjunction with one or more illuminators such as the illuminators 6-124 described in FIG. 1I) to determine when one or more air gestures have been performed. In some embodiments, the computer system includes one or more input devices for detecting input such as one or more sensors for detecting eye movement (e.g., eye tracking and gaze tracking sensors in FIG. 1I) which can be used (optionally in conjunction with one or more lights such as lights 11.3.2-110 in FIG. 10) to determine attention or gaze position and/or gaze movement which can optionally be used to detect gaze-only inputs based on gaze movement and/or dwell. A combination of the various sensors described above can be used to determine user facial expressions and/or hand movements for use in generating an avatar or representation of the user such as an anthropomorphic avatar or representation for use in a real-time communication session where the avatar has facial expressions, hand movements, and/or body movements that are based on or similar to detected facial expressions, hand movements, and/or body movements of a user of the device. Gaze and/or attention information is, optionally, combined with hand tracking information to determine interactions between the user and one or more user interfaces based on direct and/or indirect inputs such as air gestures or inputs that use one or more hardware input devices such as one or more buttons (e.g., first button 1-128, button 11.1.1-114, second button 1-132, and or dial or button 1-328), knobs (e.g., first button 1-128, button 11.1.1-114, and/or dial or button 1-328), digital crowns (e.g., first button 1-128 which is depressible and twistable or rotatable, button 11.1.1-114, and/or dial or button 1-328), trackpads, touch screens, keyboards, mice and/or other input devices. One or more buttons (e.g., first button 1-128, button 11.1.1-114, second button 1-132, and or dial or button 1-328) are optionally used to perform system operations such as recentering content in three-dimensional environment that is visible to a user of the device, displaying a home user interface for launching applications, starting real-time communication sessions, or initiating display of virtual three-dimensional backgrounds. Knobs or digital crowns (e.g., first button 1-128 which is depressible and twistable or rotatable, button 11.1.1-114, and/or dial or button 1-328) are optionally rotatable to adjust parameters of the visual content such as a level of immersion of a virtual three-dimensional environment (e.g., a degree to which virtual-content occupies the viewport of the user into the three-dimensional environment) or other parameters associated with the three-dimensional environment and the virtual content that is displayed via the optical modules (e.g., first and second display assemblies 1-120a, 1-120b and/or first and second optical modules 11.1.1-104a and 11.1.1-104b).

FIG. 1B illustrates a front, top, perspective view of an example of a head-mountable display (HMD) device 1-100 configured to be donned by a user and provide virtual and altered/mixed reality (VR/AR) experiences. The HMD 1-100 can include a display unit 1-102 or assembly, an electronic strap assembly 1-104 connected to and extending from the display unit 1-102, and a band assembly 1-106 secured at either end to the electronic strap assembly 1-104. The electronic strap assembly 1-104 and the band 1-106 can be part of a retention assembly configured to wrap around a user's head to hold the display unit 1-102 against the face of the user.

In at least one example, the band assembly 1-106 can include a first band 1-116 configured to wrap around the rear side of a user's head and a second band 1-117 configured to extend over the top of a user's head. The second strap can extend between first and second electronic straps 1-105a, 1-105b of the electronic strap assembly 1-104 as shown. The strap assembly 1-104 and the band assembly 1-106 can be part of a securement mechanism extending rearward from the display unit 1-102 and configured to hold the display unit 1-102 against a face of a user.

In at least one example, the securement mechanism includes a first electronic strap 1-105a including a first proximal end 1-134 coupled to the display unit 1-102, for example a housing 1-150 of the display unit 1-102, and a first distal end 1-136 opposite the first proximal end 1-134. The securement mechanism can also include a second electronic strap 1-105b including a second proximal end 1-138 coupled to the housing 1-150 of the display unit 1-102 and a second distal end 1-140 opposite the second proximal end 1-138. The securement mechanism can also include the first band 1-116 including a first end 1-142 coupled to the first distal end 1-136 and a second end 1-144 coupled to the second distal end 1-140 and the second band 1-117 extending between the first electronic strap 1-105a and the second electronic strap 1-105b. The straps 1-105a-b and band 1-116 can be coupled via connection mechanisms or assemblies 1-114. In at least one example, the second band 1-117 includes a first end 1-146 coupled to the first electronic strap 1-105a between the first proximal end 1-134 and the first distal end 1-136 and a second end 1-148 coupled to the second electronic strap 1-105b between the second proximal end 1-138 and the second distal end 1-140.

In at least one example, the first and second electronic straps 1-105a-b include plastic, metal, or other structural materials forming the shape the substantially rigid straps 1-105a-b. In at least one example, the first and second bands 1-116, 1-117 are formed of elastic, flexible materials including woven textiles, rubbers, and the like. The first and second bands 1-116, 1-117 can be flexible to conform to the shape of the user' head when donning the HMD 1-100.

In at least one example, one or more of the first and second electronic straps 1-105a-b can define internal strap volumes and include one or more electronic components disposed in the internal strap volumes. In one example, as shown in FIG. 1B, the first electronic strap 1-105a can include an electronic component 1-112. In one example, the electronic component 1-112 can include a speaker. In one example, the electronic component 1-112 can include a computing component such as a processor.

In at least one example, the housing 1-150 defines a first, front-facing opening 1-152. The front-facing opening is labeled in dotted lines at 1-152 in FIG. 1B because the display assembly 1-108 is disposed to occlude the first opening 1-152 from view when the HMD 1-100 is assembled. The housing 1-150 can also define a rear-facing second opening 1-154. The housing 1-150 also defines an internal volume between the first and second openings 1-152, 1-154. In at least one example, the HMD 1-100 includes the display assembly 1-108, which can include a front cover and display screen (shown in other figures) disposed in or across the front opening 1-152 to occlude the front opening 1-152. In at least one example, the display screen of the display assembly 1-108, as well as the display assembly 1-108 in general, has a curvature configured to follow the curvature of a user's face. The display screen of the display assembly 1-108 can be curved as shown to compliment the user's facial features and general curvature from one side of the face to the other, for example from left to right and/or from top to bottom where the display unit 1-102 is pressed.

In at least one example, the housing 1-150 can define a first aperture 1-126 between the first and second openings 1-152, 1-154 and a second aperture 1-130 between the first and second openings 1-152, 1-154. The HMD 1-100 can also include a first button 1-128 disposed in the first aperture 1-126 and a second button 1-132 disposed in the second aperture 1-130. The first and second buttons 1-128, 1-132 can be depressible through the respective apertures 1-126, 1-130. In at least one example, the first button 1-126 and/or second button 1-132 can be twistable dials as well as depressible buttons. In at least one example, the first button 1-128 is a depressible and twistable dial button and the second button 1-132 is a depressible button.

FIG. 1C illustrates a rear, perspective view of the HMD 1-100. The HMD 1-100 can include a light seal 1-110 extending rearward from the housing 1-150 of the display assembly 1-108 around a perimeter of the housing 1-150 as shown. The light seal 1-110 can be configured to extend from the housing 1-150 to the user's face around the user's eyes to block external light from being visible. In one example, the HMD 1-100 can include first and second display assemblies 1-120a, 1-120b disposed at or in the rearward facing second opening 1-154 defined by the housing 1-150 and/or disposed in the internal volume of the housing 1-150 and configured to project light through the second opening 1-154. In at least one example, each display assembly 1-120a-b can include respective display screens 1-122a, 1-122b configured to project light in a rearward direction through the second opening 1-154 toward the user's eyes.

In at least one example, referring to both FIGS. 1B and 1C, the display assembly 1-108 can be a front-facing, forward display assembly including a display screen configured to project light in a first, forward direction and the rear facing display screens 1-122a-b can be configured to project light in a second, rearward direction opposite the first direction. As noted above, the light seal 1-110 can be configured to block light external to the HMD 1-100 from reaching the user's eyes, including light projected by the forward facing display screen of the display assembly 1-108 shown in the front perspective view of FIG. 1B. In at least one example, the HMD 1-100 can also include a curtain 1-124 occluding the second opening 1-154 between the housing 1-150 and the rear-facing display assemblies 1-120a-b. In at least one example, the curtain 1-124 can be elastic or at least partially elastic.

Any of the features, components, and/or parts, including the arrangements and configurations thereof shown in FIGS. 1B and 1C can be included, either alone or in any combination, in any of the other examples of devices, features, components, and parts shown in FIGS. 1D-1F and described herein. Likewise, any of the features, components, and/or parts, including the arrangements and configurations thereof shown and described with reference to FIGS. 1D-1F can be included, either alone or in any combination, in the example of the devices, features, components, and parts shown in FIGS. 1B and 1C.

FIG. 1D illustrates an exploded view of an example of an HMD 1-200 including various portions or parts thereof separated according to the modularity and selective coupling of those parts. For example, the HMD 1-200 can include a band 1-216 which can be selectively coupled to first and second electronic straps 1-205a, 1-205b. The first securement strap 1-205a can include a first electronic component 1-212a and the second securement strap 1-205b can include a second electronic component 1-212b. In at least one example, the first and second straps 1-205a-b can be removably coupled to the display unit 1-202.

In addition, the HMD 1-200 can include a light seal 1-210 configured to be removably coupled to the display unit 1-202. The HMD 1-200 can also include lenses 1-218 which can be removably coupled to the display unit 1-202, for example over first and second display assemblies including display screens. The lenses 1-218 can include customized prescription lenses configured for corrective vision. As noted, each part shown in the exploded view of FIG. 1D and described above can be removably coupled, attached, re-attached, and changed out to update parts or swap out parts for different users. For example, bands such as the band 1-216, light seals such as the light seal 1-210, lenses such as the lenses 1-218, and electronic straps such as the straps 1-205a-b can be swapped out depending on the user such that these parts are customized to fit and correspond to the individual user of the HMD 1-200.

Any of the features, components, and/or parts, including the arrangements and configurations thereof shown in FIG. 1D can be included, either alone or in any combination, in any of the other examples of devices, features, components, and parts shown in FIGS. 1, 1C, and 1E-1F and described herein. Likewise, any of the features, components, and/or parts, including the arrangements and configurations thereof shown and described with reference to FIGS. 1B, 1C, and 1E-1F can be included, either alone or in any combination, in the example of the devices, features, components, and parts shown in FIG. 1D.

FIG. 1E illustrates an exploded view of an example of a display unit 1-306 of a HMD. The display unit 1-306 can include a front display assembly 1-308, a frame/housing assembly 1-350, and a curtain assembly 1-324. The display unit 1-306 can also include a sensor assembly 1-356, logic board assembly 1-358, and cooling assembly 1-360 disposed between the frame assembly 1-350 and the front display assembly 1-308. In at least one example, the display unit 1-306 can also include a rear-facing display assembly 1-320 including first and second rear-facing display screens 1-322a, 1-322b disposed between the frame 1-350 and the curtain assembly 1-324.

In at least one example, the display unit 1-306 can also include a motor assembly 1-362 configured as an adjustment mechanism for adjusting the positions of the display screens 1-322a-b of the display assembly 1-320 relative to the frame 1-350. In at least one example, the display assembly 1-320 is mechanically coupled to the motor assembly 1-362, with at least one motor for each display screen 1-322a-b, such that the motors can translate the display screens 1-322a-b to match an interpupillary distance of the user's eyes.

In at least one example, the display unit 1-306 can include a dial or button 1-328 depressible relative to the frame 1-350 and accessible to the user outside the frame 1-350. The button 1-328 can be electronically connected to the motor assembly 1-362 via a controller such that the button 1-328 can be manipulated by the user to cause the motors of the motor assembly 1-362 to adjust the positions of the display screens 1-322a-b.

Any of the features, components, and/or parts, including the arrangements and configurations thereof shown in FIG. 1E can be included, either alone or in any combination, in any of the other examples of devices, features, components, and parts shown in FIGS. 1B-1D and 1F and described herein. Likewise, any of the features, components, and/or parts, including the arrangements and configurations thereof shown and described with reference to FIGS. 1B-1D and 1F can be included, either alone or in any combination, in the example of the devices, features, components, and parts shown in FIG. 1E.

FIG. 1F illustrates an exploded view of another example of a display unit 1-406 of a HMD device similar to other HMD devices described herein. The display unit 1-406 can include a front display assembly 1-402, a sensor assembly 1-456, a logic board assembly 1-458, a cooling assembly 1-460, a frame assembly 1-450, a rear-facing display assembly 1-421, and a curtain assembly 1-424. The display unit 1-406 can also include a motor assembly 1-462 for adjusting the positions of first and second display sub-assemblies 1-420a, 1-420b of the rear-facing display assembly 1-421, including first and second respective display screens for interpupillary adjustments, as described above.

The various parts, systems, and assemblies shown in the exploded view of FIG. 1F are described in greater detail herein with reference to FIGS. 1B-1E as well as subsequent figures referenced in the present disclosure. The display unit 1-406 shown in FIG. 1F can be assembled and integrated with the securement mechanisms shown in FIGS. 1B-1E, including the electronic straps, bands, and other components including light seals, connection assemblies, and so forth.

Any of the features, components, and/or parts, including the arrangements and configurations thereof shown in FIG. 1F can be included, either alone or in any combination, in any of the other examples of devices, features, components, and parts shown in FIGS. 1B-1E and described herein. Likewise, any of the features, components, and/or parts, including the arrangements and configurations thereof shown and described with reference to FIGS. 1B-1E can be included, either alone or in any combination, in the example of the devices, features, components, and parts shown in FIG. 1F.

FIG. 1G illustrates a perspective, exploded view of a front cover assembly 3-100 of an HMD device described herein, for example the front cover assembly 3-1 of the HMD 3-100 shown in FIG. 1G or any other HMD device shown and described herein. The front cover assembly 3-100 shown in FIG. 1G can include a transparent or semi-transparent cover 3-102, shroud 3-104 (or "canopy"), adhesive layers 3-106, display assembly 3-108 including a lenticular lens panel or array 3-110, and a structural trim 3-112. The adhesive layer 3-106 can secure the shroud 3-104 and/or transparent cover 3-102 to the display assembly 3-108 and/or the trim 3-112. The trim 3-112 can secure the various components of the front cover assembly 3-100 to a frame or chassis of the HMD device.

In at least one example, as shown in FIG. 1G, the transparent cover 3-102, shroud 3-104, and display assembly 3-108, including the lenticular lens array 3-110, can be curved to accommodate the curvature of a user's face. The transparent cover 3-102 and the shroud 3-104 can be curved in two or three dimensions, e.g., vertically curved in the Z-direction in and out of the Z-X plane and horizontally curved in the X-direction in and out of the Z-X plane. In at least one example, the display assembly 3-108 can include the lenticular lens array 3-110 as well as a display panel having pixels configured to project light through the shroud 3-104 and the transparent cover 3-102. The display assembly 3-108 can be curved in at least one direction, for example the horizontal direction, to accommodate the curvature of a user's face from one side (e.g., left side) of the face to the other (e.g., right side). In at least one example, each layer or component of the display assembly 3-108, which will be shown in subsequent figures and described in more detail, but which can include the lenticular lens array 3-110 and a display layer, can be similarly or concentrically curved in the horizontal direction to accommodate the curvature of the user's face.

In at least one example, the shroud 3-104 can include a transparent or semi-transparent material through which the display assembly 3-108 projects light. In one example, the shroud 3-104 can include one or more opaque portions, for example opaque ink-printed portions or other opaque film portions on the rear surface of the shroud 3-104. The rear surface can be the surface of the shroud 3-104 facing the user's eyes when the HMD device is donned. In at least one example, opaque portions can be on the front surface of the shroud 3-104 opposite the rear surface. In at least one example, the opaque portion or portions of the shroud 3-104 can include perimeter portions visually hiding any components around an outside perimeter of the display screen of the display assembly 3-108. In this way, the opaque portions of the shroud hide any other components, including electronic components, structural components, and so forth, of the HMD device that would otherwise be visible through the transparent or semi-transparent cover 3-102 and/or shroud 3-104.

In at least one example, the shroud 3-104 can define one or more apertures transparent portions 3-120 through which sensors can send and receive signals. In one example, the portions 3-120 are apertures through which the sensors can extend or send and receive signals. In one example, the portions 3-120 are transparent portions, or portions more transparent than surrounding semi-transparent or opaque portions of the shroud, through which sensors can send and receive signals through the shroud and through the transparent cover 3-102. In one example, the sensors can include cameras, IR sensors, LUX sensors, or any other visual or non-visual environmental sensors of the HMD device.

Any of the features, components, and/or parts, including the arrangements and configurations thereof shown in FIG. 1G can be included, either alone or in any combination, in any of the other examples of devices, features, components, and parts described herein. Likewise, any of the features, components, and/or parts, including the arrangements and configurations thereof shown and described herein can be included, either alone or in any combination, in the example of the devices, features, components, and parts shown in FIG. 1G.

FIG. 1H illustrates an exploded view of an example of an HMD device 6-100. The HMD device 6-100 can include a sensor array or system 6-102 including one or more sensors, cameras, projectors, and so forth mounted to one or more components of the HMD 6-100. In at least one example, the sensor system 6-102 can include a bracket 1-338 on which one or more sensors of the sensor system 6-102 can be fixed/secured.

FIG. 1I illustrates a portion of an HMD device 6-100 including a front transparent cover 6-104 and a sensor system 6-102. The sensor system 6-102 can include a number of different sensors, emitters, receivers, including cameras, IR sensors, projectors, and so forth. The transparent cover 6-104 is illustrated in front of the sensor system 6-102 to illustrate relative positions of the various sensors and emitters as well as the orientation of each sensor/emitter of the system 6-102. As referenced herein, "sideways," "side," "lateral," "horizontal," and other similar terms refer to orientations or directions as indicated by the X-axis shown in FIG. 1J. Terms such as "vertical," "up," "down," and similar terms refer to orientations or directions as indicated by the Z-axis shown in FIG. 1J. Terms such as "frontward," "rearward," "forward," "backward," and similar terms refer to orientations or directions as indicated by the Y-axis shown in FIG. 1J.

In at least one example, the transparent cover 6-104 can define a front, external surface of the HMD device 6-100 and the sensor system 6-102, including the various sensors and components thereof, can be disposed behind the cover 6-104 in the Y-axis/direction. The cover 6-104 can be transparent or semi-transparent to allow light to pass through the cover 6-104, both light detected by the sensor system 6-102 and light emitted thereby.

As noted elsewhere herein, the HMD device 6-100 can include one or more controllers including processors for electrically coupling the various sensors and emitters of the sensor system 6-102 with one or more mother boards, processing units, and other electronic devices such as display screens and the like. In addition, as will be shown in more detail below with reference to other figures, the various sensors, emitters, and other components of the sensor system 6-102 can be coupled to various structural frame members, brackets, and so forth of the HMD device 6-100 not shown in FIG. 1I. FIG. 1I shows the components of the sensor system 6-102 unattached and un-coupled electrically from other components for the sake of illustrative clarity.

In at least one example, the device can include one or more controllers having processors configured to execute instructions stored on memory components electrically coupled to the processors. The instructions can include, or cause the processor to execute, one or more algorithms for self-correcting angles and positions of the various cameras described herein overtime with use as the initial positions, angles, or orientations of the cameras get bumped or deformed due to unintended drop events or other events.

In at least one example, the sensor system 6-102 can include one or more scene cameras 6-106. The system 6-102 can include two scene cameras 6-102 disposed on either side of the nasal bridge or arch of the HMD device 6-100 such that each of the two cameras 6-106 correspond generally in position with left and right eyes of the user behind the cover 6-103. In at least one example, the scene cameras 6-106 are oriented generally forward in the Y-direction to capture images in front of the user during use of the HMD 6-100. In at least one example, the scene cameras are color cameras and provide images and content for MR video pass through to the display screens facing the user's eyes when using the HMD device 6-100. The scene cameras 6-106 can also be used for environment and object reconstruction.

In at least one example, the sensor system 6-102 can include a first depth sensor 6-108 pointed generally forward in the Y-direction. In at least one example, the first depth sensor 6-108 can be used for environment and object reconstruction as well as user hand and body tracking. In at least one example, the sensor system 6-102 can include a second depth sensor 6-110 disposed centrally along the width (e.g., along the X-axis) of the HMD device 6-100. For example, the second depth sensor 6-110 can be disposed above the central nasal bridge or accommodating features over the nose of the user when donning the HMD 6-100. In at least one example, the second depth sensor 6-110 can be used for environment and object reconstruction as well as hand and body tracking. In at least one example, the second depth sensor can include a LIDAR sensor.

In at least one example, the sensor system 6-102 can include a depth projector 6-112 facing generally forward to project electromagnetic waves, for example in the form of a predetermined pattern of light dots, out into and within a field of view of the user and/or the scene cameras 6-106 or a field of view including and beyond the field of view of the user and/or scene cameras 6-106. In at least one example, the depth projector can project electromagnetic waves of light in the form of a dotted light pattern to be reflected off objects and back into the depth sensors noted above, including the depth sensors 6-108, 6-110. In at least one example, the depth projector 6-112 can be used for environment and object reconstruction as well as hand and body tracking.

In at least one example, the sensor system 6-102 can include downward facing cameras 6-114 with a field of view pointed generally downward relative to the HDM device 6-100 in the Z-axis. In at least one example, the downward cameras 6-114 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The downward cameras 6-114, for example, can be used to capture facial expressions and movements for the face of the user below the HMD device 6-100, including the cheeks, mouth, and chin.

In at least one example, the sensor system 6-102 can include jaw cameras 6-116. In at least one example, the jaw cameras 6-116 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The jaw cameras 6-116, for example, can be used to capture facial expressions and movements for the face of the user below the HMD device 6-100, including the user's jaw, cheeks, mouth, and chin. for hand and body tracking, headset tracking, and facial avatar In at least one example, the sensor system 6-102 can include side cameras 6-118. The side cameras 6-118 can be oriented to capture side views left and right in the X-axis or direction relative to the HMD device 6-100. In at least one example, the side cameras 6-118 can be used for hand and body tracking, headset tracking, and facial avatar detection and re-creation.

In at least one example, the sensor system 6-102 can include a plurality of eye tracking and gaze tracking sensors for determining an identity, status, and gaze direction of a user's eyes during and/or before use. In at least one example, the eye/gaze tracking sensors can include nasal eye cameras 6-120 disposed on either side of the user's nose and adjacent the user's nose when donning the HMD device 6-100. The eye/gaze sensors can also include bottom eye cameras 6-122 disposed below respective user eyes for capturing images of the eyes for facial avatar detection and creation, gaze tracking, and iris identification functions.

In at least one example, the sensor system 6-102 can include infrared illuminators 6-124 pointed outward from the HMD device 6-100 to illuminate the external environment and any object therein with IR light for IR detection with one or more IR sensors of the sensor system 6-102. In at least one example, the sensor system 6-102 can include a flicker sensor 6-126 and an ambient light sensor 6-128. In at least one example, the flicker sensor 6-126 can detect overhead light refresh rates to avoid display flicker. In one example, the infrared illuminators 6-124 can include light emitting diodes and can be used especially for low light environments for illuminating user hands and other objects in low light for detection by infrared sensors of the sensor system 6-102.

In at least one example, multiple sensors, including the scene cameras 6-106, the downward cameras 6-114, the jaw cameras 6-116, the side cameras 6-118, the depth projector 6-112, and the depth sensors 6-108, 6-110 can be used in combination with an electrically coupled controller to combine depth data with camera data for hand tracking and for size determination for better hand tracking and object recognition and tracking functions of the HMD device 6-100. In at least one example, the downward cameras 6-114, jaw cameras 6-116, and side cameras 6-118 described above and shown in FIG. 1I can be wide angle cameras operable in the visible and infrared spectrums. In at least one example, these cameras 6-114, 6-116, 6-118 can operate only in black and white light detection to simplify image processing and gain sensitivity.

Any of the features, components, and/or parts, including the arrangements and configurations thereof shown in FIG. 1I can be included, either alone or in any combination, in any of the other examples of devices, features, components, and parts shown in FIGS. 1J-1L and described herein.

Likewise, any of the features, components, and/or parts, including the arrangements and configurations thereof shown and described with reference to FIGS. 1J-1L can be included, either alone or in any combination, in the example of the devices, features, components, and parts shown in FIG. 1I.

FIG. 1J illustrates a lower perspective view of an example of an HMD 6-200 including a cover or shroud 6-204 secured to a frame 6-230. In at least one example, the sensors 6-203 of the sensor system 6-202 can be disposed around a perimeter of the HDM 6-200 such that the sensors 6-203 are outwardly disposed around a perimeter of a display region or area 6-232 so as not to obstruct a view of the displayed light. In at least one example, the sensors can be disposed behind the shroud 6-204 and aligned with transparent portions of the shroud allowing sensors and projectors to allow light back and forth through the shroud 6-204. In at least one example, opaque ink or other opaque material or films/layers can be disposed on the shroud 6-204 around the display area 6-232 to hide components of the HMD 6-200 outside the display area 6-232 other than the transparent portions defined by the opaque portions, through which the sensors and projectors send and receive light and electromagnetic signals during operation. In at least one example, the shroud 6-204 allows light to pass therethrough from the display (e.g., within the display region 6-232) but not radially outward from the display region around the perimeter of the display and shroud 6-204.

In some examples, the shroud 6-204 includes a transparent portion 6-205 and an opaque portion 6-207, as described above and elsewhere herein. In at least one example, the opaque portion 6-207 of the shroud 6-204 can define one or more transparent regions 6-209 through which the sensors 6-203 of the sensor system 6-202 can send and receive signals. In the illustrated example, the sensors 6-203 of the sensor system 6-202 sending and receiving signals through the shroud 6-204, or more specifically through the transparent regions 6-209 of the (or defined by) the opaque portion 6-207 of the shroud 6-204 can include the same or similar sensors as those shown in the example of FIG. 1I, for example depth sensors 6-108 and 6-110, depth projector 6-112, first and second scene cameras 6-106, first and second downward cameras 6-114, first and second side cameras 6-118, and first and second infrared illuminators 6-124. These sensors are also shown in the examples of FIGS. 1K and 1L. Other sensors, sensor types, number of sensors, and relative positions thereof can be included in one or more other examples of HMDs.

Any of the features, components, and/or parts, including the arrangements and configurations thereof shown in FIG. 1J can be included, either alone or in any combination, in any of the other examples of devices, features, components, and parts shown in FIGS. 1I and 1K-1L and described herein. Likewise, any of the features, components, and/or parts, including the arrangements and configurations thereof shown and described with reference to FIGS. 1I and 1K-1L can be included, either alone or in any combination, in the example of the devices, features, components, and parts shown in FIG. 1J.

FIG. 1K illustrates a front view of a portion of an example of an HMD device 6-300 including a display 6-334, brackets 6-336, 6-338, and frame or housing 6-330. The example shown in FIG. 1K does not include a front cover or shroud in order to illustrate the brackets 6-336, 6-338. For example, the shroud 6-204 shown in FIG. 1J includes the opaque portion 6-207 that would visually cover/block a view of anything outside (e.g., radially/peripherally outside) the display/display region 6-334, including the sensors 6-303 and bracket 6-338.

In at least one example, the various sensors of the sensor system 6-302 are coupled to the brackets 6-336, 6-338. In at least one example, the scene cameras 6-306 include tight tolerances of angles relative to one another. For example, the tolerance of mounting angles between the two scene cameras 6-306 can be 0.5 degrees or less, for example 0.3 degrees or less. In order to achieve and maintain such a tight tolerance, in one example, the scene cameras 6-306 can be mounted to the bracket 6-338 and not the shroud. The bracket can include cantilevered arms on which the scene cameras 6-306 and other sensors of the sensor system 6-302 can be mounted to remain un-deformed in position and orientation in the case of a drop event by a user resulting in any deformation of the other bracket 6-226, housing 6-330, and/or shroud.

Any of the features, components, and/or parts, including the arrangements and configurations thereof shown in FIG. 1K can be included, either alone or in any combination, in any of the other examples of devices, features, components, and parts shown in FIGS. 1I-1J and 1L and described herein. Likewise, any of the features, components, and/or parts, including the arrangements and configurations thereof shown and described with reference to FIGS. 1I-1J and 1L can be included, either alone or in any combination, in the example of the devices, features, components, and parts shown in FIG. 1K.

FIG. 1L illustrates a bottom view of an example of an HMD 6-400 including a front display/cover assembly 6-404 and a sensor system 6-402. The sensor system 6-402 can be similar to other sensor systems described above and elsewhere herein, including in reference to FIGS. 1I-1K. In at least one example, the jaw cameras 6-416 can be facing downward to capture images of the user's lower facial features. In one example, the jaw cameras 6-416 can be coupled directly to the frame or housing 6-430 or one or more internal brackets directly coupled to the frame or housing 6-430 shown. The frame or housing 6-430 can include one or more apertures/openings 6-415 through which the jaw cameras 6-416 can send and receive signals.

Any of the features, components, and/or parts, including the arrangements and configurations thereof shown in FIG. 1L can be included, either alone or in any combination, in any of the other examples of devices, features, components, and parts shown in FIGS. 1I-1K and described herein. Likewise, any of the features, components, and/or parts, including the arrangements and configurations thereof shown and described with reference to FIGS. 1I-1K can be included, either alone or in any combination, in the example of the devices, features, components, and parts shown in FIG. 1L.

FIG. 1M illustrates a rear perspective view of an inter-pupillary distance (IPD) adjustment system 11.1.1-102 including first and second optical modules 11.1.1-104*a-b* slidably engaging/coupled to respective guide-rods 11.1.1-108*a-b* and motors 11.1.1-110*a-b* of left and right adjustment subsystems 11.1.1-106*a-b*. The IPD adjustment system 11.1.1-102 can be coupled to a bracket 11.1.1-112 and include a button 11.1.1-114 in electrical communication with the motors 11.1.1-110*a-b*. In at least one example, the button 11.1.1-114 can electrically communicate with the first and second motors 11.1.1-110*a-b* via a processor or other circuitry components to cause the first and second motors 11.1.1-110*a-b* to activate and cause the first and second optical modules 11.1.1-104*a-b*, respectively, to change position relative to one another.

In at least one example, the first and second optical modules 11.1.1-104*a-b* can include respective display screens configured to project light toward the user's eyes when donning the HMD 11.1.1-100. In at least one example, the user can manipulate (e.g., depress and/or rotate) the button 11.1.1-114 to activate a positional adjustment of the optical modules 11.1.1-104*a-b* to match the inter-pupillary distance of the user's eyes. The optical modules 11.1.1-104*a-b* can also include one or more cameras or other sensors/sensor systems for imaging and measuring the IPD of the user such that the optical modules 11.1.1-104*a-b* can be adjusted to match the IPD.

In one example, the user can manipulate the button 11.1.1-114 to cause an automatic positional adjustment of the first and second optical modules 11.1.1-104*a-b*. In one example, the user can manipulate the button 11.1.1-114 to cause a manual adjustment such that the optical modules 11.1.1-104*a-b* move further or closer away, for example when the user rotates the button 11.1.1-114 one way or the other, until the user visually matches her/his own IPD. In one example, the manual adjustment is electronically communicated via one or more circuits and power for the movements of the optical modules 11.1.1-104*a-b* via the motors 11.1.1-110*a-b* is provided by an electrical power source. In one example, the adjustment and movement of the optical modules 11.1.1-104*a-b* via a manipulation of the button 11.1.1-114 is mechanically actuated via the movement of the button 11.1.1-114.

Any of the features, components, and/or parts, including the arrangements and configurations thereof shown in FIG. 1M can be included, either alone or in any combination, in any of the other examples of devices, features, components, and parts shown in any other figures shown and described herein. Likewise, any of the features, components, and/or parts, including the arrangements and configurations thereof shown and described with reference to any other figure shown and described herein, either alone or in any combination, in the example of the devices, features, components, and parts shown in FIG. 1M.

FIG. 1N illustrates a front perspective view of a portion of an HMD 11.1.2-100, including an outer structural frame 11.1.2-102 and an inner or intermediate structural frame 11.1.2-104 defining first and second apertures 11.1.2-106*a*, 11.1.2-106*b*. The apertures 11.1.2-106*a-b* are shown in dotted lines in FIG. 1N because a view of the apertures 11.1.2-106*a-b* can be blocked by one or more other components of the HMD 11.1.2-100 coupled to the inner frame 11.1.2-104 and/or the outer frame 11.1.2-102, as shown. In at least one example, the HMD 11.1.2-100 can include a first mounting bracket 11.1.2-108 coupled to the inner frame 11.1.2-104. In at least one example, the mounting bracket 11.1.2-108 is coupled to the inner frame 11.1.2-104 between the first and second apertures 11.1.2-106*a-b*.

The mounting bracket 11.1.2-108 can include a middle or central portion 11.1.2-109 coupled to the inner frame 11.1.2-104. In some examples, the middle or central portion 11.1.2-109 may not be the geometric middle or center of the bracket 11.1.2-108. Rather, the middle/central portion 11.1.2-109 can be disposed between first and second cantilevered extension arms extending away from the middle portion 11.1.2-109. In at least one example, the mounting bracket 108 includes a first cantilever arm 11.1.2-112 and a second cantilever arm 11.1.2-114 extending away from the middle portion 11.1.2-109 of the mount bracket 11.1.2-108 coupled to the inner frame 11.1.2-104.

As shown in FIG. 1N, the outer frame 11.1.2-102 can define a curved geometry on a lower side thereof to accommodate a user's nose when the user dons the HMD 11.1.2-100. The curved geometry can be referred to as a nose bridge 11.1.2-111 and be centrally located on a lower side of the HMD 11.1.2-100 as shown. In at least one example, the mounting bracket 11.1.2-108 can be connected to the inner frame 11.1.2-104 between the apertures 11.1.2-106*a-b* such that the cantilevered arms 11.1.2-112, 11.1.2-114 extend downward and laterally outward away from the middle portion 11.1.2-109 to compliment the nose bridge 11.1.2-111 geometry of the outer frame 11.1.2-102. In this way, the mounting bracket 11.1.2-108 is configured to accommodate the user's nose as noted above. The nose bridge 11.1.2-111 geometry accommodates the nose in that the nose bridge 11.1.2-111 provides a curvature that curves with, above, over, and around the user's nose for comfort and fit.

The first cantilever arm 11.1.2-112 can extend away from the middle portion 11.1.2-109 of the mounting bracket 11.1.2-108 in a first direction and the second cantilever arm 11.1.2-114 can extend away from the middle portion 11.1.2-109 of the mounting bracket 11.1.2-10 in a second direction opposite the first direction. The first and second cantilever arms 11.1.2-112, 11.1.2-114 are referred to as "cantilevered" or "cantilever" arms because each arm 11.1.2-112, 11.1.2-114, includes a distal free end 11.1.2-116, 11.1.2-118, respectively, which are free of affixation from the inner and outer frames 11.1.2-102, 11.1.2-104. In this way, the arms 11.1.2-112, 11.1.2-114 are cantilevered from the middle portion 11.1.2-109, which can be connected to the inner frame 11.1.2-104, with distal ends 11.1.2-102, 11.1.2-104 unattached.

In at least one example, the HMD 11.1.2-100 can include one or more components coupled to the mounting bracket 11.1.2-108. In one example, the components include a plurality of sensors 11.1.2-110*a-f*. Each sensor of the plurality of sensors 11.1.2-110*a-f* can include various types of sensors, including cameras, IR sensors, and so forth. In some examples, one or more of the sensors 11.1.2-110*a-f* can be used for object recognition in three-dimensional space such that it is important to maintain a precise relative position of two or more of the plurality of sensors 11.1.2-110*a-f*. The cantilevered nature of the mounting bracket 11.1.2-108 can protect the sensors 11.1.2-110*a-f* from damage and altered positioning in the case of accidental drops by the user. Because the sensors 11.1.2-110*a-f* are cantilevered on the arms 11.1.2-112, 11.1.2-114 of the mounting bracket 11.1.2-108, stresses and deformations of the inner and/or outer frames 11.1.2-104, 11.1.2-102 are not transferred to the cantilevered arms 11.1.2-112, 11.1.2-114 and thus do not affect the relative positioning of the sensors 11.1.2-110*a-f* coupled/mounted to the mounting bracket 11.1.2-108.

Any of the features, components, and/or parts, including the arrangements and configurations thereof shown in FIG. 1N can be included, either alone or in any combination, in any of the other examples of devices, features, components, and described herein. Likewise, any of the features, components, and/or parts, including the arrangements and configurations thereof shown and described herein can be included, either alone or in any combination, in the example of the devices, features, components, and parts shown in FIG. 1N.

FIG. 1O illustrates an example of an optical module 11.3.2-100 for use in an electronic device such as an HMD, including HDM devices described herein. As shown in one or more other examples described herein, the optical module 11.3.2-100 can be one of two optical modules within an HMD, with each optical module aligned to project light toward a user's eye. In this way, a first optical module can project light via a display screen toward a user's first eye and a second optical module of the same device can project light via another display screen toward the user's second eye.

In at least one example, the optical module 11.3.2-100 can include an optical frame or housing 11.3.2-102, which can also be referred to as a barrel or optical module barrel. The optical module 11.3.2-100 can also include a display 11.3.2-104, including a display screen or multiple display screens, coupled to the housing 11.3.2-102. The display 11.3.2-104 can be coupled to the housing 11.3.2-102 such that the display 11.3.2-104 is configured to project light toward the eye of a user when the HMD of which the display module 11.3.2-100 is a part is donned during use. In at least one example, the housing 11.3.2-102 can surround the display 11.3.2-104 and provide connection features for coupling other components of optical modules described herein.

In one example, the optical module 11.3.2-100 can include one or more cameras 11.3.2-106 coupled to the housing 11.3.2-102. The camera 11.3.2-106 can be positioned relative to the display 11.3.2-104 and housing 11.3.2-102 such that the camera 11.3.2-106 is configured to capture one or more images of the user's eye during use. In at least one example, the optical module 11.3.2-100 can also include a light strip 11.3.2-108 surrounding the display 11.3.2-104. In one example, the light strip 11.3.2-108 is disposed between the display 11.3.2-104 and the camera 11.3.2-106. The light strip 11.3.2-108 can include a plurality of lights 11.3.2-110. The plurality of lights can include one or more light emitting diodes (LEDs) or other lights configured to project light toward the user's eye when the HMD is donned. The individual lights 11.3.2-110 of the light strip 11.3.2-108 can be spaced about the strip 11.3.2-108 and thus spaced about the display 11.3.2-104 uniformly or non-uniformly at various locations on the strip 11.3.2-108 and around the display 11.3.2-104.

In at least one example, the housing 11.3.2-102 defines a viewing opening 11.3.2-101 through which the user can view the display 11.3.2-104 when the HMD device is donned. In at least one example, the LEDs are configured and arranged to emit light through the viewing opening 11.3.2-101 and onto the user's eye. In one example, the camera 11.3.2-106 is configured to capture one or more images of the user's eye through the viewing opening 11.3.2-101.

As noted above, each of the components and features of the optical module 11.3.2-100 shown in FIG. 1O can be replicated in another (e.g., second) optical module disposed with the HMD to interact (e.g., project light and capture images) of another eye of the user.

Any of the features, components, and/or parts, including the arrangements and configurations thereof shown in FIG. 1O can be included, either alone or in any combination, in any of the other examples of devices, features, components, and parts shown in FIG. 1P or otherwise described herein. Likewise, any of the features, components, and/or parts, including the arrangements and configurations thereof shown and described with reference to FIG. 1P or otherwise described herein can be included, either alone or in any combination, in the example of the devices, features, components, and parts shown in FIG. 1O.

FIG. 1P illustrates a cross-sectional view of an example of an optical module 11.3.2-200 including a housing 11.3.2-202, display assembly 11.3.2-204 coupled to the housing 11.3.2-202, and a lens 11.3.2-216 coupled to the housing 11.3.2-202. In at least one example, the housing 11.3.2-202 defines a first aperture or channel 11.3.2-212 and a second aperture or channel 11.3.2-214. The channels 11.3.2-212, 11.3.2-214 can be configured to slidably engage respective rails or guide rods of an HMD device to allow the optical module 11.3.2-200 to adjust in position relative to the user's eyes for match the user's interpapillary distance (IPD). The housing 11.3.2-202 can slidably engage the guide rods to secure the optical module 11.3.2-200 in place within the HMD.

In at least one example, the optical module 11.3.2-200 can also include a lens 11.3.2-216 coupled to the housing 11.3.2-202 and disposed between the display assembly 11.3.2-204 and the user's eyes when the HMD is donned. The lens 11.3.2-216 can be configured to direct light from the display assembly 11.3.2-204 to the user's eye. In at least one example, the lens 11.3.2-216 can be a part of a lens assembly including a corrective lens removably attached to the optical module 11.3.2-200. In at least one example, the lens 11.3.2-216 is disposed over the light strip 11.3.2-208 and the one or more eye-tracking cameras 11.3.2-206 such that the camera 11.3.2-206 is configured to capture images of the user's eye through the lens 11.3.2-216 and the light strip 11.3.2-208 includes lights configured to project light through the lens 11.3.2-216 to the users' eye during use.

Any of the features, components, and/or parts, including the arrangements and configurations thereof shown in FIG. 1P can be included, either alone or in any combination, in any of the other examples of devices, features, components, and parts and described herein. Likewise, any of the features, components, and/or parts, including the arrangements and configurations thereof shown and described herein can be included, either alone or in any combination, in the example of the devices, features, components, and parts shown in FIG. 1P.

Figure 2:
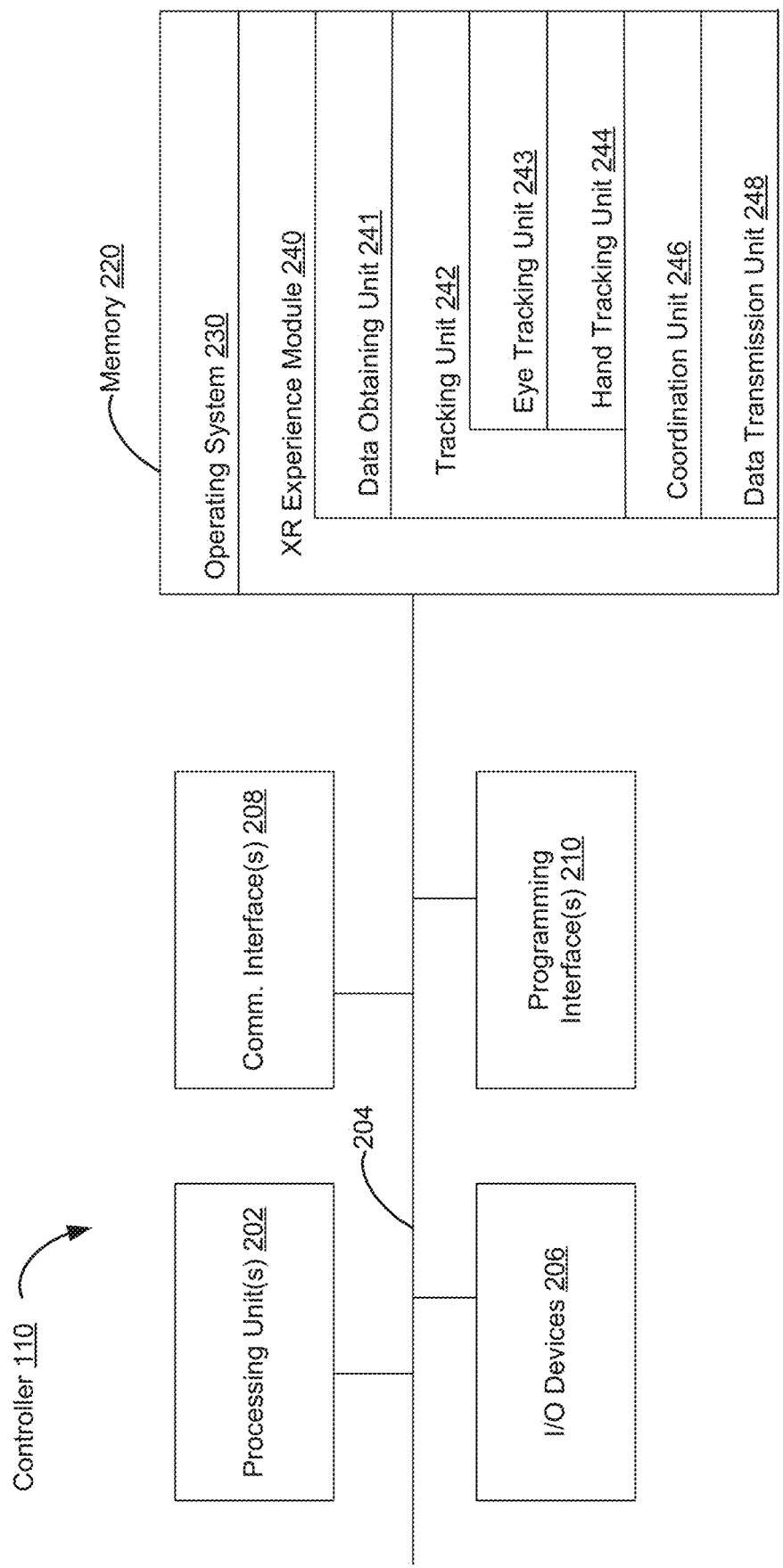
FIG. 2 is a block diagram illustrating a controller of a computer system that is configured to manage and coordinate a XR experience for the user in some embodiments.

FIG. 2 is a block diagram of an example of the controller 110 in some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1A, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1A, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1A, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
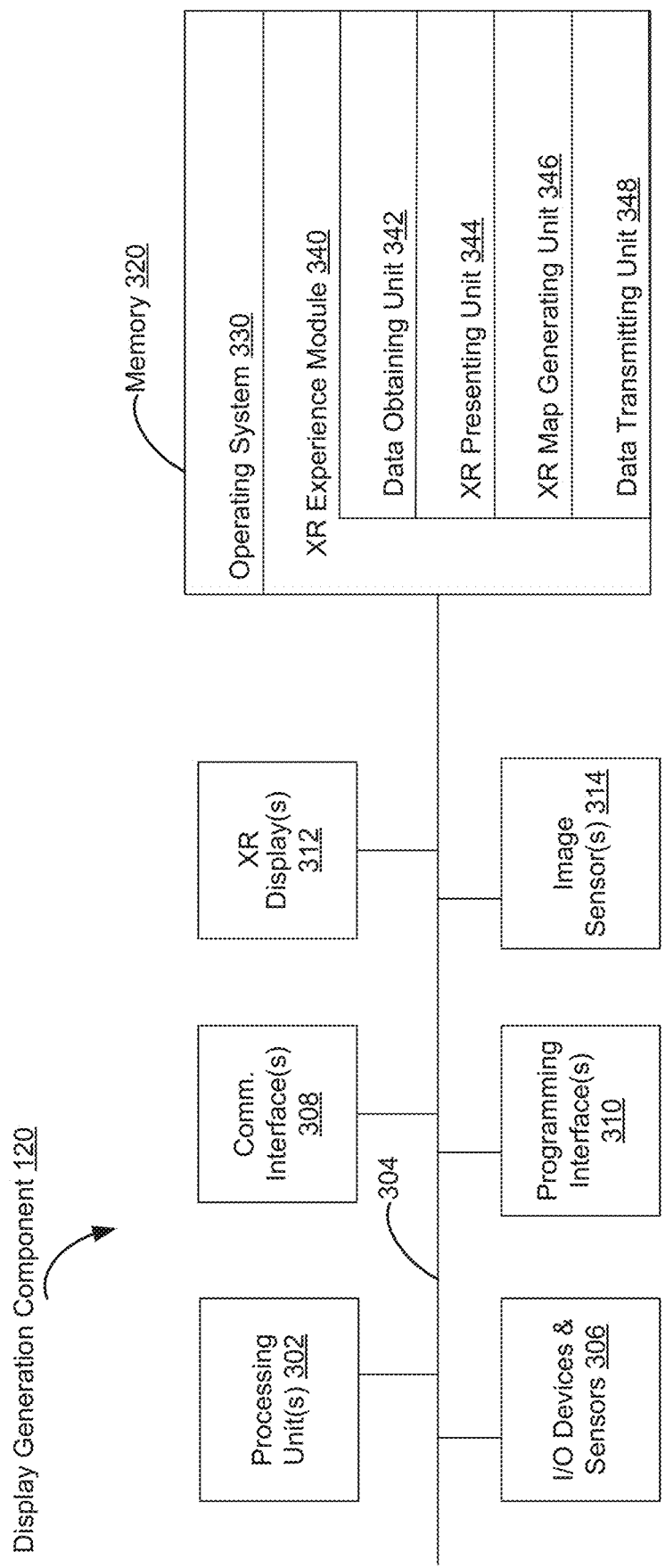
FIG. 3 is a block diagram illustrating a display generation component of a computer system that is configured to provide a visual component of the XR experience to the user in some embodiments.

FIG. 3 is a block diagram of an example of the display generation component 120 in some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes a XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (TR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, a XR presenting unit 344, a XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1A. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate a XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1A), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

FIG. 4 is a schematic, pictorial illustration of an example embodiment of the hand tracking device 140. In some embodiments, hand tracking device 140 (FIG. 1A) is controlled by hand tracking unit 244 (FIG. 2) to track the position/location of one or more portions of the user's hands, and/or motions of one or more portions of the user's hands with respect to the scene 105 of FIG. 1A (e.g., with respect to a portion of the physical environment surrounding the user, with respect to the display generation component 120, or with respect to a portion of the user (e.g., the user's face, eyes, or head), and/or relative to a coordinate system defined relative to the user's hand). In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) (or part(s) of the user's hand) for interacting with an XR environment (e.g., a virtual or mixed-reality environment), in some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand). In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands). In some embodiments, movement between the user's two hands (e.g., to increase and/or decrease a distance or relative orientation between the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In scenarios where inputs are described with reference to air gestures, it should be understood that similar gestures could be detected using a hardware input device that is attached to or held by one or more hands of a user, where the position of the hardware input device in space can be tracked using optical tracking, one or more accelerometers, one or more gyroscopes, one or more magnetometers, and/or one or more inertial measurement units and the position and/or movement of the hardware input device is used in place of the position and/or movement of the one or more hands in the corresponding air gesture(s). In scenarios where inputs are described with reference to air gestures, it should be understood that similar gestures could be detected using a hardware input device that is attached to or held by one or more hands of a user, user inputs can be detected with controls contained in the hardware input device such as one or more touch-sensitive input elements, one or more pressure-sensitive input elements, one or more buttons, one or more knobs, one or more dials, one or more joysticks, one or more hand or finger coverings that can detect a position or change in position of portions of a hand and/or fingers relative to each other, relative to the user's body, and/or relative to a physical environment of the user, and/or other hardware input device controls, wherein the user inputs with the controls contained in the hardware input device are used in place of hand and/or finger gestures such as air taps or air pinches in the corresponding air gesture(s). For example, a selection input that is described as being performed with an air tap or air pinch input could be alternatively detected with a button press, a tap on a touch-sensitive surface, a press on a pressure-sensitive surface, or other hardware input. As another example, a movement input that is described as being performed with an air pinch and drag could be alternatively detected based on an interaction with the hardware input control such as a button press and hold, a touch on a touch-sensitive surface, a press on a pressure-sensitive surface, or other hardware input that is followed by movement of the hardware input device (e.g., along with the hand with which the hardware input device is associated) through space. Similarly, a two-handed input that includes movement of the hands relative to each other could be performed with one air gesture and one hardware input device in the hand that is not performing the air gesture, two hardware input devices held in different hands, or two air gestures performed by different hands using various combinations of air gestures and/or the inputs detected by one or more hardware input devices that are described above.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in some embodiments. In FIG. 4, the hand skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in some embodiments.

Figure 5:
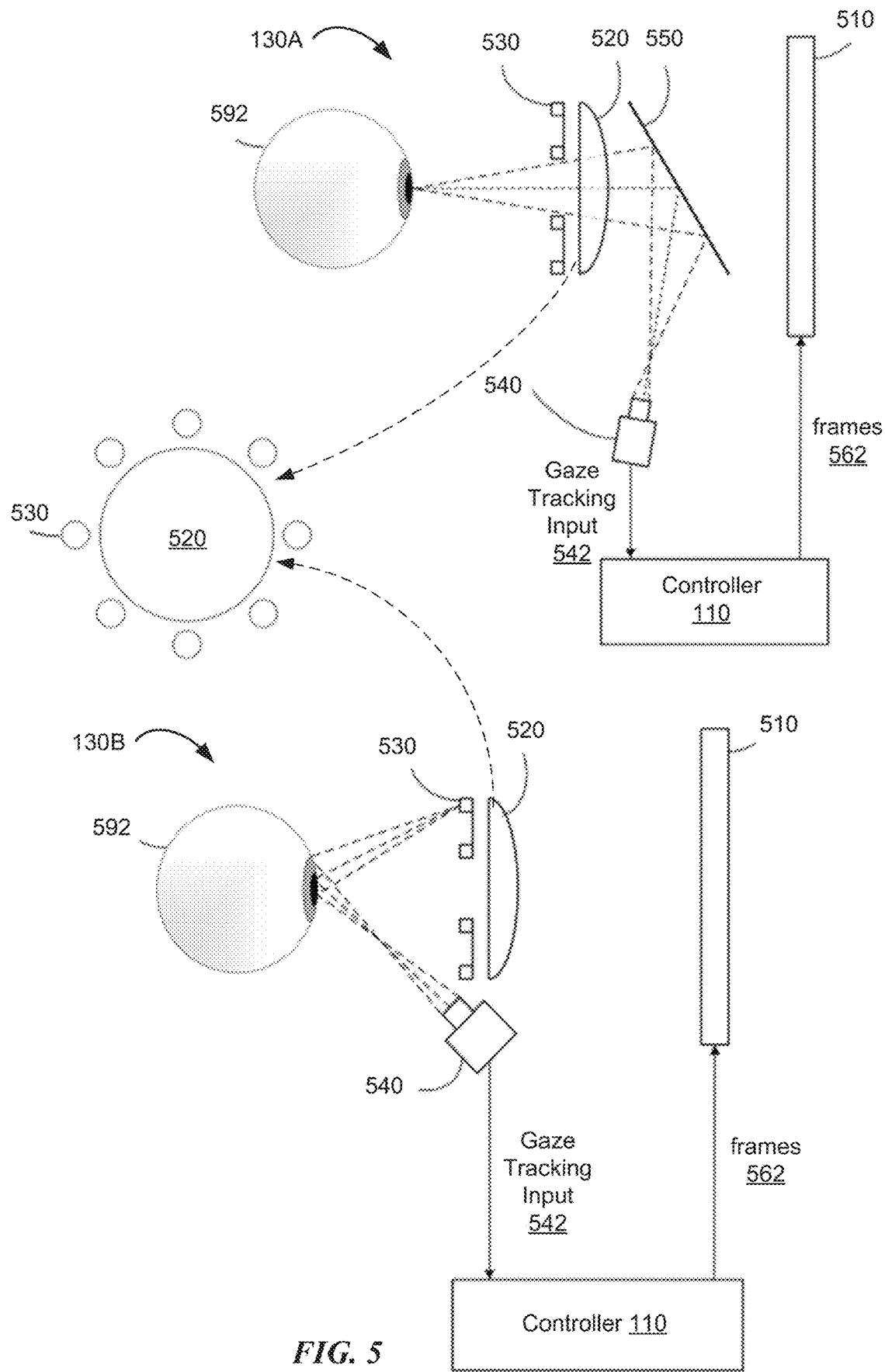
FIG. 5 is a block diagram illustrating an eye tracking unit of a computer system that is configured to capture gaze inputs of the user in some embodiments.

FIG. 5 illustrates an example embodiment of the eye tracking device 130 (FIG. 1A). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or a XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NR light-emitting diodes (LEDs)) that emit light (e.g., IR or NTR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., light sources 530 (e.g., IR or NIR LEDs)), mounted in a wearable housing. The illumination sources emit light (e.g., IR or NIR light) towards the user's eye(s) 592. In some embodiments, the illumination sources may be arranged in rings or circles around each of the lenses as shown in FIG. 5. In some embodiments, eight light sources 530 (e.g., LEDs) are arranged around each lens 520 as an example. However, more or fewer illumination sources 530 may be used, and other arrangements and locations of illumination sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
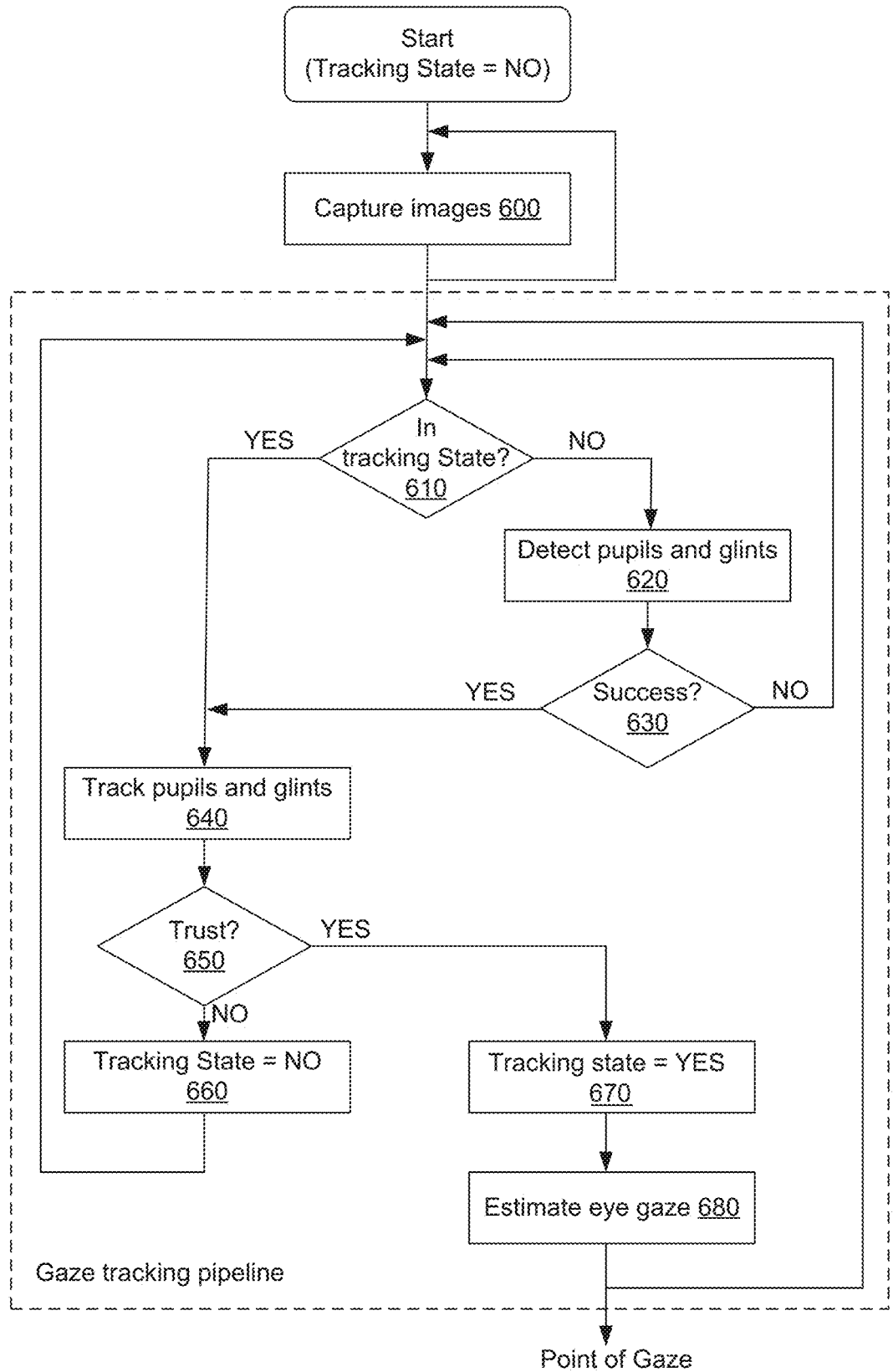
FIG. 6 is a flow diagram illustrating a glint-assisted gaze tracking pipeline in some embodiments.

FIG. 6 illustrates a glint-assisted gaze tracking pipeline, in some embodiments. In some embodiments, the gaze tracking pipeline is implemented by a glint-assisted gaze tracking system (e.g., eye tracking device 130 as illustrated in FIGS. 1A and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in some embodiments.

In some embodiments, the captured portions of real world environment 602 are used to provide a XR experience to the user, for example, a mixed reality environment in which one or more virtual objects are superimposed over representations of real world environment 602.

Thus, the description herein describes some embodiments of three-dimensional environments (e.g., XR environments) that include representations of real world objects and representations of virtual objects. For example, a three-dimensional environment optionally includes a representation of a table that exists in the physical environment, which is captured and displayed in the three-dimensional environment (e.g., actively via cameras and displays of a computer system, or passively via a transparent or translucent display of the computer system). As described previously, the three-dimensional environment is optionally a mixed reality system in which the three-dimensional environment is based on the physical environment that is captured by one or more sensors of the computer system and displayed via a display generation component. As a mixed reality system, the computer system is optionally able to selectively display portions and/or objects of the physical environment such that the respective portions and/or objects of the physical environment appear as if they exist in the three-dimensional environment displayed by the computer system. Similarly, the computer system is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the computer system optionally displays a vase such that it appears as if a real vase is placed on top of a table in the physical environment. In some embodiments, a respective location in the three-dimensional environment has a corresponding location in the physical environment. Thus, when the computer system is described as displaying a virtual object at a respective location with respect to a physical object (e.g., such as a location at or near the hand of the user, or at or near a physical table), the computer system displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment (e.g., and/or visible via the display generation component) can interact with virtual objects that exist only in the three-dimensional environment. For example, a three-dimensional environment can include a table and a vase placed on top of the table, with the table being a view of (or a representation of) a physical table in the physical environment, and the vase being a virtual object.

In a three-dimensional environment (e.g., a real environment, a virtual environment, or an environment that includes a mix of real and virtual objects), objects are sometimes referred to as having a depth or simulated depth, or objects are referred to as being visible, displayed, or placed at different depths. In this context, depth refers to a dimension other than height or width. In some embodiments, depth is defined relative to a fixed set of coordinates (e.g., where a room or an object has a height, depth, and width defined relative to the fixed set of coordinates). In some embodiments, depth is defined relative to a location or viewpoint of a user, in which case the depth dimension varies based on the location of the user and/or the location and angle of the viewpoint of the user. In some embodiments where depth is defined relative to a location of a user that is positioned relative to a surface of an environment (e.g., a floor of an environment, or a surface of the ground), objects that are further away from the user along a line that extends parallel to the surface are considered to have a greater depth in the environment, and/or the depth of an object is measured along an axis that extends outward from a location of the user and is parallel to the surface of the environment (e.g., depth is defined in a cylindrical or substantially cylindrical coordinate system with the position of the user at the center of the cylinder that extends from a head of the user toward feet of the user). In some embodiments where depth is defined relative to viewpoint of a user (e.g., a direction relative to a point in space that determines which portion of an environment that is visible via a head mounted device or other display), objects that are further away from the viewpoint of the user along a line that extends parallel to the direction of the viewpoint of the user are considered to have a greater depth in the environment, and/or the depth of an object is measured along an axis that extends outward from a line that extends from the viewpoint of the user and is parallel to the direction of the viewpoint of the user (e.g., depth is defined in a spherical or substantially spherical coordinate system with the origin of the viewpoint at the center of the sphere that extends outwardly from a head of the user). In some embodiments, depth is defined relative to a user interface container (e.g., a window or application in which application and/or system content is displayed) where the user interface container has a height and/or width, and depth is a dimension that is orthogonal to the height and/or width of the user interface container. In some embodiments, in circumstances where depth is defined relative to a user interface container, the height and or width of the container are typically orthogonal or substantially orthogonal to a line that extends from a location based on the user (e.g., a viewpoint of the user or a location of the user) to the user interface container (e.g., the center of the user interface container, or another characteristic point of the user interface container) when the container is placed in the three-dimensional environment or is initially displayed (e.g., so that the depth dimension for the container extends outward away from the user or the viewpoint of the user). In some embodiments, in situations where depth is defined relative to a user interface container, depth of an object relative to the user interface container refers to a position of the object along the depth dimension for the user interface container. In some embodiments, multiple different containers can have different depth dimensions (e.g., different depth dimensions that extend away from the user or the viewpoint of the user in different directions and/or from different starting points). In some embodiments, when depth is defined relative to a user interface container, the direction of the depth dimension remains constant for the user interface container as the location of the user interface container, the user and/or the viewpoint of the user changes (e.g., or when multiple different viewers are viewing the same container in the three-dimensional environment such as during an in-person collaboration session and/or when multiple participants are in a real-time communication session with shared virtual content including the container). In some embodiments, for curved containers (e.g., including a container with a curved surface or curved content region), the depth dimension optionally extends into a surface of the curved container. In some situations, z-separation (e.g., separation of two objects in a depth dimension), z-height (e.g., distance of one object from another in a depth dimension), z-position (e.g., position of one object in a depth dimension), z-depth (e.g., position of one object in a depth dimension), or simulated z dimension (e.g., depth used as a dimension of an object, dimension of an environment, a direction in space, and/or a direction in simulated space) are used to refer to the concept of depth as described above.

In some embodiments, a user is optionally able to interact with virtual objects in the three-dimensional environment using one or more hands as if the virtual objects were real objects in the physical environment. For example, as described above, one or more sensors of the computer system optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or due to projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment as if they were physical objects in the physical environment. In some embodiments, the computer system is able to update display of the representations of the user's hands in the three-dimensional environment in conjunction with the movement of the user's hands in the physical environment.

In some of the embodiments described below, the computer system is optionally able to determine the "effective" distance between physical objects in the physical world and virtual objects in the three-dimensional environment, for example, for the purpose of determining whether a physical object is directly interacting with a virtual object (e.g., whether a hand is touching, grabbing, holding, etc. a virtual object or within a threshold distance of a virtual object). For example, a hand directly interacting with a virtual object optionally includes one or more of a finger of a hand pressing a virtual button, a hand of a user grabbing a virtual vase, two fingers of a hand of the user coming together and pinching/holding a user interface of an application, and any of the other types of interactions described here. For example, the computer system optionally determines the distance between the hands of the user and virtual objects when determining whether the user is interacting with virtual objects and/or how the user is interacting with virtual objects. In some embodiments, the computer system determines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the computer system optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared with the position of the virtual object of interest in the three-dimensional environment to determine the distance between the one or more hands of the user and the virtual object. In some embodiments, the computer system optionally determines a distance between a physical object and a virtual object by comparing positions in the physical world (e.g., as opposed to comparing positions in the three-dimensional environment). For example, when determining the distance between one or more hands of the user and a virtual object, the computer system optionally determines the corresponding location in the physical world of the virtual object (e.g., the position at which the virtual object would be located in the physical world if it were a physical object rather than a virtual object), and then determines the distance between the corresponding physical position and the one of more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the computer system optionally performs any of the techniques described above to map the location of the physical object to the three-dimensional environment and/or map the location of the virtual object to the physical environment.

In some embodiments, the same or similar technique is used to determine where and what the gaze of the user is directed to and/or where and at what a physical stylus held by a user is pointed. For example, if the gaze of the user is directed to a particular position in the physical environment, the computer system optionally determines the corresponding position in the three-dimensional environment (e.g., the virtual position of the gaze), and if a virtual object is located at that corresponding virtual position, the computer system optionally determines that the gaze of the user is directed to that virtual object. Similarly, the computer system is optionally able to determine, based on the orientation of a physical stylus, to where in the physical environment the stylus is pointing. In some embodiments, based on this determination, the computer system determines the corresponding virtual position in the three-dimensional environment that corresponds to the location in the physical environment to which the stylus is pointing, and optionally determines that the stylus is pointing at the corresponding virtual position in the three-dimensional environment.

Similarly, the embodiments described herein may refer to the location of the user (e.g., the user of the computer system) and/or the location of the computer system in the three-dimensional environment. In some embodiments, the user of the computer system is holding, wearing, or otherwise located at or near the computer system. Thus, in some embodiments, the location of the computer system is used as a proxy for the location of the user. In some embodiments, the location of the computer system and/or user in the physical environment corresponds to a respective location in the three-dimensional environment. For example, the location of the computer system would be the location in the physical environment (and its corresponding location in the three-dimensional environment) from which, if a user were to stand at that location facing a respective portion of the physical environment that is visible via the display generation component, the user would see the objects in the physical environment in the same positions, orientations, and/or sizes as they are displayed by or visible via the display generation component of the computer system in the three-dimensional environment (e.g., in absolute terms and/or relative to each other). Similarly, if the virtual objects displayed in the three-dimensional environment were physical objects in the physical environment (e.g., placed at the same locations in the physical environment as they are in the three-dimensional environment, and having the same sizes and orientations in the physical environment as in the three-dimensional environment), the location of the computer system and/or user is the position from which the user would see the virtual objects in the physical environment in the same positions, orientations, and/or sizes as they are displayed by the display generation component of the computer system in the three-dimensional environment (e.g., in absolute terms and/or relative to each other and the real world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as a portable multifunction device or a head-mounted device, in communication with one or more display generation components and one or more input devices.

FIGS. 7A-7H illustrate examples of providing feedback pertaining to device position adjustment. FIG. 8 is a flow diagram of an exemplary method 800 for providing feedback pertaining to device position adjustment. The user interfaces in FIGS. 7A-7H are used to illustrate the processes described below, including the processes in FIG. 8.

Figure 7E:
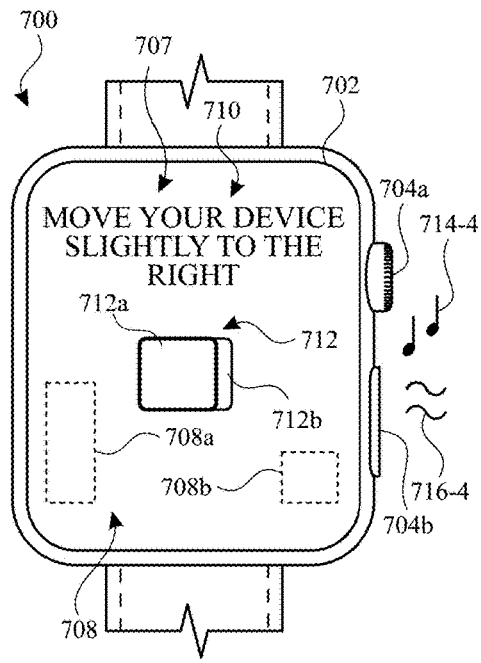

FIG. 7A depicts electronic device 700, which is a smartwatch that includes touch-sensitive display 702, rotatable and depressible input mechanism 704a, and button 704b. In some embodiments described below, electronic device 700 is a smartwatch. In some embodiments, the user interfaces displayed by electronic device 700 are implemented on HMD X700. At FIGS. 7A-7H, HMD X700 is represented by dashed lines to indicate that user interfaces displayed by electronic device 700 can also be implemented on HMD X700. In some embodiments, similar user interfaces could be implemented on a different electronic device such as a smartphone, a tablet, a wearable device, a head-mounted system (e.g., headset), and/or other computer system that includes and/or is in communication with one or more display devices (e.g., display screen and/or projection device). Electronic device 700 is a computer system (e.g., computer system 101 in FIG. 1A).

At FIG. 7A, electronic device 700 and/or HMD X700 is in a low power, inactive, and/or sleep state, in which content is not displayed via display 702. At FIG. 7A, electronic device 700 and/or HMD X700 detects user input 706. In the depicted embodiments, user input 706 is a press input via rotatable and depressible input mechanism 704a. However, in some embodiments, user input 706 is a different type of input, such as a gesture or other action taken by a user. For example, in some embodiments, electronic device 700 is a head-mounted system (e.g., HMD X700), and detecting user input 706 includes, for example, detecting that a user is putting and/or has put electronic device 700 and/or HMD X700 on his or her head, detecting a gesture while electronic device 700 and/or HMD X700 is worn, detecting a press of a button while electronic device 700 and/or HMD X700 is worn, detecting rotation of a rotatable input mechanism while electronic device 700 and/or HMD X700 is worn, detecting a gaze-based gesture (e.g., detecting the user looking at an object and/or moving his or her gaze in a particular manner), and/or any combination of the foregoing.

At FIG. 7B, in response to detecting user input 706, electronic device 700 and/or HMD X700 transitions from the low power, inactive, and/or sleep state to an active state in which electronic device 700 and/or HMD X700 displays content via display 702 (e.g., a normal power state, a non-low power state, an activated state, and/or an awake state). At FIG. 7B, electronic device 700 and/or HMD X700 detects (e.g., via one or more sensors) that a physical position of electronic device 700 and/or HMD X700 satisfies one or more error conditions (e.g., is not positioned properly, is not positioned correctly, and/or the electronic device 700 and/or HMD X700 should be moved (e.g., in order for electronic device 700 and/or HMD X700 to operate properly and/or optimally)). In some embodiments, electronic device 700 and/or HMD X700 detects that a physical position of electronic device 700 and/or HMD X700 satisfies one or more error conditions relative to a portion of the body of a user (e.g., a user that is using and/or wearing electronic device 700 and/or HMD X700) (e.g., relative to a user's head, a user's face, and/or a portion of a user's face) (e.g., is not positioned properly relative to the portion of the body of the user, is not positioned correctly relative to the portion of the body of the user, and/or the electronic device 700 and/or HMD X700 should be moved relative to the portion of the body of the user). For example, in some embodiments, electronic device 700 is a head-mounted system (e.g., HMD X700), and electronic device 700 and/or HMD X700 detects that at least a portion of electronic device 700 and/or HMD X700 is not positioned properly relative to the head and/or face of a user (e.g., should be moved relative to the head and/or face of a user). In some embodiments, electronic device 700 and/or HMD X700 detects that at least a portion of electronic device 700 and/or HMD X700 is not positioned properly relative to the face and/or eyes of the user, for example, for accurate gaze-based tracking (e.g., for gaze-based user inputs).

In the depicted embodiments, in response to user input 706, and based on the determination that electronic device 700 satisfies one or more error conditions (e.g., relative to a portion of the body of the user), electronic device 700 and/or HMD X700 displays, via display 702, user interface 707 overlaid on three-dimensional environment 708. In some embodiments, when electronic device 700 and/or HMD X700 detects that electronic device 700 does not satisfy the one or more error conditions (e.g., relative to at least a portion of a body of a user) (e.g., electronic device 700 and/or HMD X700 is positioned properly and/or electronic device 700 and/or HMD X700 does not need to be moved (e.g., in order for electronic device 700 and/or HMD X700 to operate properly and/or optimally)), electronic device 700 and/or HMD X700 forgoes display of user interface 707 (e.g., displays a different user interface overlaid on three-dimensional environment 708). In some embodiments, user interface 707 is an extended reality user interface overlaid on three-dimensional environment 708. In the depicted embodiment, three-dimensional environment 708 includes objects 708a, 708b. In some embodiments, three-dimensional environment 708 is displayed by a display (as depicted in FIG. 7B). In some embodiments, three-dimensional environment 708 includes a virtual environment or an image (or video) of a physical environment captured (e.g., in 3D) by one or more cameras (e.g., one or more cameras that are part of and/or in communication with electronic device 700 and/or HMD X700). In some embodiments, three-dimensional environment 708 is visible to a user behind user interface 707, but is not displayed by a display. For example, in some embodiments, three-dimensional environment 708 is a physical environment that includes physical objects 708a, 708b and is visible to a user (e.g., through a transparent display) behind user interface 707 without being displayed by a display.

At FIG. 7B, electronic device 700 and/or HMD X700 determines that electronic device 700 and/or HMD X700 should be moved to the left relative to a portion of a body of a user (e.g., a user wearing electronic device 700 and/or HMD X700). In response to this determination, user interface 707 includes prompt 710 instructing the user to move electronic device 700 and/or HMD X700 "slightly to the left." User interface 707 also includes adjustment indication 712, which includes objects 712a and 712b. Object 712a is representative of a current position of electronic device 700 and/or HMD X700, and object 712b is representative of a target position (or goal position) for electronic device 700 and/or HMD X700. The position of object 712a relative to object 712b indicates the direction in which the user should move electronic device 700 and/or HMD X700. User interface 707 also includes arrow 712c, indicating that the user should move electronic device 700 and/or HMD X700 to the left (e.g., relative to the portion of the body of the user). Furthermore, in FIG. 7B, in response to the determination that electronic device 700 and/or HMD X700 should be moved to the left relative to a portion of the body of the user, electronic device 700 and/or HMD X700 outputs audio output 714-1 on the left side of electronic device 700 and/or HMD X700 (e.g., without outputting on the right side of electronic device 700 and/or HMD X700), and also outputs tactile (e.g., haptic) output 716-1 on the left side of electronic device 700 and/or HMD X700 (e.g., without outputting on the right side of electronic device 700 and/or HMD X700).

At FIG. 7C, electronic device 700 and/or HMD X700 detects that electronic device 700 and/or HMD X700 has been moved slightly to the left (e.g., relative to at least a portion of the body of the user (e.g., relative to the head and/or face of the user)). In response to detecting that electronic device 700 and/or HMD X700 has been moved to the left, electronic device 700 and/or HMD X700 displays object 712a moving to the left closer to object 712b. In some embodiments, object 712a moves to the left in conjunction with detecting movement of electronic device 700 and/or HMD X700 to the left. In some embodiments, the amount of movement of object 712a to the left is based on the amount of detected movement of electronic device 700 and/or HMD X700 to the left. However, electronic device 700 and/or HMD X700 still needs to be moved further to the left and, accordingly, object 712a remains positioned to the right of object 712b. Furthermore, based on a determination that electronic device 700 and/or HMD X700 still needs to be moved further to the left, prompt 710 continues to instruct the user to move the device to the left, and electronic device 700 and/or HMD X700 outputs audio output 714-2 on the left side of electronic device 700 (e.g., without outputting on the right side of electronic device 700 and/or HMD X700) and outputs tactile (e.g., haptic) output 716-2 on the left side of electronic device 700 and/or HMD X700 (e.g., without outputting on the right side of electronic device 700 and/or HMD X700). In some embodiments, in FIG. 7C, based on determination that electronic device 700 and/or HMD X700 is closer to its target position than it was in FIG. 7B, audio output 714-2 has a different volume (e.g., a lower volume or a higher volume) than audio output 714-1, and/or tactile output 716-2 has a different magnitude (e.g., smaller magnitude or greater magnitude) than tactile output 716-1.

At FIG. 7D1, electronic device 700 and/or HMD X700 detects that electronic device 700 and/or HMD X700 has been moved further to the left (e.g., relative to at least a portion of the body of the user (e.g., relative to the head and/or face of the user)), but is now too far to the left. Accordingly, electronic device 700 and/or HMD X700 determines that electronic device 700 n and/or HMD X700 ow should be moved to the right. In response to the determination that electronic device 700 and/or HMD X700 should be moved to the right, electronic device 700 and/or HMD X700 updates display of prompt 710 to instruct the user to move electronic device 700 and/or HMD X700 to the right, and also updates display of object 712a, which now appears to the left of object 712b, along with object 712c which indicates that electronic device 700 and/or HMD X700 should be moved to the right. Furthermore, in response to this determination, electronic device 700 and/or HMD X700 now outputs audio output 714-3 and tactile (e.g., haptic) output 716-3 to the right side of electronic device 700 and/or HMD X700 (e.g., without outputting on the left side of electronic device 700 and/or HMD X700). In some embodiments, in FIG. 7D1, based on determination that electronic device 700 and/or HMD X700 is farther from its target position than it was in FIG. 7C, audio output 714-3 has a different volume (e.g., a lower volume or a higher volume) than audio output 714-2, and/or tactile output 716-3 has a different magnitude (e.g., smaller magnitude or greater magnitude) than tactile output 716-2.

In some embodiments, the techniques and user interface (s) described in FIGS. 7A-7H are provided by one or more of the devices described in FIGS. 1A-1P. For example, FIG. 7D2 illustrates an embodiment in which prompt 710 (e.g., as described in FIGS. 7B-7D1) is displayed on display module X702 of head-mounted device (HMD) X700. In some embodiments, device X700 includes a pair of display modules that provide stereoscopic content to different eyes of the same user. For example, HMD X700 includes display module X702 (which provides content to a left eye of the user) and a second display module (which provides content to a right eye of the user). In some embodiments, the second display module displays a slightly different image than display module X702 to generate the illusion of stereoscopic depth.

At FIG. 7D2, HMD X700 detects that HMD X700 has been moved further to the left (e.g., relative to at least a portion of the body of the user (e.g., relative to the head and/or face of the user)), but is now too far to the left. Accordingly, HMD X700 determines that HMD X700 now should be moved to the right. In response to the determination that HMD X700 should be moved to the right, HMD X700 updates display of prompt 710 to instruct the user to move HMD X700 to the right, and also updates display of object 712a, which now appears to the left of object 712b, along with object 712c which indicates that HMD X700 should be moved to the right. Furthermore, in response to this determination, HMD X700 now outputs audio output X714-3 and tactile (e.g., haptic) output X716-3 to the right side of HMD X700 (e.g., without outputting on the left side of HMD X700). In some embodiments, in FIG. 7D2, based on determination that HMD X700 is farther from its target position than it was in FIG. 7C, audio output X714-3 has a different volume (e.g., a lower volume or a higher volume) than audio output 714-2, and/or tactile output X716-3 has a different magnitude (e.g., smaller magnitude or greater magnitude) than tactile output 716-2.

Any of the features, components, and/or parts, including the arrangements and configurations thereof shown in FIGS. 1B-1P can be included, either alone or in any combination, in HMD X700. For example, in some embodiments, HMD X700 includes any of the features, components, and/or parts of HMD 1-100, 1-200, 3-100, 6-100, 6-200, 6-300, 6-400, 11.1.1-100, and/or 11.1.2-100, either alone or in any combination. In some embodiments, display module X702 includes any of the features, components, and/or parts of display unit 1-102, display unit 1-202, display unit 1-306, display unit 1-406, display generation component 120, display screens 1-122a-b, first and second rear-facing display screens 1-322a, 1-322b, display 11.3.2-104, first and second display assemblies 1-120a, 1-120b, display assembly 1-320, display assembly 1-421, first and second display sub-assemblies 1-420a, 1-420b, display assembly 3-108, display assembly 11.3.2-204, first and second optical modules 11.1.1-104a and 11.1.1-104b, optical module 11.3.2-100, optical module 11.3.2-200, lenticular lens array 3-110, display region or area 6-232, and/or display/display region 6-334, either alone or in any combination. In some embodiments, HMD X700 includes a sensor that includes any of the features, components, and/or parts of any of sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110a-f, either alone or in any combination. In some embodiments, HMD X700 includes one or more input devices, which include any of the features, components, and/or parts of any of first button 1-128, button 11.1.1-114, second button 1-132, and or dial or button 1-328, either alone or in any combination. In some embodiments, HMD X700 includes one or more audio output components (e.g., electronic component 1-112) for generating audio feedback (e.g., audio output X714-3), optionally generated based on detected events and/or user inputs detected by the HMD X700.

At FIG. 7E, electronic device 700 and/or HMD X700 detects that it has been moved to the right (e.g., relative to at least a portion of the body of the user (e.g., relative to the head and/or face of the user)). In response to detecting movement of electronic device 700 and/or HMD X700 to the right, electronic device 700 and/or HMD X700 displays object 712a moved further to the right. However, electronic device 700 and/or HMD X700 detects that it should still be moved slightly further to the right. Accordingly, prompt 710 continues to state that the device should be moved to the right, object 712a remains slightly to the left of object 712b, and electronic device 700 and/or HMD X700 outputs audio output 714-4 and tactile output 716-4 to the right side of electronic device 700 and/or HMD X700. In some embodiments, in FIG. 7E, based on determination that electronic device 700 is closer to its target position than it was in FIGS. 7D1 and/or 7D2, audio output 714-4 has a different volume (e.g., a lower volume or a higher volume) than audio output 714-3 and/or X714-3, and/or tactile output 716-4 has a different magnitude (e.g., smaller magnitude or greater magnitude) than tactile output 716-3 and/or X716-3.

Figure 7F:
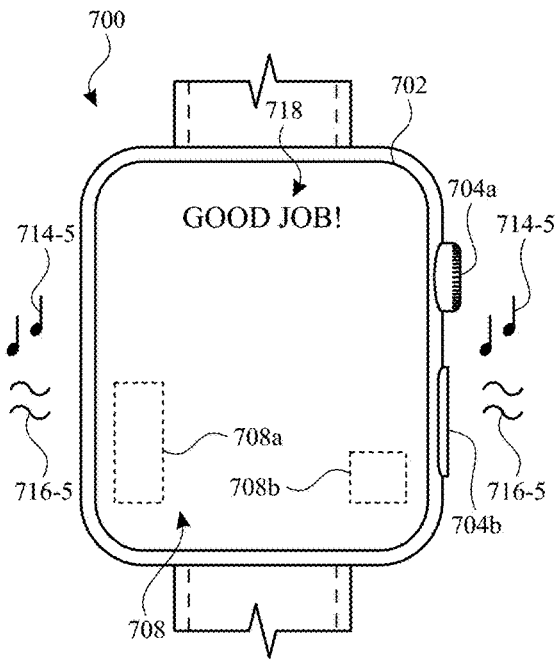

At FIG. 7F, electronic device 700 and/or HMD X700 detects that electronic device 700 and/or HMD X700 has been moved further to the right, and is now at its target position (e.g., relative to at least a portion of the body of the user (e.g., relative to the head and/or face of the user)) such that electronic device 700 and/or HMD X700 no longer satisfies the one or more error criteria. In response determining that electronic device 700 and/or HMD X700 no longer satisfies the one or more error criteria, electronic device 700 and/or HMD X700 ceases display of user interface 707, and optionally displays prompt 718 indicating that electronic device 700 and/or HMD X700 no longer satisfies the one or more error criteria (e.g., indicates that electronic device 700 and/or HMD X700 is positioned correctly (e.g., relative to at least a portion of the body of the user (e.g., relative to the head and/or face of the user))). Furthermore, in response to determining that electronic device 700 and/or HMD X700 no longer satisfies the one or more error criteria, electronic device 700 outputs audio output 714-5 and tactile output 716-5 (e.g., on both sides, on all sides, and/or on multiple sides) of electronic device 700 and/or HMD X700. In some embodiments, audio output 714-5 is different from (e.g., is a different sound from) audio outputs 714-1 through 714-4. In some embodiments, tactile output 716-5 is different from (e.g., is a different vibration pattern) tactile outputs 716-1 through 716-4.

While the depicted examples have shown example scenarios in which user interface 707 directs the user to move electronic device 700 and/or HMD X700 (e.g., left, right, up, and/or down), in some embodiments, user interface 707 prompts a user to change one or more components of electronic device 700 and/or HMD X700. For example, in some embodiments, electronic device 700 is a head-mounted system (e.g., HMD X700) that includes a light seal component and/or a headband component, and user interface 707 instructs the user that the user should change the light seal component (e.g., from a first size and/or shape to a second size and/or shape) and/or the headband component (e.g., from a first size and/or shape to a second size and/or shape). In some embodiments, changing the light seal component (e.g., from a first size and/or shape to a second size and/or shape) and/or the headband component (e.g., from a first size and/or shape to a second size and/or shape) moves at least a portion of electronic device 700 and/or HMD X700 further from and/or closer to the body (e.g., the head and/or the face) of the user. In some embodiments, a light seal component is a physical component that fits between the user's face and the computer system, a display device, and/or one or more display generation components to block out light (e.g., some light and/or all light) (e.g., external light and/or light that is not output by the computer system, a display device, and/or one or more display generation components) from reaching the eyes of the user. For example, in some embodiments, a light seal component creates a seal around the eyes of the user so that the user can see one or more display components without external light disrupting the user's view of the one or more display components. In some embodiments, a user is instructed to change the light seal component when electronic device 700 and/or HMD X700 determines that the light seal component does not fit the face of the user properly and/or that the light seal is permitting greater than a threshold amount of light to enter an area (e.g., an area between the user's eyes and one or more display components) (e.g., greater than a threshold amount of light is detected by one or more sensors of the computer system).

Figure 7G:
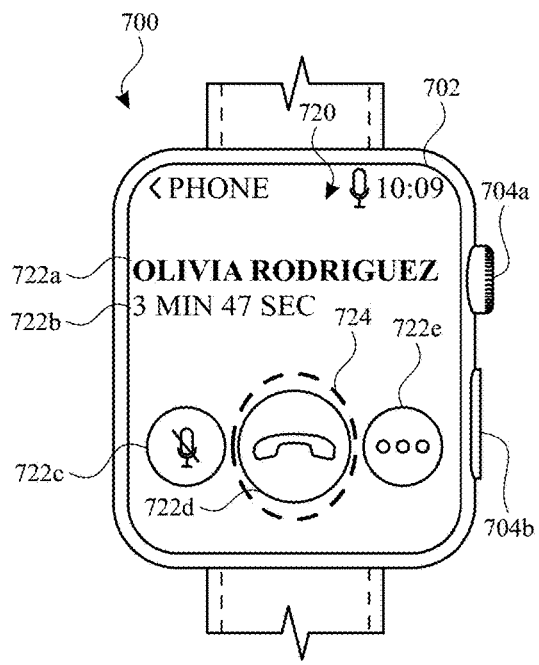

In some embodiments, electronic device 700 and/or HMD X700 forgoes display of user interface 707 while electronic device 700 and/or HMD X700 is displaying certain types of content and/or while electronic device 700 and/or HMD X700 is operating in a particular state, even if electronic device 700 and/or HMD X700 satisfies the one or more error conditions. For example, in FIG. 7G, electronic device 700 and/or HMD X700 displays phone call user interface 720 indicating that electronic device 700 is currently engaged in an active phone call. Phone call user interface 720 includes contact name 722*a*, phone call duration 722*b*, mute button 722*c*, options button 722*e*, and end call button 722*d*. In FIG. 7G, electronic device 700 and/or HMD X700 detects that electronic device 700 and/or HMD X700 satisfies the one or more error conditions (e.g., electronic device 700 and/or HMD X700 is not positioned properly (e.g., relative to at least a portion of the body of the user)). However, so as not to interrupt the experience of the user, electronic device 700 and/or HMD X700 forgoes displaying user interface 707 while electronic device 700 and/or HMD X700 is engaged in the phone call and/or while electronic device 700 and/or HMD X700 is displaying user interface 720. In some embodiments, electronic device 700 and/or HMD X700 forgoes displaying user interface 707 when electronic device 700 and/or HMD X700 is displaying a certain type of content (e.g., immersive content and/or content that occupies a threshold amount of display 702 (e.g., a full screen video or other user interface that occupies a threshold amount of the display (e.g., 25% of the display, 50% of the display, 75% of the display, 90% of the display, and/or 95% of the display))) and/or is operating in a certain state (e.g., is participating in an active communication session and/or is displaying immersive content).

At FIG. 7G, electronic device 700 and/or HMD X700 detects user input 724 corresponding to selection of end call button 722*d*, thereby ending the phone call. In the depicted embodiment, user input 724 is a touch input via touch-sensitive display 702. However, in some embodiments, user input 724 is a different type of input, such as a gesture or other action taken by a user. For example, in some embodiments, electronic device 700 is a head-mounted system (e.g., HMD X70), and detecting user input 724 includes, for example, detecting a user performing a gesture (e.g., an air gesture) while electronic device 700 and/or HMD X700 is worn, detecting a press of a button while electronic device 700 and/or HMD X700 is worn, detecting rotation of a rotatable input mechanism while electronic device 700 and/or HMD X700 is worn, detecting a gaze-based gesture (e.g., detecting the user looking at an object and/or moving his or her gaze in a particular manner), and/or any combination of the foregoing. At FIG. 7H, in response to detecting user input 724, electronic device 700 and/or HMD X700 ceases display of phone call user interface 720 and, based on a determination that electronic device 700 and/or HMD X700 satisfies the one or more error criteria and that electronic device 700 and/or HMD X700 is no longer displaying user interface 720 and/or participating in an active phone call, electronic device and/or HMD X700 displays user interface 707.

Figure 7H:
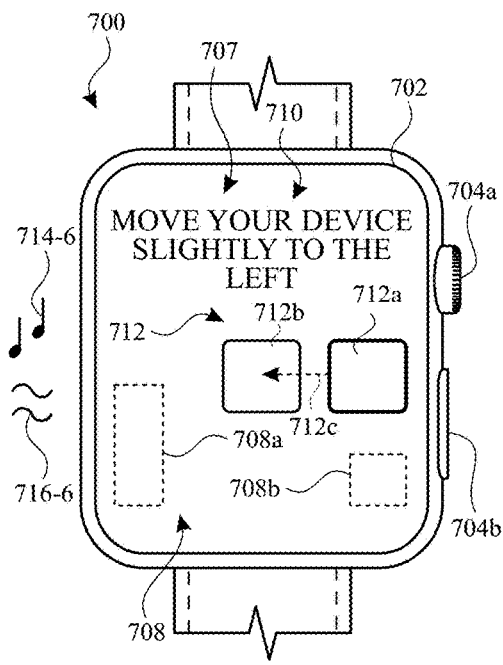

At FIG. 7H, user interface 707 indicates that electronic device 700 and/or HMD X700 has determined that electronic device 700 and/or HMD X700 should be moved to the left (e.g., relative to at least a portion of the body of the user), similar to the technique of FIG. 7B. In response to this determination, user interface 707 includes prompt 710 instructing the user to move electronic device 700 and/or HMD X700 "slightly to the left." User interface 707 also includes adjustment indication 712, which includes objects 712*a* and 712*b*. Object 712*a* is representative of a current position of electronic device 700 and/or HMD X700, and object 712*b* is representative of a target position (or goal position) for electronic device 700 and/or HMD X700. The position of object 712*a* relative to object 712*b* indicates the direction in which the user should move electronic device 700 and/or HMD X700. User interface 707 also includes arrow 712*c*, indicating that the user should move electronic device 700 and/or HMD X700 to the left (e.g., relative to the portion of the body of the user). Furthermore, in FIG. 7H, in response to the determination that electronic device 700 and/or HMD X700 should be moved to the left relative to a portion of the body of the user, electronic device 700 and/or HMD X700 outputs audio output 714-6 on the left side of electronic device 700 and/or HMD X700 (e.g., without outputting on the right side of electronic device 700 and/or HMD X700), and also outputs tactile (e.g., haptic) output 716-6 on the left side of electronic device 700 and/or HMD X700 (e.g., without outputting on the right side of electronic device 700 and/or HMD X700). As described above, in some embodiments, object 712*a* moves in conjunction with electronic device 700 and/or HMD X700 detecting movement of electronic device 700 and/or HMD X700.

Additional descriptions regarding FIGS. 7A-7H are provided below in reference to method 800 described with respect to FIG. 8.

FIG. 8 is a flow diagram of an exemplary method 800 for providing feedback pertaining to device position adjustment, in some embodiments. In some embodiments, method 800 is performed at a computer system (e.g., computer system 101 in FIG. 1A, 700, and/or X700) in communication with or more display generation components (e.g., display generation component 120 in FIGS. 1A, 3, and 4, 702, and/or X702) (e.g., a heads-up display, a display, a touchscreen, a projector, a visual output device, a 3D display, a display having at least a portion that is transparent or translucent on which images can be projected (e.g., a see-through display), a projector, a heads-up display, and/or a display controller) and one or more input devices (e.g., 130, 140, 206, 702, 704*a*, 704*b*) (e.g., a touch-sensitive surface (e.g., a touch-sensitive display); a mouse; a keyboard; a remote control; a visual input device (e.g., one or more cameras (e.g., an infrared camera, a depth camera, a visible light camera, and/or a gaze tracking camera)); an audio input device; a biometric sensor (e.g., a fingerprint sensor, a face identification sensor, a gaze tracking sensor, and/or an iris identification sensor) and/or one or more mechanical input devices (e.g., a depressible input mechanism; a button; a rotatable input mechanism; a crown; and/or a dial)). In some embodiments, method 800 is governed by instructions that are stored in a non-transitory (or transitory) computer-readable storage medium and that are executed by one or more processors of a computer system, such as the one or more processors 202 of computer system 101 (e.g., controller 110 in FIG. 1A). Some operations in method 800 are, optionally, combined and/or the order of some operations is, optionally, changed.

In some embodiments, the computer system (e.g., 700 and/or X700) detects (802) a position of a portion of the computer system relative to a face of a user (e.g., relative to one or more features of a face of a user (e.g., relative to the eyes of the user and/or relative to the nose of the user)) (in some embodiments, the computer system is worn on the face of the user). In some embodiments, detecting the position of the portion of the computer system relative to the face of the user is performed in response to detecting that the computer system is worn on the face of the user. In response to detecting the position of the portion of the computer system relative to the face of the user (804) and in accordance with a determination that the computer system meets respective criteria while the position of the portion of the computer system relative to the face of the user meets one or more error conditions (e.g., the position of the portion of the computer system relative to the face of the user is determined to be faulty) (e.g., the computer system and/or the portion of the computer system is too far to the left on the face of the user, the computer system and/or the portion of the computer system is too far to the right on the face of the user, the computer system and/or the portion of the computer system is too high on the face of the user, the computer system and/or the portion of the computer system is too low on the face of the user, the computer system and/or the portion of the computer system is too close to the face of the user, and/or the computer system and/or the portion of the computer system is too far from the face of the user), wherein the respective criteria include a requirement that the computer system is operating in a respective context in order for the respective criteria to be met (e.g., the computer system is not displaying immersive content, the computer system is stationary, and/or the computer system is not being moved by the user) (e.g., computer system 700 and/or HMD X700 is operating in the respective context in FIGS. 7A-7F, but is not operating in the respective context in FIG. 7G) (806), the computer system outputs (808) a first alert (e.g., 707, 710, 712*a*, 712*b*, 712*c*, 714-1, 714-2, 714-3, X714-3, 714-4, 714-6, 716-1, 716-2, 716-3, X716-3, 716-4, and/or 716-6) (e.g., a haptic alert, an audio alert, and/or a visual alert) indicating that the position of the portion of the computer system relative to the face of the user meets the one or more error conditions (e.g., an alert prompting the user to adjust the position of the computer system and/or the portion of the computer system relative to the face of the user and/or an alert prompting the user to replace and/or change one or more components of the computer system). In response to detecting the position of the portion of the computer system relative to the face of the user (804) and in accordance with a determination that the computer system does not meet the respective criteria (e.g., in FIG. 7G) (e.g., the computer system is displaying immersive content, the computer system is not stationary, and/or the computer system is being moved by the user) while the position of the portion of the computer system relative to the face of the user meets the one or more error conditions (810), the computer system forgoes (812) outputting the first alert (e.g., until the device context criteria are satisfied) (e.g., in FIG. 7G, computer system 700 and/or HMD X700 does not display user interface 707 and/or does not output audio and/or haptic output indicating that computer system 700 and/or HMD X700 satisfies the one or more error conditions).

In some embodiments, in response to detecting the position of the portion of the computer system relative to the face of the user, and in accordance with a determination that the position of the portion of the computer system relative to the face of the user does not meet the one or more errors conditions (e.g., the position of the portion of the computer system relative to the face of the user is not determined to be faulty and/or is determined to be correct), the computer system forgoes outputting the first alert (e.g., FIG. 7F).

In some embodiments, subsequent to forgoing outputting the first alert (e.g., FIG. 7G) (e.g., subsequent to detecting that the computer system does not meet the respective criteria while the position of the portion of the computer system relative to the face of the user meets the one or more errors conditions), and in accordance with a determination that the computer system meets the respective criteria while the position of the portion of the computer system relative to the face of the user meets the one or more error conditions, the computer system outputs the first alert (e.g., in FIG. 7G, based on a determination that electronic device 700 and/or HMD X700 does not meet the respective criteria, electronic device 700 and/or HMD X700 forgoes outputting the first alert, and in FIG. 7H, based on a determination that the computer system now meets the respective criteria, electronic device 700 and/or HMD X700 outputs the first alert).

Outputting an alert that indicates that the position of the portion of the computer system relative to the face of the user meets one or more error conditions enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with visual feedback about a state of the device (e.g., the device has determined that the position of the computer system relative to the face of the user meets one or more error conditions).

In some embodiments, subsequent to forgoing outputting the first alert in accordance with the determination that the computer system does not meet the respective criteria while the position of the portion of the computer system relative to the face of the user meets the one or more errors conditions (e.g., FIG. 7G), and in accordance with a determination that the computer system meets the respective criteria while the position of the portion of the computer system relative to the face of the user meets the one or more error conditions (e.g., FIG. 7H), the computer system outputs the first alert indicating that the position of the portion of the computer system relative to the face of the user meets the one or more error conditions (e.g., in FIG. 7G, based on a determination that electronic device 700 and/or HMD X700 does not meet the respective criteria, electronic device 700 and/or HMD X700 forgoes outputting the first alert, and in FIG. 7H, based on a determination that the computer system now meets the respective criteria, electronic device 700 and/or HMD X700 outputs the first alert). Outputting an alert that indicates that the position of the portion of the computer system relative to the face of the user meets one or more error conditions enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with visual feedback about a state of the device (e.g., the device has determined that the position of the computer system relative to the face of the user meets one or more error conditions).

In some embodiments, in response to detecting the position of the portion of the computer system relative to the face of the user, and in accordance with a determination that the position of the portion of the computer system relative to the face of the user does not meet the one more error conditions (e.g., the position of the portion of the computer system relative to the face of the user is determined to be correct; the computer system and/or the portion of the computer system is positioned properly relative to (e.g., on) the face of the user; and/or one or more metrics and/or sensor readings indicative of the position of the computer system and/or the portion of the computer system relative to the face of the user are within a predefined range of values), the computer system forgoes outputting the first alert (e.g., 707, 710, 712*a*, 712*b*, 712*c*, 714-1, 714-2, 714-3, X714-3, 714-4, 714-6, 716-1, 716-2, 716-3, X716-3, 716-4, and/or 716-6) (e.g., FIG. 7F). Outputting an alert when error conditions are met, and forgoing outputting the alert when error conditions are not met provides the user with visual feedback about a state of the device (e.g., whether or not the error conditions are met).

In some embodiments, outputting the first alert indicating that the position of the portion of the computer system relative to the face of the user meets the one or more error conditions comprises: outputting an initial alert (e.g., 707 in FIG. 7B, 714-1, and/or 716-1) (e.g., a visual initial alert and/or a non-visual (e.g., audio and/or haptic) initial alert) (e.g., an initial alert indicative of a first magnitude and/or a first direction (e.g., a first magnitude and/or first direction of movement needed to correct the position of the portion of the computer system relative to the face of the user)); while outputting the initial alert (e.g., while displaying the initial alert and/or while outputting a non-visual initial alert (e.g., audio and/or haptic output)), detecting, via the one or more input devices, first movement of the portion of the computer system relative to the face of the user (e.g., from FIGS. 7B to 7C; from 7C to 7D2; and/or from 7D1 to 7E); and in response to detecting the first movement of the portion of the computer system relative to the face of the user, outputting a revised alert (e.g., 707 in FIG. 7C, 714-2, 716-2, 707 in FIGS. 7D1 and/or 7D2, 714-3, X714-3, 716-3, X716-3, 707 in FIG. 7E, 714-4, and/or 716-4) (e.g., a visual revised alert and/or a non-visual (e.g., audio and/or haptic) revised alert) different from the initial alert based on the first movement of the portion of the computer system relative to the face of the user (e.g., a revised alert indicative of a second magnitude and/or a second direction (e.g., a second magnitude different from the first magnitude and/or a second direction different from the first direction) (e.g., a second magnitude and/or a second direction of movement needed to correct the position of the portion of the computer system relative to the face of the user)). In some embodiments, outputting the revised alert different from the initial alert comprises updating and/or replacing the initial alert. In some embodiments, while outputting the revised alert, the computer system detects, via the one or more input devices, second movement of the portion of the computer system relative to the face of the user; and in response to detecting the second movement of the portion of the computer system, the computer system outputs a second revised alert (e.g., a visual second revised alert and/or a non-visual (e.g., audio and/or haptic) second revised alert) different from the revised alert based on the second movement of the portion of the computer system relative to the face of the user (e.g., a second revised alert indicative of a third magnitude and/or a third direction (e.g., a third magnitude different from the second magnitude and/or a third direction different from the second direction) (e.g., a third magnitude and/or a third direction of movement needed to correct the position of the portion of the computer system relative to the face of the user)). Monitoring the position of the portion of the computer system relative to the face of the user and providing continuous feedback enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, outputting the first alert indicating that the position of the portion of the computer system relative to the face of the user meets the one or more error conditions comprises displaying, via the one or more display generation components, a visual alert (e.g., 707, 710, 712a, 712b, and/or 712c) indicating that the position of the portion of the computer system relative to the face of the user meets the one or more error conditions (e.g., a visual alert instructing the user to move the computer system and/or the portion of the computer system (e.g., relative to the face of the user); a visual alert instructing the user to move the computer system and/or the portion of the computer system in a first direction (e.g., relative to the face of the user); a visual alert indicating the magnitude by which the user should move the computer system and/or the portion of the computer system (e.g., relative to the face of the user); and/or a visual alert indicating that the user should replace one or more components of the computer system). In some embodiments, the visual alert indicating that the position of the portion of the computer system relative to the face of the user meets the one or more error conditions indicates a magnitude and/or direction corresponding to the one or more error conditions (e.g., a magnitude and/or direction to move the portion of the computer system (e.g., in order to stop meeting the one or more error conditions)). Displaying a visual alert that indicates that the position of the portion of the computer system relative to the face of the user meets one or more error conditions enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with visual feedback about a state of the device (e.g., the device has determined that the position of the computer system relative to the face of the user meets one or more error conditions).

In some embodiments, outputting the first alert indicating that the position of the portion of the computer system relative to the face of the user meets the one or more error conditions comprises outputting a non-visual alert (e.g., 714-1 through 714-4, 716-1 through 716-4, 714-6, and/or 716-6) (e.g., an audio alert, tactile alert, and/or a haptic alert) indicating that the position of the portion of the computer system relative to the face of the user meets the one or more error conditions (e.g., a non-visual alert indicating that the user should move the computer system and/or the portion of the computer system (e.g., relative to the face of the user); a non-visual alert indicating that the user should move the computer system and/or the portion of the computer system in a particular direction (e.g., relative to the face of the user) (e.g., audio output and/or haptic output coming from a first direction to indicate that the user should move the computer system in the first direction and/or audio output and/or haptic output coming from a second direction to indicate that the user should move the computer system in the second direction); a non-visual alert indicating that the user should move the computer system and/or the portion of the computer system by a first magnitude (e.g., relative to the face of the user) (e.g., a louder audio output and/or larger haptic output for larger magnitude of movement and/or a quieter audio output and/or smaller haptic output for smaller magnitude of movement); and/or a non-visual alert indicating that the user should replace one or more components of the computer system (e.g., an audio instruction to replace one or more components of the computer system)). In some embodiments, the non-visual alert indicating that the position of the portion of the computer system relative to the face of the user meets the one or more error conditions indicates a magnitude and/or direction corresponding to the one or more error conditions (e.g., a magnitude and/or direction to move the portion of the computer system (e.g., in order to stop meeting the one or more error conditions)). Outputting a non-visual alert that indicates that the position of the portion of the computer system relative to the face of the user meets one or more error conditions enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with feedback about a state of the device (e.g., the device has determined that the position of the computer system relative to the face of the user meets one or more error conditions). Additionally, if an error causes visual elements to be harder to view, a non-visual alert provides instructions that are not impacted by the error.

In some embodiments, outputting the first alert indicating that the position of the portion of the computer system relative to the face of the user meets the one or more error conditions comprises: outputting an alert indicating that a light seal component (e.g., a physical component (e.g., a physical component that fits between the user's face and the computer system, a display device, and/or one or more display generation components) to block out light (e.g., prevent light (e.g., some light and/or all light) (e.g., external light and/or light that is not output by the computer system, a display device, and/or one or more display generation components) from reaching the eyes of the user)) of the computer system meets one or more light seal error conditions (e.g., an alert indicating that the light seal component of the computer system does not fit the face of the user properly; an alert indicating that the light seal component of the computer system is permitting greater than a threshold amount of light to enter the computer system; and/or an alert indicating that greater than a threshold amount of light is detected by one or more sensors of the computer system) (e.g., prompt 710 and/or user interface 707 instructs the user to change the light seal component (e.g., from a first size and/or shape to a second size and/or shape)). In some embodiments, the one or more error conditions comprises a first condition that is met when greater than a threshold amount of light is detected by one or more sensors that are in communication with the computer system (e.g., one or more sensors that are indicative of the fit of a light seal component relative to the face of a user). Outputting an alert that indicates that a light seal component of the computer system meets one or more light seal error conditions enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, outputting the first alert (e.g., 707, 710, 712, 714-1, 714-2, 714-3, X714-3, 714-4, 714-6, 716-1, 716-2, 716-3, X716-3, 716-4, and/or 716-6) indicating that the position of the computer system relative to the face of the user meets the one or more error conditions comprises outputting an alert indicating that the eyes of the user are too close or too far from the portion of the computer system (e.g., the offset of the eyes of the user relative to the portion of the computer system (e.g., a display generation component and/or an eye box) is not within a threshold range of distances and/or offsets). Outputting an alert that indicates that the eyes of the user are too close or too far from the portion of the computer system enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the respective criteria includes a content-type criterion that is met when the computer system is not outputting content of a first type (e.g., in FIG. 7G, electronic device 700 and/or HMD X700 is displaying an immersive user interface (e.g., that occupies greater than a threshold amount of the display), whereas in FIG. 7H, electronic device 700 and/or HMD X700 has ceased displaying immersive content) (e.g., is not outputting content and/or is outputting content of a second type different from the first type) (e.g., the computer system is not displaying content of the first type (e.g., visual content corresponding to an immersive experience (e.g., a video; a full-screen video; a game; a virtual reality game; and/or an active communication session (e.g., an active phone call or active video conference))); and/or the computer system is not playing audio content corresponding to an immersive experience (e.g., audio content corresponding to a video; a full screen video; a game; a virtual reality game; and/or an active communication session (e.g., an active phone call or active video conference))). Automatically outputting a first alert based on a determination that the computer system is not outputting content of a first type allows these operations to be performed automatically without further user input.

In some embodiments, the content of the first type is immersive experience content (e.g., in FIG. 7G, electronic device 700 and/or HMD X700 is displaying an immersive user interface (e.g., that occupies greater than a threshold amount of the display), whereas in FIG. 7H, electronic device 700 and/or HMD X700 has ceased displaying immersive content) (e.g., an immersive experience (e.g., a video; a full-screen video; a game; a virtual reality game; and/or an active communication session (e.g., an active phone call or active video conference))). In some embodiments, immersive experience content occupies greater than a threshold proportion of the field of view of the user (e.g., greater than 50%, greater than 75%, and/or greater than 90%). In some embodiments, immersive experience content cannot be displayed concurrently with other unrelated content and/or prevents concurrent display of other unrelated content (e.g., content generated by and/or pertaining to applications different from the immersive experience content) (in some embodiments, with the exception of certain predefined system user interface elements (e.g., operating system user interface elements) such as alerts, notifications, a home UI, a control center, a dock). Automatically outputting a first alert based on a determination that the computer system is not outputting immersive content, and automatically suppressing the first alert when the computer system is outputting immersive content, allows these operations to be performed automatically without further user input.

In some embodiments, subsequent to forgoing outputting the first alert in accordance with the determination that the computer system does not meet the respective criteria while the position of the portion of the computer system relative to the face of the user meets the one or more error conditions, the computer system detects that the computer system has ceased outputting content of the first type (e.g., in FIG. 7G, electronic device 700 and/or HMD X700 is displaying an immersive user interface (e.g., that occupies greater than a threshold amount of the display), whereas in FIG. 7H, electronic device 700 and/or HMD X700 has ceased displaying immersive content) (e.g., has transitioned from outputting content of the first type to no longer outputting content of the first type); and in response to detecting that the computer system has ceased outputting content of the first type, the computer system outputs the first alert (e.g., in FIG. 7H, electronic device 700 and/or HMD X700 outputs the first alert (e.g., 707, 710, 712, 714-6, and/or 716-6)). Automatically outputting a first alert once content of the first type is no longer being output, allows these operations to be performed automatically without further user input. Furthermore, doing so also provides the user with instructions for correcting the error as soon as possible without interrupting the user's experience, thereby improving the operability of the device.

In some embodiments, the respective criteria includes a stability criterion that is met when the computer system meets stability criteria relative to the face of the user (e.g., the computer system is moving less than a threshold amount (e.g., at less than a threshold speed (e.g., 0.9 m/s, 0.1 m/s, 0.01 m/s, and/or 0.001 m/s), with less than a threshold acceleration (e.g., less than 1 m/s/s, less than 0.1 m/s/s, and/or less than 0.01 m/s/s), and/or less than a threshold magnitude (e.g., less than 5 cm, less than 1 cm, less than 0.5 cm, less than 0.1 cm, less than 0.05 cm, and/or less than 0.01 cm)) relative to the face of the user) (e.g., in FIG. 7B, had the user still been moving electronic device 700 and/or HMD X700 (e.g., user is still putting electronic device on his or her head), electronic device 700 and/or HMD X700 would forgo display of user interface 707 and/or output of audio output 714-1 and/or tactile output 716-1). In some embodiments, the determination that the computer system does not meet respective criteria comprises a determination that the computer system does not meet the stability criteria relative to the face of the user (e.g., the computer system is moving greater than a threshold amount (e.g., at greater than a threshold speed, with greater than a threshold acceleration, and/or greater than a threshold magnitude) relative to the face of the user). Outputting an alert that indicates that the position of the portion of the computer system relative to the face of the user meets one or more error conditions when it is determined that the computer system meets stability criteria relative to the face of the user enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the first alert comprises a suggestion (e.g., an instruction and/or an indication) to replace one or more hardware components of the computer system with a different hardware component (e.g., user interface 707 and/or prompt 710 includes an instruction to replace one or more hardware components of the computer system) (e.g., a hardware component of the same type with a different size and/or shape) (e.g., a light seal component, a display generation component, an ear seal component, and/or a headband component). Outputting an alert suggesting that the user change one or more hardware components of the computer system enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with visual feedback about a state of the device (e.g., the device has determined that one or more hardware components should be changed).

In some embodiments, the first alert comprises a suggestion (e.g., an instruction and/or an indication) to change one or more settings of the computer system (e.g., user interface 707 and/or prompt 710 includes an instruction to change one or more settings of the computer system) (e.g., an interpupillary distance setting and/or one or more display settings). Outputting an alert suggesting that the user change one or more settings of the computer system enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with visual feedback about a state of the device (e.g., the device has determined that one or more settings should be changed).

In some embodiments, the first alert (e.g., 707, 710, 712, 712a, 712b, 712c, 714-1, 714-2, 714-3, X714-3, 714-4, 714-6, 716-1, 716-2, 716-3, X716-3, 716-4, and/or 716-6) comprises a suggestion (e.g., an instruction and/or an indication) to move the portion of the computer system relative to the face of the user (e.g., a suggestion to move the portion of the computer system to the right, to the left, up, and/or down). Outputting an alert suggesting that the user move the portion of the computer system relative to the face of the user enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with visual feedback about a state of the device (e.g., the device has determined that the device should be moved relative to the face of the user).

In some embodiments, aspects/operations of methods 800 and/or 1000 may be interchanged, substituted, and/or added between these methods. For example, in some embodiments, the computer system in method 800 is the computer system in method 1000. For brevity, these details are not repeated here.

FIGS. 9A-9G illustrate example techniques for providing feedback pertaining to device position adjustment, in some embodiments. FIG. 10 is a flow diagram of methods or providing feedback pertaining to device position adjustment, in some embodiments. The user interfaces in FIGS. 9A-9G are used to illustrate the processes in FIG. 10.

Figure 9A:
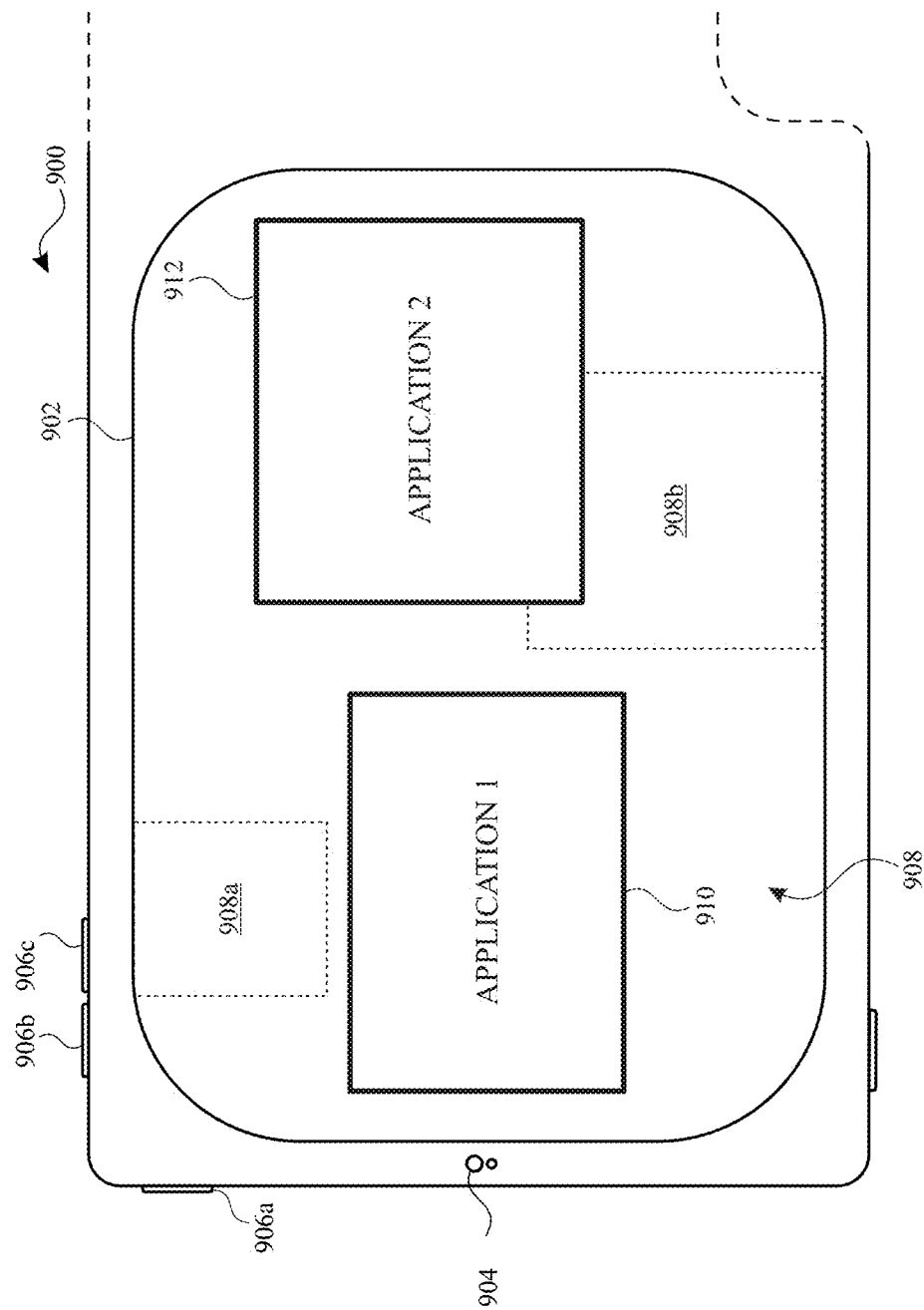
FIGS. 9A-9G illustrate example techniques for providing feedback pertaining to device position adjustment, in some embodiments.

FIG. 9A depicts electronic device 900, which includes display 902, one or more input sensors 904 (e.g., one or more cameras, eye gaze trackers, hand movement trackers, and/or head movement trackers), and physical input devices 1506a-1506c. In some embodiments, electronic device 900 is a smart phone, a tablet a wearable device, a wearable smartwatch device, a head-mounted system (e.g., a headset), or other computer system that includes and/or is in communication with one or more display devices (e.g., display screen, projection device, or the like). In some embodiments, the techniques and user interfaces described in FIGS. 9A-9G are provided by one or more of the devices described in FIGS. 1A-IP. In some embodiments, electronic device 900 includes a pair of display modules that provide stereoscopic content to different eyes of the same user. For example, electronic device 900 includes display module 902 (which provides content to a left eye of the user) and a second display module (which provides content to a right eye of the user). In some embodiments, the second display module displays a slightly different image than display module 902 to generate the illusion of stereoscopic depth.

Any of the features, components, and/or parts, including the arrangements and configurations thereof shown in FIGS. 1B-1P can be included, either alone or in any combination, in electronic device 900. For example, in some embodiments, electronic device 900 includes any of the features, components, and/or parts of HMD 1-100, 1-200, 3-100, 6-100, 6-200, 6-300, 6-400, 11.1.1-100, and/or 11.1.2-100, either alone or in any combination. In some embodiments, display 902 includes any of the features, components, and/or parts of display unit 1-102, display unit 1-202, display unit 1-306, display unit 1-406, display generation component 120, display screens 1-122a-b, first and second rear-facing display screens 1-322a, 1-322b, display 11.3.2-104, first and second display assemblies 1-120a, 1-120b, display assembly 1-320, display assembly 1-421, first and second display sub-assemblies 1-420a, 1-420b, display assembly 3-108, display assembly 11.3.2-204, first and second optical modules 11.1.1-104a and 11.1.1-104b, optical module 11.3.2-100, optical module 11.3.2-200, lenticular lens array 3-110, display region or area 6-232, and/or display/display region 6-334, either alone or in any combination. In some embodiments, input sensor 904 includes any of the features, components, and/or parts of any of sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110a-f, either alone or in any combination. In some embodiments, mechanical input devices 906a-906c include any of the features, components, and/or parts of any of first button 1-128, button 11.1.1-114, second button 1-132, and or dial or button 1-328, either alone or in any combination. In some embodiments, electronic device 900 includes one or more audio output components (e.g., electronic component 1-112) for generating audio feedback, optionally generated based on detected events and/or user inputs detected by the electronic device 900. Electronic device 900 is a computer system (e.g., computer system 101 in FIG. 1A).

At FIG. 9A, electronic device 900 displays, via display 902, user interface 910 corresponding to a first application and user interface 912 corresponding to a second application overlaid on three-dimensional environment 908 which, in the depicted scenario, includes objects 908a, 908b. In some embodiments, three-dimensional environment 908 is displayed by a display (e.g., display 902). In some embodiments, three-dimensional environment 908 includes a virtual environment or an image (or video) of a physical environment captured by one or more cameras (e.g., one or more cameras that are part of input sensors 904 and/or one or more external cameras). For example, in some embodiments, object 908a is a virtual object that is representative of a physical object that has been captured by one or more cameras and/or detected by one or more sensors; and object 908b is a virtual object that is representative of a second physical object that has been captured by one or more cameras and/or detected by one or more sensors, and so forth. In some embodiments, three-dimensional environment 908 is visible to a user through display 902 but is not displayed by a display. For example, in some embodiments, three-dimensional environment 908 is a physical environment (and, for example, objects 908a-908b are physical objects) that is visible to a user (e.g., through one or more transparent displays (e.g., 902) without being displayed by a display.

In various depicted embodiments, electronic device 900 is configured to detect one or more error conditions pertaining to the position of electronic device 900 relative to a portion of the body of a user. For example, in some embodiments, electronic device 900 is a head-mounted system, and electronic device 900 is configured to detect one or more error conditions pertaining to the position of electronic device 900 relative to the face of a user and/or one or more facial features of the user (e.g., the eyer of the user and/or the nose of the user). In certain embodiments, a first group of error conditions and/or a first type of error conditions results in a first type of alert, and a second group of error conditions and/or a second type of error conditions results in a second type of alert that is different from the first type of alert. In some embodiments, the second group of error conditions and/or the second type of error conditions is considered to be more serious, and the second type of alert is more difficult to dismiss than the first type of alert, and/or the second type of alert requires and/or demands more of the user's attention.

Figure 9B:
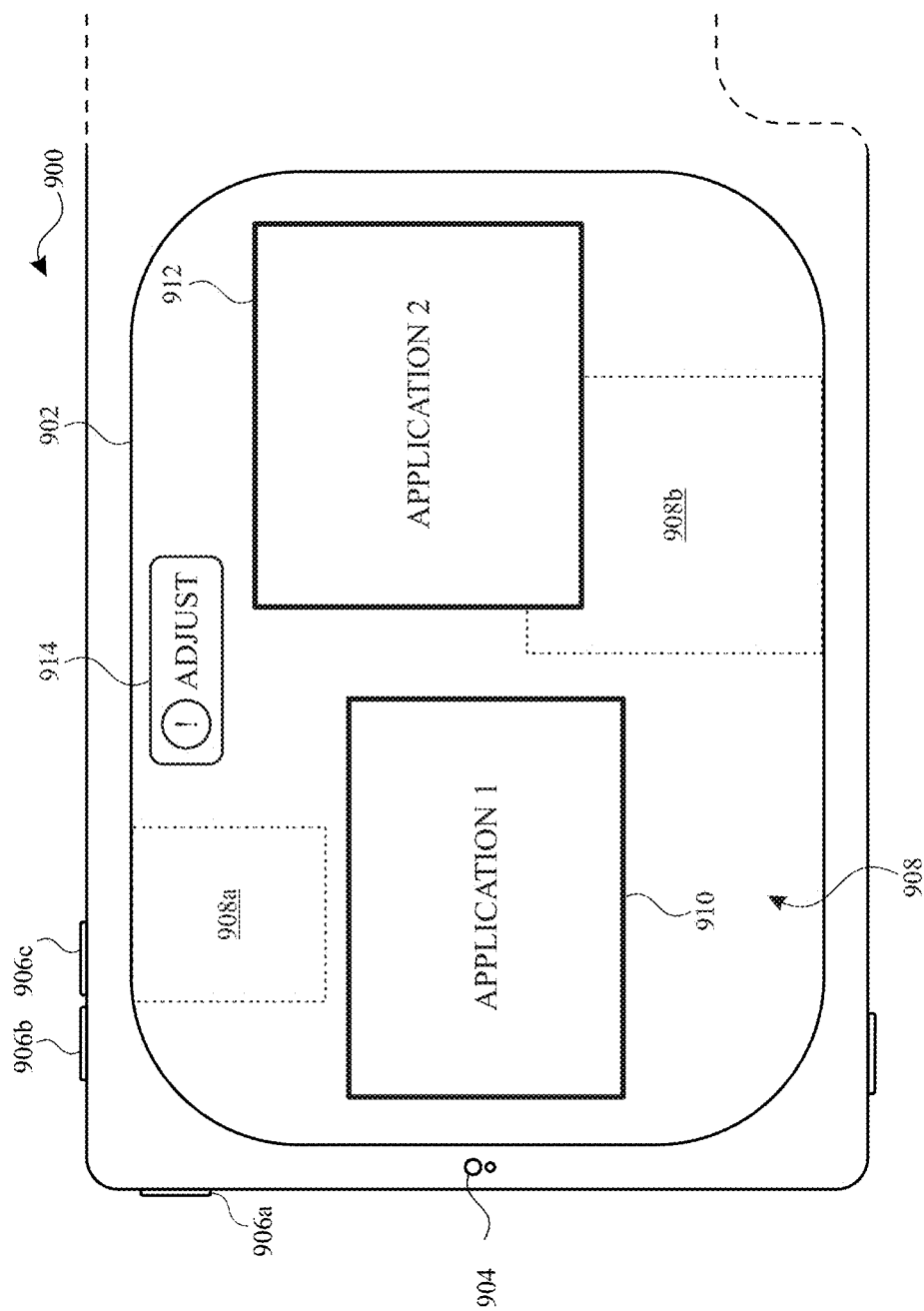
Figure 10:
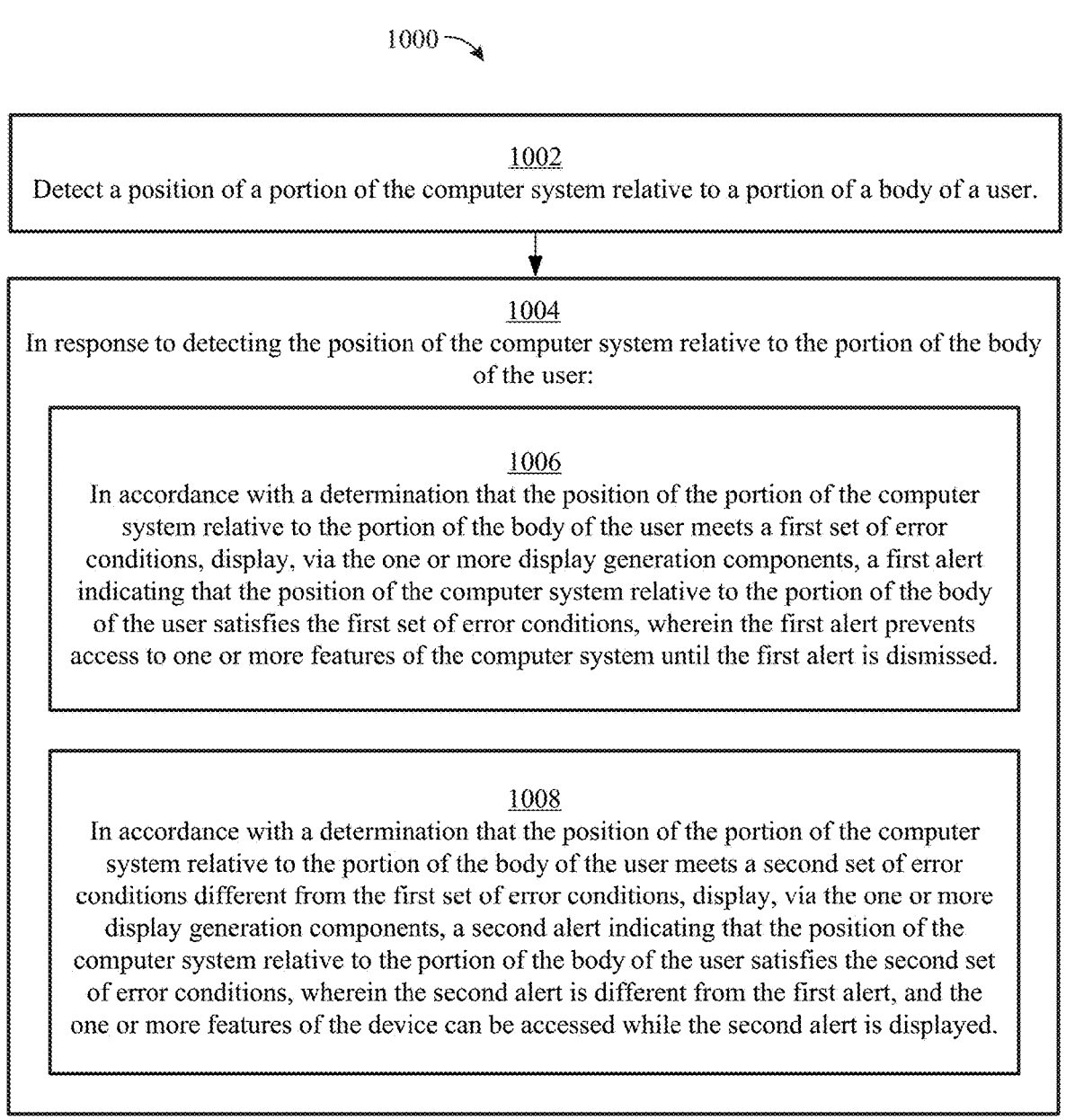
FIG. 10 is a flow diagram of methods of providing feedback pertaining to device position adjustment, in some embodiments.

At FIG. 9B, electronic device 900 detects that the position of electronic device 900 relative to the body of the user (e.g., the face of the user) satisfies a first set of error criteria corresponding to the first type of error conditions. In some embodiments, the first type of error conditions is considered less important or less serious. For example, in some embodiments, the first type of error conditions includes determining that electronic device 900 should be moved to the right, to the left, up, and/or down on the face of the user. In some embodiments, the first type of error conditions includes determining that electronic device 900 should be moved closer to the face of the user. In some embodiments, electronic device 900 is moved closer to or further away from the face of the user by changing one or more components (e.g., hardware components) of electronic device 900. For example, in some embodiments, electronic device 900 is moved closer to or further away from the face of the user by changing a light seal component of electronic device 900 (e.g., light seal 1-110 and/or light seal 1-210) for a different light seal component that has different physical dimensions. At FIG. 9B, based on a determination that the position of electronic device 900 satisfies the first set of error criteria corresponding to the first type of error conditions, electronic device 900 displays alert 914 that notifies the user that the position of electronic device 900 satisfies one or more error conditions. In some embodiments, alert 914 provides the user with instructions as to how to rectify and/or correct the error condition. For example, alert 914 instructs the user to move electronic device 900 to the left, to the right, up, and/or down on the face of the user. In some embodiments, alert 914 instructs the user to change a light seal component of electronic device 900 for a different light seal component.

In some embodiments, alert 914 is displayed as an environment-locked object. At FIG. 9C, the viewpoint of electronic device 900 changes (e.g., based on movement of the user's head as the user wears electronic device 900 on his or her head). Alert 914, being an environment-locked object, maintains its position within three-dimensional environment 908 as the viewpoint of electronic device 900 and/or the viewpoint of the user changes. At FIG. 9D, electronic device 900 detects that the position of electronic device 900 no longer satisfies the first set of error criteria relative to the portion of the body of the user. For example, at FIG. 9D, the user shifts the position of electronic device 900 on his or her face such that it is now positioned correctly. In response to detecting that the position of electronic device 900 no longer satisfies the first set of error criteria relative to the portion of the body of the user, electronic device 900 ceases display of alert 914.

Figure 9C:
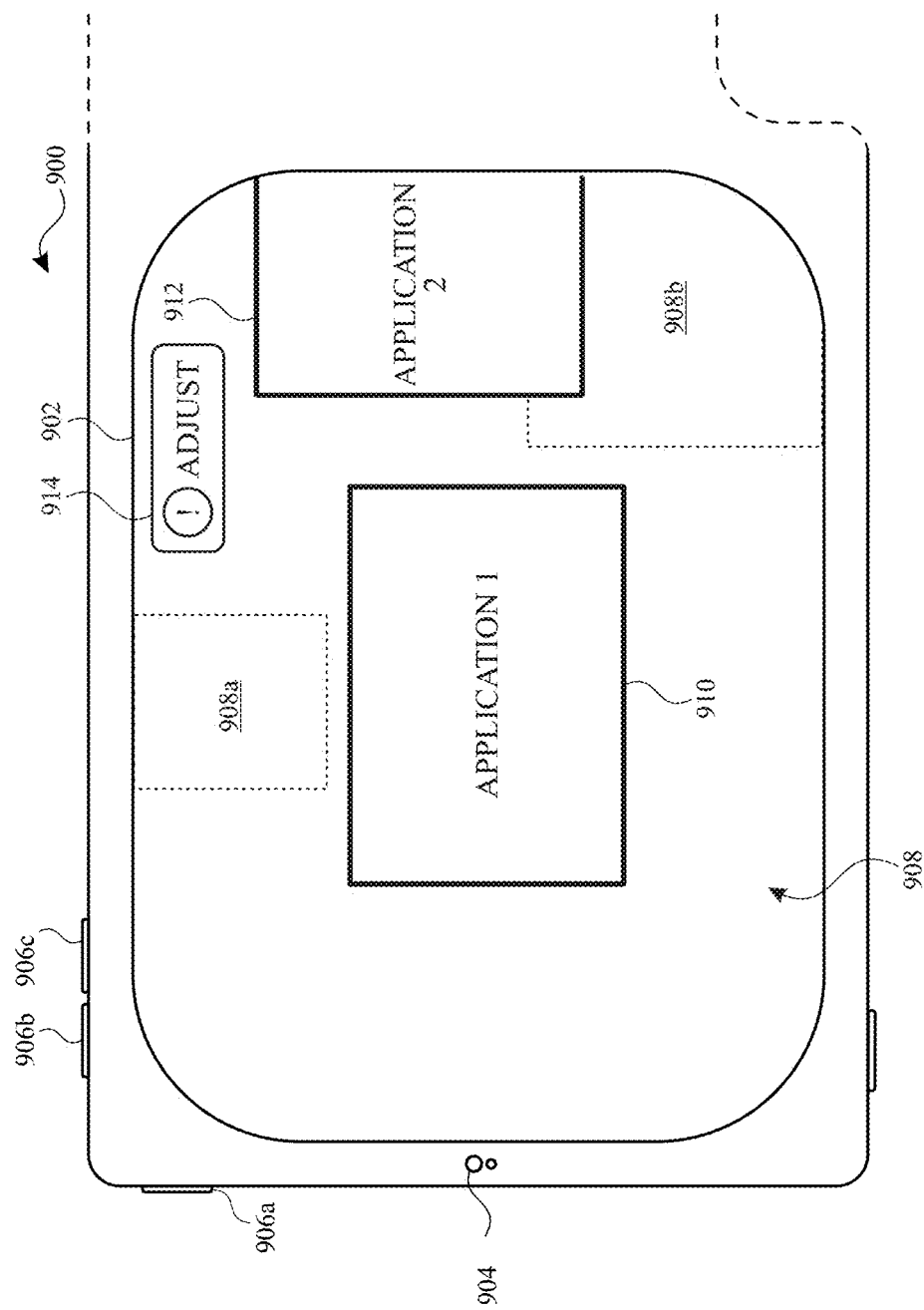
Figure 9D:
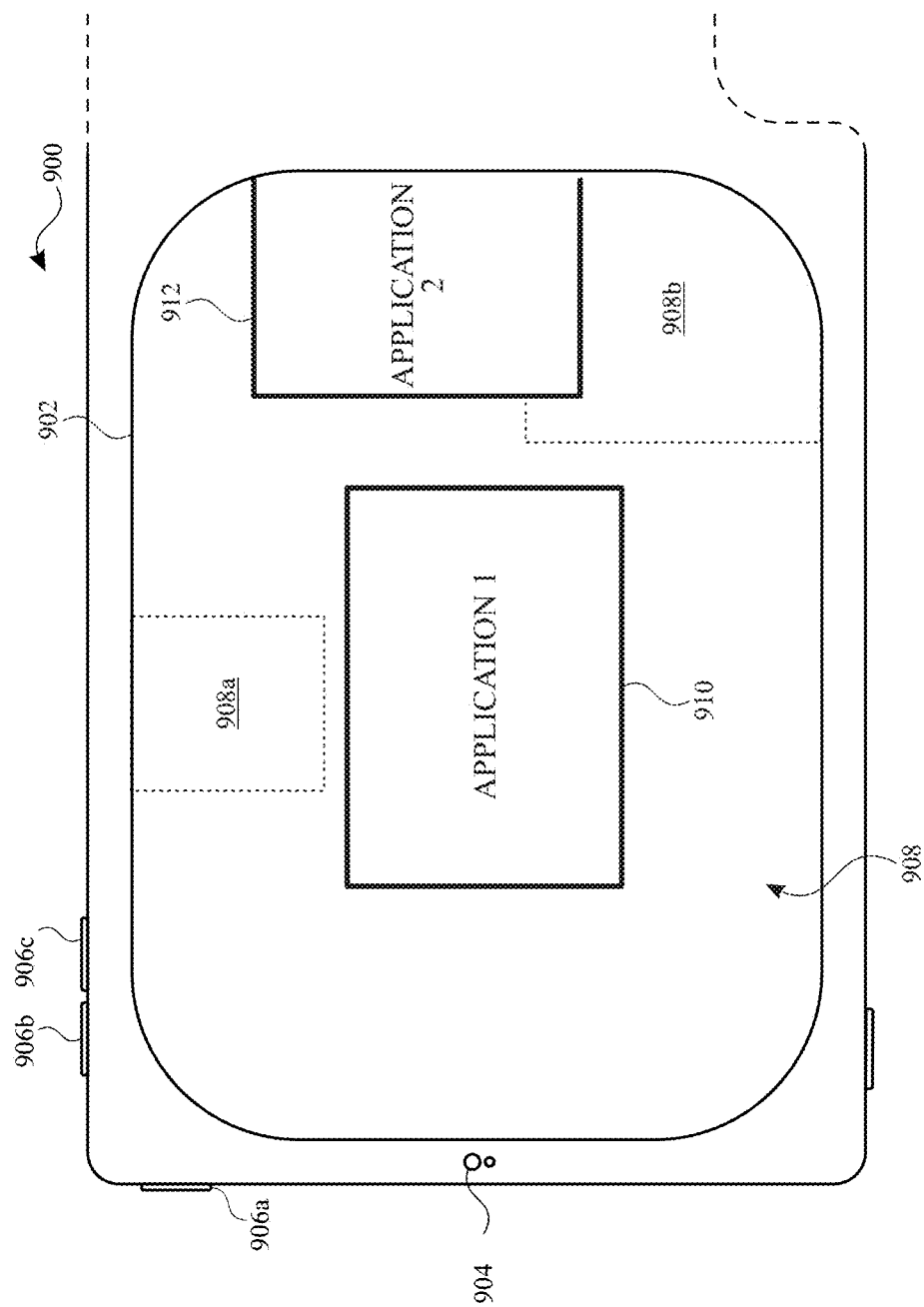
Figure 9E:
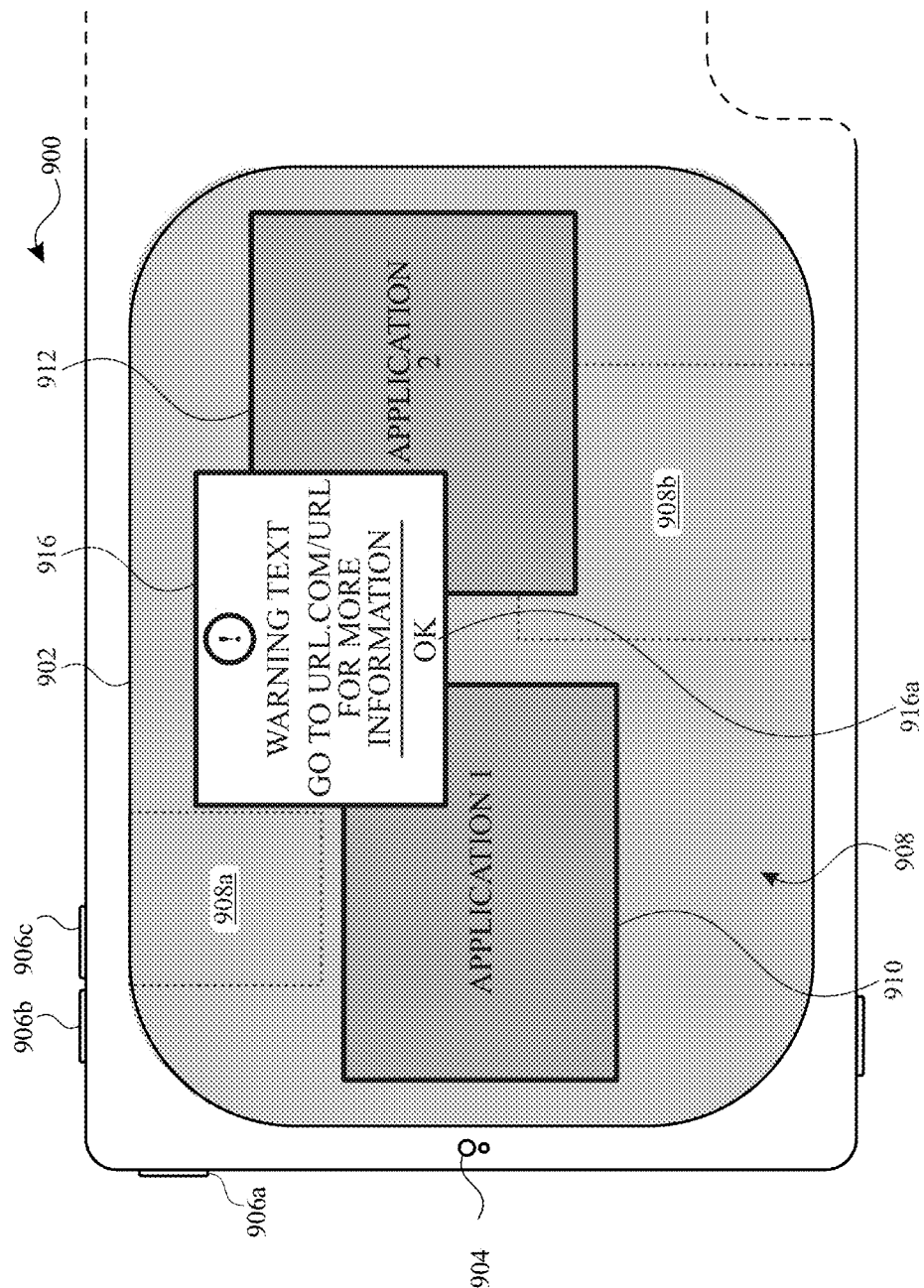
Figure 9F:
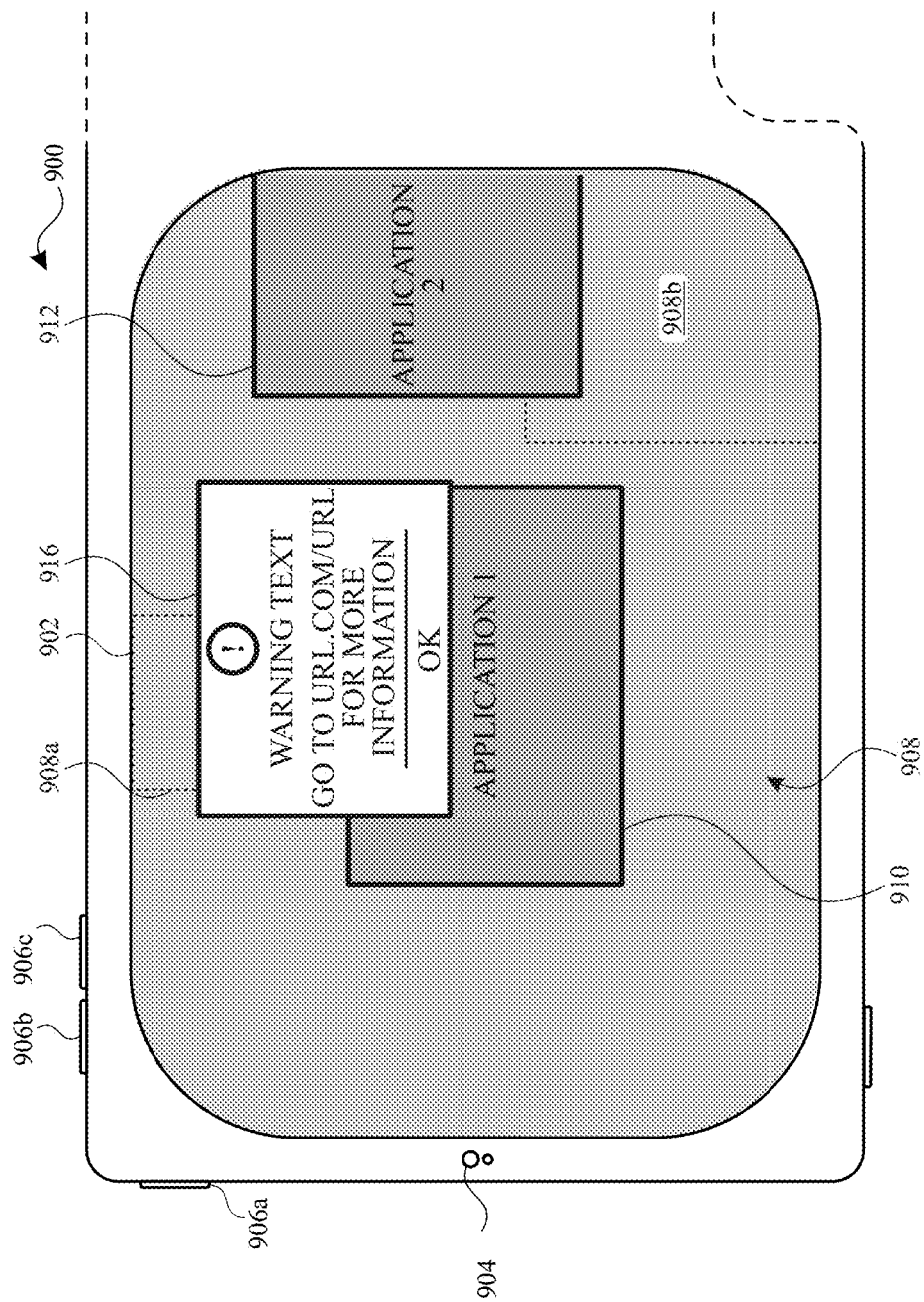

At FIG. 9E, electronic device 900 detects that the position of electronic device 900 relative to the body of the user (e.g., the face of the user) satisfies a second set of error criteria corresponding to a second type of error conditions. In some embodiments, the second type of error conditions is considered more important or more serious than the first type of error conditions. For example, in some embodiments, the second type of error conditions includes determining that one or more components of electronic device 900 are too close to one or more portions of the user's face (e.g., display 902 is too close to the faces, eyes and/or the nose of the user). At FIG. 9E, in response to detecting that the position of electronic device 900 satisfies the second set of error conditions, electronic device 900 displays alert 916. In some embodiments, alert 916 informs the user that the position of electronic device 900 satisfies the second set of error criteria. In some embodiments, alert 916 instructs the user on how to correct the error. For example, in some embodiments, alert 916 instructs the user to change a component (e.g., a light seal component or other component) or electronic device 900, and provides the user with a URL to order the component. In some embodiments, alert 916 requires user input (e.g., on option 916a) to dismiss alert 916 and alert 916 is not dismissed automatically. Furthermore, in the depicted embodiments, alert 916 is displayed as viewpoint-locked object. At FIG. 9F, the viewpoint of electronic device 900 changes (e.g., based on movement of the user's head as the user wears electronic device 900 on his or her head). However, alert 916, as a viewpoint-locked object, remains in the same display position relative to the viewpoint of the user. In some embodiments, while alert 916 is displayed, one or more features of electronic device 900 are unavailable. For example, in some embodiments, while alert 916 is displayed, a user is not able to interact with user interface window 910 or user interface window 912. In some embodiments, when alert 914 of FIG. 9C is displayed, the one or more features of electronic device remain available to the user. For example, in FIG. 9C, while alert 914 is displayed, a user is still able to interact with window 910 and window 912.

Figure 9G:
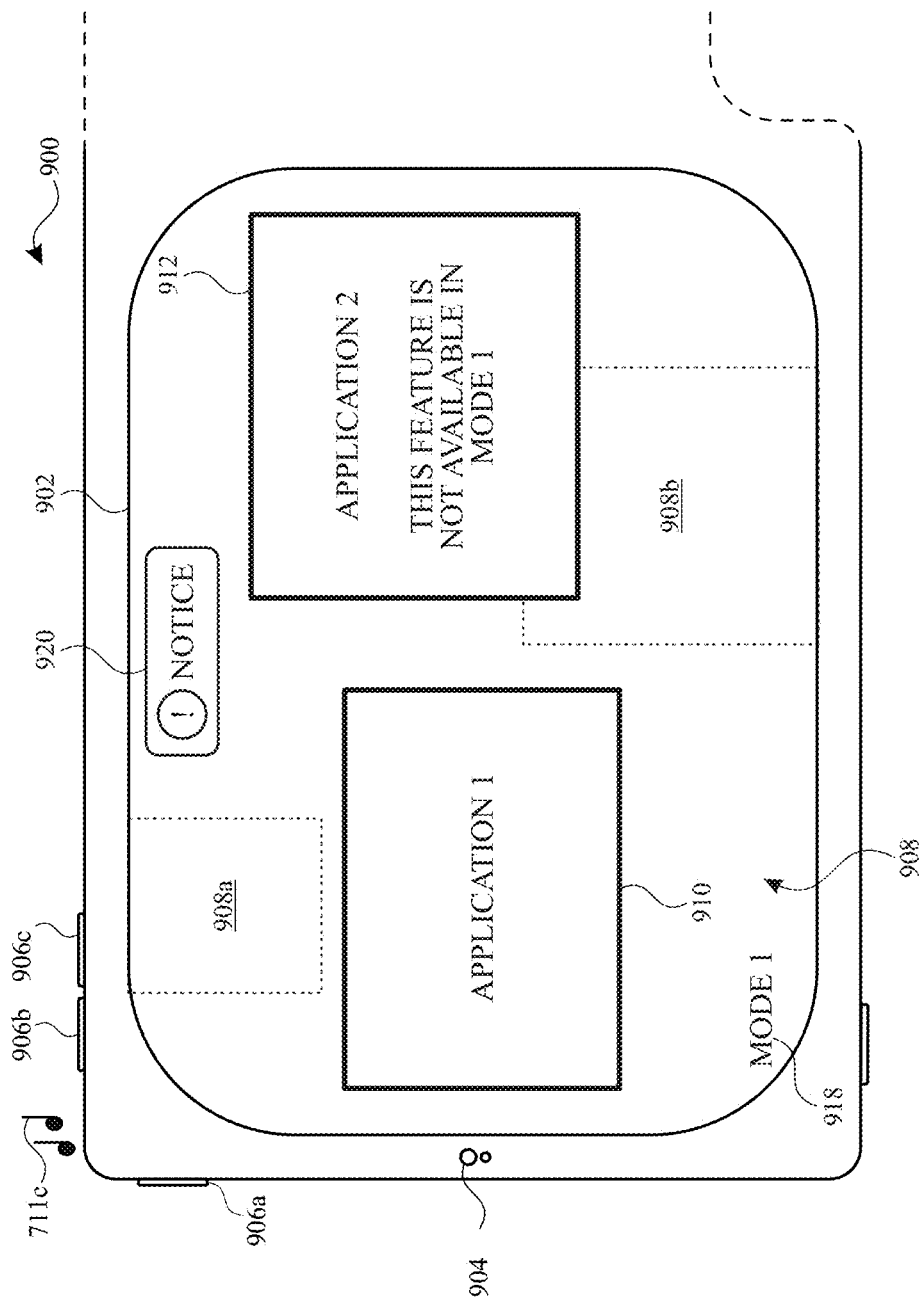

In some embodiments, electronic device 900 outputs different sets of alerts based on an operating state of electronic device 900. For example, in some embodiments, electronic device 900 is operable in an authorized user state or in a guest state. In the guest state, an authorized user has allowed an unauthorized user to use electronic device 900 in the guest state, and electronic device 900 provides access to fewer features and/or less content than when electronic device 900 is operated in the authorized user state. In some embodiments, certain types of alerts are displayed the same in the authorized user state and the guest state. For example, in some embodiments, an alert instructing the user to move the device up, down, left, or right on the user's face is displayed in both operating states. However, in some embodiments, certain alerts are displayed differently in the two operating states. For example, in some embodiments, in the authorized user state of operation, electronic device 900 instructs the user to change a physical component of electronic device 900 and/or order a new physical component. However, in the guest state of operation, electronic device 900 does not instruct the user to order a new physical component, but rather informs the user that the user's experience may be sub-optimal due to one or more error conditions. In FIG. 9G, electronic device 900 is operating in the guest state of operation, and displays indication 918 indicating that electronic device 900 is operating in the guest state of operation. While in the guest state of operation, electronic device 900 detects that the position of electronic device 900 relative to a portion of the body of the user satisfies error criteria. In response, electronic device 900 displays alert 920. In some embodiments, alert 920 is different from alert 920 and/or alert 916 based on a determination that electronic device 900 is operating in the guest state of operation (and not an authorized user state of operation).

FIG. 10 is a flow diagram of an exemplary method 1000 for providing feedback pertaining to device position adjustment, in some embodiments. In some embodiments, method 1000 is performed at a computer system (e.g., computer system 101 in FIG. 1 and/or electronic device 900) (e.g., a smart phone, a smart watch, a tablet, a laptop, a desktop, a wearable device, and/or head-mounted device) that is in communication with one or more display generation components (e.g., 902) (e.g., display generation component 120 in FIGS. 1, 3, and 4) (e.g., a visual output device, a 3D display, a display having at least a portion that is transparent or translucent on which images can be projected (e.g., a see-through display), a projector, a heads-up display, and/or a display controller) and one or more input devices (e.g., 902, 904, and/or 906a-906c) (e.g., a touch-sensitive surface (e.g., a touch-sensitive display); a mouse; a keyboard; a remote control; a visual input device (e.g., one or more cameras (e.g., an Infrared camera, a depth camera, a visible light camera, and/or a gaze tracking camera)); an audio input device; a biometric sensor (e.g., a fingerprint sensor, a face identification sensor, a gaze tracking sensor, and/or an iris identification sensor) and/or one or more mechanical input devices (e.g., a depressible input mechanism; a button; a rotatable input mechanism; a crown; and/or a dial)). In some embodiments, method 1000 is governed by instructions that are stored in a non-transitory (or transitory) computer-readable storage medium and that are executed by one or more processors of a computer system, such as the one or more processors 202 of computer system 101 (e.g., controller 110 in FIG. 1). Some operations in method 1000 are, optionally, combined and/or the order of some operations is, optionally, changed.

The computer system (e.g., 900) detects (1002) a position of a portion of the computer system (e.g., 900) relative to a portion of a body (e.g., a face, eyes, or wrist) of a user (e.g., relative to one or more features of a face of a user (e.g., relative to the eyes of the user and/or relative to the nose of the user)) (in some embodiments, the computer system is worn on the face of the user) (in some embodiments, detecting the position of the computer system relative to the face of the user is performed in response to detecting that the computer system is worn on the face of the user).

In response (1004) to detecting the position of the computer system relative to the portion of the body (e.g., a face, eyes, or wrist) of the user and in accordance with a determination that the position of the portion of the computer system relative to the portion of the body (e.g., a face, eyes, or wrist) of the user meets a first set of error conditions (e.g., in accordance with a determination that the position of the portion of the computer system is too high, too low, too far to the left, and/or too far to the right relative to a target position of the portion of the computer system relative to the body (e.g., face) of the user (e.g., relative to one or more features of the face of the user); and/or in accordance with a determination that the position of the portion of the computer system is too far from and/or too close to the body (e.g., face) of the user (e.g., relative to one or more features and/or a portion of the face of the user)) (e.g., a first set of error conditions that may result in decreased user input accuracy (e.g., decreased gaze input accuracy and/or other input accuracy) and/or a first set of error conditions that represent a potential safety hazard to the user), the computer system (e.g., 900) displays (1006), via the one or more display generation components (e.g., 902), a first alert (e.g., 916) indicating that the position of the computer system relative to the portion of the body (e.g., a face, eyes, or wrist) of the user satisfies the first set of error conditions (e.g., an alert notifying the user that user input may have decreased accuracy, an alert notifying the user of a potential safety hazard to the user, an alert prompting the user to adjust the position of the computer system relative to the face of the user, and/or an alert prompting the user to replace and/or change one or more components of the computer system), wherein the first alert prevents access to one or more features of the computer system until the first alert is dismissed (e.g., until the user performs one or more functions to dismiss the first alert and/or until the first set of error conditions is no longer satisfied).

In response (1004) to detecting the position of the computer system relative to the portion of the body (e.g., a face, eyes, or wrist) of the user and in accordance with a determination that the position of the portion of the computer system relative to the portion of the body (e.g., a face, eyes, or wrist) of the user meets a second set of error conditions different from the first set of error conditions (e.g., in accordance with a determination that the position of the portion of the computer system is too high, too low, too far to the left, and/or too far to the right relative to a target position of the portion of the computer system relative to the body (e.g., face) of the user (e.g., relative to one or more features of the face of the user); and/or in accordance with a determination that the position of the portion of the computer system is too far from and/or too close to the body (e.g., face) of the user (e.g., relative to one or more features and/or a portion of the face of the user)) (e.g., a second set of error conditions that may result in decreased user input accuracy (e.g., decreased gaze input accuracy and/or other input accuracy) and/or a second set of error conditions that do not pose a potential safety hazard to the user), the computer system (e.g., 900) displays (1008), via the one or more display generation components, a second alert (e.g., 914) indicating that the position of the computer system relative to the portion of the body (e.g., a face, eyes, or wrist) of the user satisfies the second set of error conditions (e.g., an alert notifying the user that user input may have decreased accuracy, an alert notifying the user of a potential safety hazard to the user, an alert prompting the user to adjust the position of the computer system relative to the face of the user, and/or an alert prompting the user to replace and/or change one or more components of the computer system) (e.g., without displaying the first alert), wherein the second alert is different from the first alert, and the one or more features of the device can be accessed while the second alert is displayed. Outputting a first alert or a second alert based on a determination that the position of the portion of the computer system relative to the body of the user meets one or more error conditions enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with visual feedback about a state of the device (e.g., the computer system has determined that the position of the computer system relative to the body of the user meets one or more error conditions). Providing such alerts can also improve user safety, by notifying the user of potential safety issues that could arise from the one or more error conditions. Providing a first alert that prevents access to one or more features of the computer system until the alert is dismissed also enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the first alert (e.g., 916) is a viewpoint-locked object and the second alert (e.g., 914) is an environment-locked object. In some embodiments, the first alert is a viewpoint-locked object that exhibits lazy-follow behavior (e.g., follows the viewpoint of the user after a delay and/or after more than a threshold amount of movement by the user). Outputting a first alert or a second alert that indicates that the position of the portion of the computer system relative to the body of the user meets one or more error conditions enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with visual feedback about a state of the device (e.g., the computer system has determined that the position of the computer system relative to the body of the user meets one or more error conditions).

In some embodiments, the first alert (e.g., 916) requires one or more user inputs (e.g., one or more touch inputs, one or more gesture inputs, one or more air gesture inputs, and/or one or more hardware inputs) interacting with a user interface (e.g., 916*a*) to dismiss (e.g., to cease display of) the first alert (e.g., one or more user inputs selecting one or more objects and/or interacting with one or more objects in a displayed user interface) and the second alert (e.g., 914) does not require user inputs interacting with a user interface to dismiss the second alert (e.g., the second alert is automatically dismissed and/or automatically ceases to be displayed when the second set of error conditions ceases to be met). Outputting a first alert or a second alert that indicates that the position of the portion of the computer system relative to the face of the user meets one or more error conditions enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with visual feedback about a state of the device (e.g., the device has determined that the position of the computer system relative to the face of the user meets one or more error conditions). Providing such alerts, and making certain alerts (e.g., the first alert) more difficult to dismiss, can also improve user safety, by notifying the user of potential safety issues that could arise from the one or more error conditions. Providing a first alert that prevents access to one or more features of the computer system until the alert is dismissed also enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the determination that the position of the portion of the computer system (e.g., 900) relative to the portion of the body of the user meets the second set of error conditions includes a determination that the position of the portion of the computer system (e.g., 900) is too far to the left, too far too the right, too high, and/or too low relative to a portion of the body of the user (e.g., relative to the face of the user; and/or relative to one or more features and/or a portion of the face of the user). Outputting a second alert based on a determination that the computer system is too far to the left, too far to the right, too high, and/or too low relative to a portion of the body of a user enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with visual feedback about a state of the device (e.g., the computer system has determined that the computer system is too far to the left, too far to the right, too high, and/or too low relative to a portion of the body of the user).

In some embodiments, when the second set of error conditions is met (e.g., FIG. 9B), gaze tracking of one or more eyes of the user is less accurate (e.g., less precise) than when the second set of error conditions is not met. In some embodiments, when the second set of error conditions is met, gaze tracking accuracy is affected (e.g., negatively affected). Outputting a second alert based on a determination that a set of error conditions that negatively affect gaze tracking accuracy makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with visual feedback about a state of the device (e.g., the computer system has determined that the computer system meets a set of error criteria that negatively affects gaze tracking accuracy).

In some embodiments, at a first time, in accordance with a determination that the position of the portion of the computer system (e.g., 900) relative to the portion of the body of the user meets the second set of error conditions, the computer system (e.g., 900) displays, via the one or more display generation components, the second alert (e.g., 914). In some embodiments, at a second time subsequent to the first time, and while the second alert is displayed, in accordance with a determination that the position of the portion of the computer system (e.g., 900) relative to the portion of the body of the user no longer meets the second set of error conditions, the computer system (e.g., 900) ceases display of the second alert (e.g., FIG. 9D) (e.g., automatically and/or without user input). In some embodiments, while displaying the second alert, the computer system detects movement of the portion of the computer system to a new position relative to the portion of the body of the user; and subsequent to detecting movement of the portion of the computer system to a new position relative to the portion of the body of the user, in accordance with a determination that the new position does not meet the second set of error conditions, the computer system ceases display of the second alert. Automatically ceasing display of the second alert when the second set of error conditions is not met allows for this operation to be performed with fewer and/or no user inputs. Ceasing display of the second alert when the second set of error conditions is no longer met also makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with visual feedback about a state of the device (e.g., the computer system has determined that the second set of error conditions is no longer met).

In some embodiments, while detecting the position of the portion of the computer system relative to the portion of the body of the user, the computer system (e.g., 900) displays, via the one or more display generation components, first content (e.g., 910 and/or 912) in a first manner (e.g., FIG. 9A) (e.g., a first manner that indicates that the first content is currently selected and/or currently in focus, a first brightness, a first saturation, a first opacity, a first contrast, a first focus, and/or a first sharpness). In response to detecting the position of the portion of the computer system (e.g., 900) relative to the portion of the body of the user: in accordance with a determination that the position of the portion of the computer system (e.g., 900) relative to the portion of the body of the user meets the first set of error conditions (e.g., FIG. 9E), the computer system (e.g., 900) displays the first content (e.g., 910 and/or 912) in a second manner (e.g., FIG. 9E) different from the first manner (or, in some embodiments, ceasing display of at least a portion of the first content) (e.g., a second manner that indicates that the first content is not currently selected and/or not in focus, a second brightness, a second saturation, a second opacity, a second contrast, a second focus, a second sharpness, and/or a second manner that visually deemphasizes the first content compared to the first manner (e.g., decreased brightness, decreased saturation, decreased sharpness, and/or decreased opacity)) (e.g., displaying the first content in the second manner while displaying the first alert and/or while concurrently displaying the first alert) and in accordance with a determination that the position of the portion of the computer system (e.g., 900) relative to the portion of the body of the user meets the second set of error conditions, the computer system (e.g., 900) maintains display of the first content (e.g., 910 and/or 912) in the first manner (e.g., FIG. 9B) (e.g., while displaying the second alert and/or while concurrently displaying the second alert). Displaying the first content in the second manner when the first alert is displayed draws the user's attention to the first alert, which enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, displaying the first content (e.g., 910 and/or 912) in the second manner (e.g., FIG. 9E) comprises displaying the first content in a second manner that visually deemphasizes the first content compared to the first manner (e.g., decreased brightness, decreased saturation, decreased sharpness, and/or decreased opacity compared to the first manner). In some embodiments, displaying the first content in the second manner comprises fading out the first content. Visually deemphasizing and/or fading out the first content when the first is displayed enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, while displaying the first content (e.g., 910 and/or 912), the computer system (e.g., 900) receives, via the one or more input devices, a first user input (e.g., one or more touch inputs, one or more gesture inputs, one or more air gesture inputs, one or more gaze-based inputs, and/or one or more hardware inputs). In response to receiving the first user input: in accordance with a determination that the first content is displayed in the first manner (e.g., FIG. 9A and/or FIG. 9B) (e.g., while the second set of error conditions is met, while the first set of error conditions is not met, while the second alert is displayed, while the first alert is not displayed, while the first and second sets of error conditions are not met, and/or while the first and second alerts are not displayed), the computer system (e.g., 900) modifies display of the first content in response to the first user input; and in accordance with a determination that the first content is displayed in the second manner (e.g., FIG. 9E) (e.g., while the first set of error conditions is met and/or while the first alert is displayed), the computer system (e.g., 900) forgoes modifying display of the first content in response to the first user input. In some embodiments, while the first alert is displayed, a user is prevented from and/or prohibited from interacting with the first content until the first alert is dismissed and/or until the first alert ceases to be displayed. Preventing user interaction with the first content while the first alert is displayed and/or while the first content is displayed in the second manner enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the determination that the position of the portion of the computer system (e.g., 900) relative to the portion of the body of the user meets the first set of error conditions includes a determination that the portion of the computer system (e.g., 900) is too close to one or more eyes of the user (e.g., is less than a threshold distance away from the one or more eyes of the user (e.g., less than 8 cm, less than 7 cm, less than 6 cm, less than 5 cm, less than 4 cm, less than 3 cm, less than 2 cm, or less than 1 cm)). In some embodiments, a light seal component (e.g., 1-110 and/or 1-210) extends the computer system away from the eyes of the user and/or determines (at least in part) the distance of the portion of the computer system from the one or more eyes of the user. In some embodiments, the light seal component (e.g., 1-110 and/or 1-210) is a physical component that fits between the user's face and the computer system, a display device, and/or one or more display generation components to block out light (e.g., prevent light (e.g., some light and/or all light) (e.g., external light and/or light that is not output by the computer system, a display device, and/or one or more display generation components) from reaching the eyes of the user. In some embodiments, the determination that the portion of the computer system is too close to one or more eyes of the user comprises a determination that a light seal component (e.g., 1-110 and/or 1-210) having different physical dimensions (e.g., a larger depth) should be used by the user. Outputting a first alert based on a determination that the computer system is too close to the user's eyes enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with visual feedback about a state of the device (e.g., the computer system has determined that the computer system is too close to the eyes of the user). Providing such alerts can also improve user safety, by notifying the user of potential safety issues that could arise from the one or more error conditions.

In some embodiments, when the first set of error conditions is met (e.g., FIG. 9E), the user is using the computer system in a way that is has a reduced margin of safety (e.g., degree of safety) compared to when the first set of error conditions is not met. In some embodiments, the first set of error conditions is indicative of the device being used in a way that has a reduced margin of safety relative to standard, expected, and/or recommended usage. In some embodiments, the first set of error conditions correspond to eye safety. In some embodiments, the first set of error conditions implement and/or correspond to industry best practices to ensure that the computer system is being operated safely and to ensure user safety. In some embodiments, the first set of error conditions, the second set of error conditions, the first alert, and/or the second alert represent an effort to implement industry best practices to ensure that the computer system is being operated safely and to ensure user safety. For example, in some embodiments, the first alert and/or the second alert notify the user when there is a potential risk for user safety, and notify the user of steps that can be taken to minimize and/or substantially eliminate risk of user safety and/or direct the user to resources to ensure that the user is using the device in the safest possible manner. In some embodiments, when the second set of error conditions is met, the user is operating the device within a standard margin of safety. In some embodiments, operation of the device is more safe when the second set of error conditions is met than when the first set of error conditions is met. Outputting a first alert based on a determination that a set of error conditions that could negatively affect the safety of the user's eyes improves user safety. Doing so also enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with visual feedback about a state of the device.

In some embodiments, the first alert (e.g., 916) directs the user to one or more resources for addressing the first set of error conditions (e.g., directs the user to one or more resources that can assist the user to fix and/or address the first set of error conditions). In some embodiments, the one or more resources include one or more URL links. In some embodiments, the one or more resources include contact information (e.g., email address, phone number, physical address, and/or social media handle) for one or more entities. Providing the user with one or more resources for addressing the first set of error conditions enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the one or more resources direct the user to a first store (e.g., a physical store and/or an online store) (e.g., a URL for accessing an online store) for acquiring (e.g., purchasing and/or exchanging) a first accessory (e.g., a first physical accessory and/or a first physical part (e.g., a first light seal (e.g., 1-110 and/or 1-210) (e.g., a physical component (e.g., a physical component that fits between the user's face and the computer system, a display device, and/or one or more display generation components) to block out light (e.g., prevent light (e.g., some light and/or all light) (e.g., external light and/or light that is not output by the computer system, a display device, and/or one or more display generation components) from reaching the eyes of the user))) for addressing the first set of error conditions. Providing the user with one or more resources for addressing the first set of error conditions enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the computer system (e.g., 900) detects that the user has stopped using the computer system (e.g., 900) (e.g., detecting that the user has taken the computer system off of his or her body and/or one or more portions of the body of the user are no longer at a particular position with respect to one or more portions of the computer system (e.g., one or more eyes of the user are no longer detected in front of the one or more display generation components and/or are no longer detected within an eye box of the computer system)). Subsequent to detecting that the user has stopped using the computer system (e.g., 900), the computer system (e.g., 900) detects that the user has resumed using the computer system (e.g., 900) (e.g., detecting that the user has worn the computer system on his or her body and/or one or more portions of the body of the user are detected at a particular position with respect to one or more portions of the computer system (e.g., one or more eyes of the user are detected in front of the one or more display generation components and/or are detected within an eye box of the computer system)). Subsequent to detecting that the user has resumed using the computer system (e.g., 900), the computer system (e.g., 900) detects a second position of the portion of the computer system (e.g., 900) relative to the portion of the body (e.g., a face, eyes, or wrist) of the user (e.g., relative to one or more features of a face of a user (e.g., relative to the eyes of the user and/or relative to the nose of the user)) (in some embodiments, the computer system is worn on the face of the user) (in some embodiments, detecting the position of the computer system relative to the face of the user is performed in response to detecting that the computer system is worn on the face of the user). In response to detecting the second position of the computer system (e.g., 900) relative to the portion of the body (e.g., a face, eyes, or wrist) of the user: in accordance with a determination that the second position of the portion of the computer system (e.g., 900) relative to the portion of the body of the user meets the first set of error conditions (e.g., FIG. 9E), the computer system (e.g., 900) displays, via the one or more display generation components, the first alert (e.g., 916); and in accordance with a determination that the second position of the portion of the computer system (e.g., 900) relative to the portion of the body of the user meets the second set of error conditions (e.g., FIG. 9B), the computer system (e.g., 900) displays, via the one or more display generation components, the second alert (e.g., 914). In some embodiments, the first alert and/or the second alert are re-displayed when the user initiates a subsequent session (e.g., even if the user dismisses the first alert and/or the second alert in the previous session). Outputting a first alert or a second alert based on a determination that the position of the portion of the computer system relative to the body of the user meets one or more error conditions enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with visual feedback about a state of the device (e.g., the computer system has determined that the position of the computer system relative to the body of the user meets one or more error conditions). Providing such alerts can also improve user safety, by notifying the user of potential safety issues that could arise from the one or more error conditions. Providing a first alert that prevents access to one or more features of the computer system until the alert is dismissed also enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the computer system (e.g., 900) detects a third position of the portion of the computer system relative to the portion of the body (e.g., a face, eyes, or wrist) of the user (e.g., relative to one or more features of a face of a user (e.g., relative to the eyes of the user and/or relative to the nose of the user)) (in some embodiments, the computer system is worn on the face of the user) (in some embodiments, detecting the position of the computer system relative to the face of the user is performed in response to detecting that the computer system is worn on the face of the user). In response to detecting the third position of the computer system (e.g., 900) relative to the portion of the body (e.g., a face, eyes, or wrist) of the user: in accordance with a determination that the third position of the portion of the computer system (e.g., 900) relative to the portion of the body of the user meets the first set of error conditions (e.g., FIG. 9E) and that the first set of error conditions has been met (e.g., has been continuously met, and/or has been met with less than a threshold amount of interruption) for greater than a threshold duration of time (e.g., greater than 0.25 seconds, greater than 0.5 seconds, or greater than 1 second), the computer system (e.g., 900) displays, via the one or more display generation components, the first alert (e.g., 916); and in accordance with a determination that the third position of the portion of the computer system (e.g., 900) relative to the portion of the body of the user meets the first set of error conditions and that the first set of error conditions has been met for less than the threshold duration of time (e.g., less than 0.25 seconds, less than 0.5 seconds, or less than 1 second), the computer system (e.g., 900) forgoes display of the first alert (e.g., 916) (e.g., forgoing display of the first alert until the first set of error conditions has been met for greater than the threshold duration of time). Delaying display of the first alert until the first set of error conditions has been met for greater than a threshold duration of time enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the computer system (e.g., 900) detects a fourth position of the portion of the computer system (e.g., 900) relative to the portion of the body (e.g., a face, eyes, or wrist) of the user (e.g., relative to one or more features of a face of a user (e.g., relative to the eyes of the user and/or relative to the nose of the user)) (in some embodiments, the computer system is worn on the face of the user) (in some embodiments, detecting the position of the computer system relative to the face of the user is performed in response to detecting that the computer system is worn on the face of the user). In response to detecting the fourth position of the computer system (e.g., 900) relative to the portion of the body (e.g., a face, eyes, or wrist) of the user: in accordance with a determination that the fourth position of the portion of the computer system (e.g., 900) relative to the portion of the body of the user meets the second set of error conditions (e.g., FIG. 9B) and that the second set of error conditions has been met (e.g., has been continuously met, and/or has been met with less than a threshold amount of interruption) for greater than a second threshold duration of time (e.g., greater than 0.25 seconds, greater than 0.5 seconds, or greater than 1 second), the computer system (e.g., 900) displays, via the one or more display generation components, the second alert (e.g., 914); and in accordance with a determination that the fourth position of the portion of the computer system (e.g., 900) relative to the portion of the body of the user meets the second set of error conditions and that the second set of error conditions has been met for less than the second threshold duration of time (e.g., less than 0.25 seconds, less than 0.5 seconds, or less than 1 second), the computer system (e.g., 900) forgoes display of the second alert (e.g., 914) (e.g., forgoing display of the second alert until the second set of error conditions has been met for greater than the second threshold duration of time). Delaying display of the second alert until the second set of error conditions has been met for greater than a threshold duration of time enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the computer system (e.g., 900) detects a fifth position of the portion of the computer system relative to the portion of the body (e.g., a face, eyes, or wrist) of the user (e.g., relative to one or more features of a face of a user (e.g., relative to the eyes of the user and/or relative to the nose of the user)) (in some embodiments, the computer system is worn on the face of the user) (in some embodiments, detecting the position of the computer system relative to the face of the user is performed in response to detecting that the computer system is worn on the face of the user). In response to detecting the fifth position of the computer system (e.g., 900) relative to the portion of the body (e.g., a face, eyes, or wrist) of the user: in accordance with a determination that the fifth position of the portion of the computer system (e.g., 900) relative to the portion of the body of the user meets the first set of error conditions and that the computer system (e.g., 900) is operating in a first mode of operation (e.g., an authorized user mode of operation and/or a mode of operation indicative of the computer system being used by an authorized user, a known user, and/or a registered user) (e.g., an unrestricted mode of operation, an authorized user mode of operation, a known user mode of operation, and/or a recognized user mode of operation) that includes permitted access to a plurality of features (e.g., FIG. 9E) (e.g., a plurality of features associated with a logged in user experience and/or a plurality of features associated with an authorized user, a registered user, and/or a known user), the computer system (e.g., 900) displays, via the one or more display generation components, the first alert (e.g., 916); and in accordance with a determination that the fifth position of the portion of the computer system (e.g., 900) relative to the portion of the body of the user meets the first set of error conditions and that the computer system (e.g., 900) is operating in a guest mode of operation (e.g., FIG. 9G, as indicated by mode indication 918) that has restricted access to one or more of the plurality of features (e.g., a guest mode of operation that has access to a subset of the plurality of features that are accessible in the first mode of operation, and/or a guest mode of operation that has access to fewer features than are available in the first mode of operation), the computer system (e.g., 900) displays, via the one or more display generation components, a third alert (e.g., 920) different from the first alert (e.g., 916). Displaying different alerts based on whether the computer system is operating in the first mode of operation or operating in the guest mode of operation enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the computer system (e.g., 900) detects a sixth position of the portion of the computer system relative to the portion of the body (e.g., a face, eyes, or wrist) of the user (e.g., relative to one or more features of a face of a user (e.g., relative to the eyes of the user and/or relative to the nose of the user)) (in some embodiments, the computer system is worn on the face of the user) (in some embodiments, detecting the position of the computer system relative to the face of the user is performed in response to detecting that the computer system is worn on the face of the user). In response to detecting the sixth position of the computer system (e.g., 900) relative to the portion of the body (e.g., a face, eyes, or wrist) of the user: in accordance with a determination that the sixth position of the portion of the computer system (e.g., 900) relative to the portion of the body of the user meets the second set of error conditions (e.g., FIG. 9B) and that the computer system is operating in a first mode of operation (e.g., an authorized user mode of operation and/or a mode of operation indicative of the computer system being used by an authorized user, a known user, and/or a registered user) (e.g., an unrestricted mode of operation, an authorized user mode of operation, a known user mode of operation, and/or a recognized user mode of operation) that includes permitted access to a plurality of features (e.g., a plurality of features associated with a logged in user experience and/or a plurality of features associated with an authorized user, a registered user, and/or a known user), the computer system (e.g., 900) displays, via the one or more display generation components, the second alert (e.g., 914); and in accordance with a determination that the sixth position of the portion of the computer system (e.g., 900) relative to the portion of the body of the user meets the second set of error conditions and that the computer system (e.g., 900) is operating in a guest mode of operation (e.g., FIG. 9G, as indicated by mode indication 918) that has restricted access to one or more of the plurality of features (e.g., a guest mode of operation that has access to a subset of the plurality of features that are accessible in the first mode of operation, and/or a guest mode of operation that has access to fewer features than are available in the first mode of operation), the computer system (e.g., 900) displays, via the one or more display generation components, a fourth alert (e.g., 920) different from the second alert. Displaying different alerts based on whether the computer system is operating in the first mode of operation or operating in the guest mode of operation enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the first alert (e.g., 916) prompts the user to change a light seal component (e.g., 1-110 and/or 1-210) (e.g., a physical component (e.g., a physical component that fits between the user's face and the computer system, a display device, and/or one or more display generation components) to block out light (e.g., prevent light (e.g., some light and/or all light) (e.g., external light and/or light that is not output by the computer system, a display device, and/or one or more display generation components) from reaching the eyes of the user) of the computer system (e.g., 900) that reduces an amount of external light that reaches the user's eyes while the display generation component is worn by the user (e.g., change the light seal component to a different light seal component that has different physical dimensions (e.g., a different depth and/or width; and/or a light seal that moves one or more components of the computer system closer to the eyes of the user and/or further from the eyes of the user) than a current light seal component). Prompting the user to change a light seal component of the computer system enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the second alert (e.g., 914) prompts the user to change a light seal component (e.g., 1-110 and/or 1-210) (e.g., a physical component (e.g., a physical component that fits between the user's face and the computer system, a display device, and/or one or more display generation components) to block out light (e.g., prevent light (e.g., some light and/or all light) (e.g., external light and/or light that is not output by the computer system, a display device, and/or one or more display generation components) from reaching the eyes of the user) of the computer system (e.g., 900) that reduces an amount of external light that reaches the user's eyes while the display generation component is worn by the user (e.g., change the light seal component to a different light seal component that has different physical dimensions (e.g., a different depth and/or width; and/or a light seal that moves one or more components of the computer system closer to the eyes of the user and/or further from the eyes of the user) than a current light seal component). Prompting the user to change a light seal component of the computer system enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, aspects/operations of methods 800 and 1000 may be interchanged, substituted, and/or added between these methods. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve XR experiences of users. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve an XR experience of a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of XR experiences, the present technology can be configured to allow users to select to "opt in" or "opt out" of participation in the collection of personal information data during registration for services or anytime thereafter. In another example, users can select not to provide data for customization of services. In yet another example, users can select to limit the length of time data is maintained or entirely prohibit the development of a customized service. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an XR experience can generated by inferring preferences based on non-personal information data or a bare minimum amount of personal information, such as the content being requested by the device associated with a user, other non-personal information available to the service, or publicly available information.

What is claimed is:

1. A computer system configured to communicate with one or more display generation components and one or more input devices, the computer system comprising:
   one or more processors; and
   memory storing one or more programs configured to be executed by the one or more processors, the one or more programs including instructions for:
      detecting a position of a portion of the computer system relative to a face of a user; and
      in response to detecting the position of the portion of the computer system relative to the face of the user:
         in accordance with a determination that the computer system meets respective criteria while the position of the portion of the computer system relative to the face of the user meets one or more error conditions, wherein the respective criteria include a requirement that the computer system is operating in a respective context in order for the respective criteria to be met, outputting a first alert indicating that the position of the portion of the computer system relative to the face of the user meets the one or more error conditions; and
         in accordance with a determination that the computer system does not meet the respective criteria while the position of the portion of the computer system relative to the face of the user meets the one or more error conditions, forgoing outputting the first alert.

2. The computer system of claim 1, the one or more programs further including instructions for:
   subsequent to forgoing outputting the first alert in accordance with the determination that the computer system does not meet the respective criteria while the position of the portion of the computer system relative to the face of the user meets the one or more errors conditions:
      in accordance with a determination that the computer system meets the respective criteria while the position of the portion of the computer system relative to the face of the user meets the one or more error conditions, outputting the first alert indicating that the position of the portion of the computer system relative to the face of the user meets the one or more error conditions.

3. The computer system of claim 1, the one or more programs further including instructions for:
   in response to detecting the position of the portion of the computer system relative to the face of the user:
      in accordance with a determination that the position of the portion of the computer system relative to the face of the user does not meet the one or more error conditions, forgoing outputting the first alert.

4. The computer system of claim 1, wherein outputting the first alert indicating that the position of the portion of the computer system relative to the face of the user meets the one or more error conditions comprises:
   outputting an initial alert;
   while outputting the initial alert, detecting, via the one or more input devices, first movement of the portion of the computer system relative to the face of the user; and
   in response to detecting the first movement of the portion of the computer system relative to the face of the user, outputting a revised alert different from the initial alert based on the first movement of the portion of the computer system relative to the face of the user.

5. The computer system of claim 1, wherein outputting the first alert indicating that the position of the portion of the computer system relative to the face of the user meets the one or more error conditions comprises displaying, via the one or more display generation components, a visual alert indicating that the position of the portion of the computer system relative to the face of the user meets the one or more error conditions.

6. The computer system of claim 1, wherein outputting the first alert indicating that the position of the portion of the computer system relative to the face of the user meets the one or more error conditions comprises outputting a non-visual alert indicating that the position of the portion of the computer system relative to the face of the user meets the one or more error conditions.

7. The computer system of claim 1, wherein outputting the first alert indicating that the position of the portion of the computer system relative to the face of the user meets the one or more error conditions comprises:
   outputting an alert indicating that a light seal component of the computer system meets one or more light seal error conditions.

8. The computer system of claim 1, wherein outputting the first alert indicating that the position of the computer system relative to the face of the user meets the one or more error conditions comprises:
  outputting an alert indicating that the eyes of the user are too close or too far from the portion of the computer system.

9. The computer system of claim 1, wherein the respective criteria includes a content-type criterion that is met when the computer system is not outputting content of a first type.

10. The computer system of claim 9, wherein the content of the first type is immersive experience content.

11. The computer system of claim 10, the one or more programs further including instructions for:
  subsequent to forgoing outputting the first alert in accordance with the determination that the computer system does not meet the respective criteria while the position of the portion of the computer system relative to the face of the user meets the one or more error conditions:
    detecting that the computer system has ceased outputting content of the first type; and
    in response to detecting that the computer system has ceased outputting content of the first type, outputting the first alert.

12. The computer system of claim 1, wherein the respective criteria includes a stability criterion that is met when the computer system meets stability criteria relative to the face of the user.

13. The computer system of claim 1, wherein the first alert comprises a suggestion to replace one or more hardware components of the computer system with a different hardware component.

14. The computer system of claim 1, wherein the first alert comprises a suggestion to change one or more settings of the computer system.

15. The computer system of claim 1, wherein the first alert comprises a suggestion to move the portion of the computer system relative to the face of the user.

16. A non-transitory computer-readable storage medium storing one or more programs configured to be executed by one or more processors of a computer system that is in communication with one or more display generation components and one or more input devices, the one or more programs including instructions for:
  detecting a position of a portion of the computer system relative to a face of a user; and
  in response to detecting the position of the portion of the computer system relative to the face of the user:
    in accordance with a determination that the computer system meets respective criteria while the position of the portion of the computer system relative to the face of the user meets one or more error conditions, wherein the respective criteria include a requirement that the computer system is operating in a respective context in order for the respective criteria to be met, outputting a first alert indicating that the position of the portion of the computer system relative to the face of the user meets the one or more error conditions; and
    in accordance with a determination that the computer system does not meet the respective criteria while the position of the portion of the computer system relative to the face of the user meets the one or more error conditions, forgoing outputting the first alert.

17. The non-transitory computer-readable storage medium of claim 16, the one or more programs further including instructions for:
  subsequent to forgoing outputting the first alert in accordance with the determination that the computer system does not meet the respective criteria while the position of the portion of the computer system relative to the face of the user meets the one or more errors conditions:
    in accordance with a determination that the computer system meets the respective criteria while the position of the portion of the computer system relative to the face of the user meets the one or more error conditions, outputting the first alert indicating that the position of the portion of the computer system relative to the face of the user meets the one or more error conditions.

18. The non-transitory computer-readable storage medium of claim 16, the one or more programs further including instructions for:
  in response to detecting the position of the portion of the computer system relative to the face of the user:
    in accordance with a determination that the position of the portion of the computer system relative to the face of the user does not meet the one or more error conditions, forgoing outputting the first alert.

19. The non-transitory computer-readable storage medium of claim 16, wherein outputting the first alert indicating that the position of the portion of the computer system relative to the face of the user meets the one or more error conditions comprises:
  outputting an initial alert;
  while outputting the initial alert, detecting, via the one or more input devices, first movement of the portion of the computer system relative to the face of the user; and
  in response to detecting the first movement of the portion of the computer system relative to the face of the user, outputting a revised alert different from the initial alert based on the first movement of the portion of the computer system relative to the face of the user.

20. The non-transitory computer-readable storage medium of claim 16, wherein outputting the first alert indicating that the position of the portion of the computer system relative to the face of the user meets the one or more error conditions comprises displaying, via the one or more display generation components, a visual alert indicating that the position of the portion of the computer system relative to the face of the user meets the one or more error conditions.

21. The non-transitory computer-readable storage medium of claim 16, wherein outputting the first alert indicating that the position of the portion of the computer system relative to the face of the user meets the one or more error conditions comprises outputting a non-visual alert indicating that the position of the portion of the computer system relative to the face of the user meets the one or more error conditions.

22. The non-transitory computer-readable storage medium of claim 16, wherein outputting the first alert indicating that the position of the portion of the computer system relative to the face of the user meets the one or more error conditions comprises:
  outputting an alert indicating that a light seal component of the computer system meets one or more light seal error conditions.

23. The non-transitory computer-readable storage medium of claim 16, wherein outputting the first alert indicating that the position of the computer system relative to the face of the user meets the one or more error conditions comprises:

outputting an alert indicating that the eyes of the user are too close or too far from the portion of the computer system.

24. The non-transitory computer-readable storage medium of claim 16, wherein the respective criteria includes a content-type criterion that is met when the computer system is not outputting content of a first type.

25. The non-transitory computer-readable storage medium of claim 24, wherein the content of the first type is immersive experience content.

26. The non-transitory computer-readable storage medium of claim 25, the one or more programs further including instructions for:
    subsequent to forgoing outputting the first alert in accordance with the determination that the computer system does not meet the respective criteria while the position of the portion of the computer system relative to the face of the user meets the one or more error conditions:
        detecting that the computer system has ceased outputting content of the first type; and
        in response to detecting that the computer system has ceased outputting content of the first type, outputting the first alert.

27. The non-transitory computer-readable storage medium of claim 16, wherein the respective criteria includes a stability criterion that is met when the computer system meets stability criteria relative to the face of the user.

28. The non-transitory computer-readable storage medium of claim 16, wherein the first alert comprises a suggestion to replace one or more hardware components of the computer system with a different hardware component.

29. The non-transitory computer-readable storage medium of claim 16, wherein the first alert comprises a suggestion to change one or more settings of the computer system.

30. The non-transitory computer-readable storage medium of claim 16, wherein the first alert comprises a suggestion to move the portion of the computer system relative to the face of the user.

31. A method, comprising:
    at a computer system that is in communication with one or more display generation components and one or more input devices:
        detecting a position of a portion of the computer system relative to a face of a user; and
        in response to detecting the position of the portion of the computer system relative to the face of the user:
            in accordance with a determination that the computer system meets respective criteria while the position of the portion of the computer system relative to the face of the user meets one or more error conditions, wherein the respective criteria include a requirement that the computer system is operating in a respective context in order for the respective criteria to be met, outputting a first alert indicating that the position of the portion of the computer system relative to the face of the user meets the one or more error conditions; and
            in accordance with a determination that the computer system does not meet the respective criteria while the position of the portion of the computer system relative to the face of the user meets the one or more error conditions, forgoing outputting the first alert.

32. The method of claim 31, further comprising:
    subsequent to forgoing outputting the first alert in accordance with the determination that the computer system does not meet the respective criteria while the position of the portion of the computer system relative to the face of the user meets the one or more errors conditions:
        in accordance with a determination that the computer system meets the respective criteria while the position of the portion of the computer system relative to the face of the user meets the one or more error conditions, outputting the first alert indicating that the position of the portion of the computer system relative to the face of the user meets the one or more error conditions.

33. The method of claim 31, further comprising:
    in response to detecting the position of the portion of the computer system relative to the face of the user:
        in accordance with a determination that the position of the portion of the computer system relative to the face of the user does not meet the one or more error conditions, forgoing outputting the first alert.

34. The method of claim 31, wherein outputting the first alert indicating that the position of the portion of the computer system relative to the face of the user meets the one or more error conditions comprises:
    outputting an initial alert;
    while outputting the initial alert, detecting, via the one or more input devices, first movement of the portion of the computer system relative to the face of the user; and
    in response to detecting the first movement of the portion of the computer system relative to the face of the user, outputting a revised alert different from the initial alert based on the first movement of the portion of the computer system relative to the face of the user.

35. The method of claim 31, wherein outputting the first alert indicating that the position of the portion of the computer system relative to the face of the user meets the one or more error conditions comprises displaying, via the one or more display generation components, a visual alert indicating that the position of the portion of the computer system relative to the face of the user meets the one or more error conditions.

36. The method of claim 31, wherein outputting the first alert indicating that the position of the portion of the computer system relative to the face of the user meets the one or more error conditions comprises outputting a non-visual alert indicating that the position of the portion of the computer system relative to the face of the user meets the one or more error conditions.

37. The method of claim 31, wherein outputting the first alert indicating that the position of the portion of the computer system relative to the face of the user meets the one or more error conditions comprises:
    outputting an alert indicating that a light seal component of the computer system meets one or more light seal error conditions.

38. The method of claim 31, wherein outputting the first alert indicating that the position of the computer system relative to the face of the user meets the one or more error conditions comprises:
    outputting an alert indicating that the eyes of the user are too close or too far from the portion of the computer system.

39. The method of claim 31, wherein the respective criteria includes a content-type criterion that is met when the computer system is not outputting content of a first type.

40. The method of claim 39, wherein the content of the first type is immersive experience content.

41. The method of claim 40, further comprising:
subsequent to forgoing outputting the first alert in accordance with the determination that the computer system does not meet the respective criteria while the position of the portion of the computer system relative to the face of the user meets the one or more error conditions:
- detecting that the computer system has ceased outputting content of the first type; and
- in response to detecting that the computer system has ceased outputting content of the first type, outputting the first alert.

42. The method of claim 31, wherein the respective criteria includes a stability criterion that is met when the computer system meets stability criteria relative to the face of the user.

43. The method of claim 31, wherein the first alert comprises a suggestion to replace one or more hardware components of the computer system with a different hardware component.

44. The method of claim 31, wherein the first alert comprises a suggestion to change one or more settings of the computer system.

45. The method of claim 31, wherein the first alert comprises a suggestion to move the portion of the computer system relative to the face of the user.

* * * * *